(12) United States Patent
Monden

(10) Patent No.: US 8,492,476 B2
(45) Date of Patent: Jul. 23, 2013

(54) POLYCARBONATE RESIN COMPOSITION AND FORMED PRODUCT THEREOF

(75) Inventor: Toshiki Monden, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 13/139,229

(22) PCT Filed: Jan. 7, 2010

(86) PCT No.: PCT/JP2010/050089
§ 371 (c)(1),
(2), (4) Date: Jun. 10, 2011

(87) PCT Pub. No.: WO2010/090048
PCT Pub. Date: Aug. 12, 2010

(65) Prior Publication Data
US 2011/0245388 A1    Oct. 6, 2011

(30) Foreign Application Priority Data

| | | | |
|---|---|---|---|
| Feb. 9, 2009 | (JP) | | 2009-026837 |
| Mar. 10, 2009 | (JP) | | 2009-055802 |
| Mar. 26, 2009 | (JP) | | 2009-075456 |
| Apr. 20, 2009 | (JP) | | 2009-102103 |
| Apr. 20, 2009 | (JP) | | 2009-102104 |
| Apr. 21, 2009 | (JP) | | 2009-103168 |

(51) Int. Cl.
*C08L 83/00* (2006.01)

(52) U.S. Cl.
USPC .................................................... 524/588

(58) Field of Classification Search
None
See application file for complete search history.

(56) References Cited

U.S. PATENT DOCUMENTS

| | | | | |
|---|---|---|---|---|
| 3,971,756 A | * | 7/1976 | Bialous et al. ............... | 524/157 |
| 4,223,100 A | * | 9/1980 | Reinert ...................... | 525/146 |
| 4,710,534 A | * | 12/1987 | Liu ............................ | 524/411 |
| 5,298,467 A | * | 3/1994 | Hurtado et al. ............. | 501/90 |
| 6,433,050 B1 | | 8/2002 | Shinomiya et al. | |
| 6,838,502 B1 | * | 1/2005 | Nodera et al. .............. | 524/395 |
| 2001/0018486 A1 | * | 8/2001 | Lichtenhan et al. ......... | 524/588 |
| 2002/0155354 A1 | * | 10/2002 | Wariishi et al. ............. | 429/317 |
| 2004/0253405 A1 | | 12/2004 | Inagaki | |
| 2005/0286397 A1 | | 12/2005 | Inagaki | |
| 2006/0135737 A1 | | 6/2006 | Davis et al. | |

FOREIGN PATENT DOCUMENTS

| | | |
|---|---|---|
| CN | 1572453 A | 2/2005 |
| JP | 47 40445 | 10/1972 |
| JP | 54 32456 | 10/1979 |
| JP | 62 60421 | 12/1987 |
| JP | 2719486 | 2/1998 |
| JP | 2746519 | 5/1998 |
| JP | 11 181265 | 7/1999 |
| JP | 11 217494 | 8/1999 |
| JP | 11 263903 | 9/1999 |
| JP | 2000 169696 | 6/2000 |
| JP | 2000 239509 | 9/2000 |
| JP | 2001 26704 | 1/2001 |
| JP | 3163596 | 5/2001 |
| JP | 2001 181493 | 7/2001 |
| JP | 3240972 | 12/2001 |
| JP | 2002 138204 | 5/2002 |
| JP | 2003 268247 | 9/2003 |
| JP | 2003 277617 | 10/2003 |
| JP | 2003 277756 | 10/2003 |
| JP | 2003 531940 | 10/2003 |
| JP | 3503095 | 3/2004 |
| JP | 2004 524423 | 8/2004 |
| JP | 2004 351887 | 12/2004 |
| JP | 2005 232258 | 9/2005 |
| JP | 2005 232442 | 9/2005 |
| JP | 3716754 | 11/2005 |
| JP | 2006 8810 | 1/2006 |
| JP | 2006 199861 | 8/2006 |
| JP | 3835497 | 10/2006 |
| JP | 2007 131692 | 5/2007 |

OTHER PUBLICATIONS

Office Action issued Aug. 24, 2012, in Chinese Patent Application No. 201080004608.1 with English translation.
Lin Qian, et al., "Structure and Shape of Polycarbosilane", Ningbo Chemical Industry, Issue 3, 2008, pp. 1-4 (with English Abstract).
Extended Search Report issued Apr. 19, 2012 in Europe Application No. 10738387.9.
Database WPI Week 200403, Thomson Scientific, AN 2004-026651, XP002673708, Sep. 25, 2003, 4 pages (Corresponding to Previously Filed JP 2003-268247, Submitting Derwent abstract only).
Anonymous, "Polycarbosilanes", Encyclopedia of Polymer Science and Technology, Polycarbonates, vol. 7, XP007920491, Jan. 1, 2001, pp. 426-439.
International Search Report issued Apr. 20, 2010 in PCT/JP10/50089 filed Jan. 7, 2010.
Office Action issued Dec. 11, 2012 in European Patent Application No. 10 738 387.9.

(Continued)

*Primary Examiner* — Robert S Loewe
(74) *Attorney, Agent, or Firm* — Oblon, Spivak, McClelland, Maier & Neustadt, L.L.P.

(57) ABSTRACT

In a polycarbonate resin composition containing a polycarbonate resin and a polycarbosilane compound, the use of the polycarbosilane compound modifies the surface properties of the polycarbonate resin composition without adversely affecting the intrinsic characteristics of the polycarbonate resin, such as transparency, heat resistance, and mechanical properties, e.g., impact resistance. A polycarbonate resin composition containing 100 parts by mass of a polycarbonate resin, 0.001 to 1 part by mass of a metal salt compound, and 0.005 to 5 parts by mass of a polycarbosilane compound has significantly improved flame resistance and high transparency and causes markedly reduced outgassing and mold fouling, without losing impact resistance and heat resistance.

2 Claims, No Drawings

OTHER PUBLICATIONS

Extended Search Report issued Feb. 5, 2013 in European Patent Application No. 12196270.8.
Office Action issued Apr. 12, 2013, in European Patent Application No. 10 738 387.9 filed Jan. 7, 2010.
Office Action issued Jan. 7, 2013 in Chinese Patent Application No. 201080004608.1 with English language translation.
Office Action issued Apr. 30, 2013, in Japanese Patent Application No. 2011-094735 filed Apr. 21, 2011.
European Search Report issued May 27, 2013, in European Patent Application No. 13161062.8.

* cited by examiner

POLYCARBONATE RESIN COMPOSITION AND FORMED PRODUCT THEREOF

FIELD OF INVENTION

The present invention relates to a thermoplastic resin composition such as a polycarbonate resin composition, and the formed product thereof.

BACKGROUND ART

Polycarbonate resins are resins having excellent heat resistance, mechanical properties, optical properties, and electrical characteristics and are widely utilized, for example, in automotive materials, electrical and electronic device materials, housing materials, and materials for use in the manufacture of components in other industrial fields. In particular, flame-resistant polycarbonate resin compositions are suitably used as members for OA and information appliances, such as computers, notebook computers, cellular phones, printers, and copying machines, and sheet and film members.

In these various applications, it is known to blend organosiloxane (silicone) compounds having low surface energy with resins to modify surface properties, such as water repellency, oil repellency, anti-fogging properties, anti-fouling properties, stain removability, moisture resistance, lubricity, abrasion resistance, mold releasability, chemical resistance, and scratch resistance, for the purpose of improving product value. Among others, dimethyl silicone oils can effectively impart water repellency, oil repellency, and other characteristics.

Furthermore, resin lubricants containing polysilane compounds have been proposed (Patent Document 19).

As means for imparting flame resistance to polycarbonate resins, methods for blending a halogen flame retardant or a phosphorus flame retardant with polycarbonate resins have been employed. However, polycarbonate resin compositions containing a halogen flame retardant containing chlorine or bromine sometimes result in low thermal stability or deteriorated hue or cause the corrosion of screws or forming dies of forming machines in shape processing. Polycarbonate resin compositions containing a phosphorus flame retardant sometimes cause degradation of high transparency that is characteristic of polycarbonate resins or result in low impact resistance or low heat resistance, thus having limited applications. In addition, such a halogen flame retardant and phosphorus flame retardant may cause environmental pollution during the disposal and collection of products. Thus, in recent years, it has been strongly desired to impart flame resistance to polycarbonate resins without using such a flame retardant.

Under such circumstances, many metal salt compounds, typically organic alkali metal salt compounds and organic alkaline-earth metal salt compounds, have been recently studied as useful flame retardants (e.g., refer to Patent Documents 1 to 4). Examples of methods for imparting flame resistance to aromatic polycarbonate resin compositions by using an aromatic sulfonic acid alkali metal salt compound include a method that uses a perfluoroalkylsulfonic acid alkali metal salt having 4 to 8 carbon atoms (refer to Patent Document 1) and a method for blending a non-halogen aromatic sulfonic acid sodium salt (refer to Patent Document 2). Such metal salt compounds can be used as flame retardants to impart flame resistance to polycarbonate resins to some extent without adversely affecting their intrinsic characteristics such as mechanical properties, including impact resistance, heat resistance, optical properties, and electrical characteristics.

However, the flame resistance levels achieved by the above-described methods for blending such a metal salt compound with a polycarbonate resin are by no means satisfactory. This is probably because the flame-retardant effect achieved by blending the metal salt compound with a polycarbonate resin results from a catalytic action. Even if the amount of metal salt compound blended is increased to further improve the flame resistance, the flame resistance is not improved and, on the contrary, tends to be lowered. Furthermore, such an increase in the amount of metal salt compound causes a significant deterioration in mechanical properties, such as impact resistance, optical properties, such as transparency, and other physical properties, such as heat resistance and wet heat stability.

An attempt has been made to improve flame resistance by blending an organosiloxane (silicone) compound with a polycarbonate resin (e.g., refer to Patent Document 5).

In particular, methods for blending an organosiloxane compound having a branched structure in the main chain and having an aromatic group have been actively studied (e.g., refer to Patent Documents 6 to 8).

Furthermore, methods for simultaneously blending an organic sulfonic acid metal salt and the above-described organosiloxane compound having a branched structure in the main chain and having an aromatic group have been proposed (e.g., refer to Patent Documents 9 and 10).

However, the methods for blending only an organosiloxane compound according to Patent Documents 5 to 8 practically have very small effects of improving flame resistance and cannot achieve practical levels of flame resistance.

Furthermore, organosiloxane compounds have poor compatibility with and dispersibility in polycarbonate resins, resulting in poor mechanical properties, such as impact resistance, and thermophysical properties. In addition, even the addition of a small amount of organosiloxane compound markedly lowers the transparency of polycarbonate resins, which presents a critical drawback. Moreover, there are other problems such as the generation of a large amount of gas during kneading and shaping of resin compositions, a tendency to cause mold fouling, poor appearances of resin formed products, and sticky surfaces.

In accordance with the methods for simultaneously blending an organic sulfonic acid metal salt and the organosiloxane compound, the methods being proposed in Patent Documents 9 and 10, the amount of organosiloxane compound to be blended can be relatively reduced to improve flame resistance and thus the generation of gas, mold fouling, and poor appearances and stickiness of resin formed products can be suppressed to some extent. However, this cannot prevent deterioration in mechanical properties or thermophysical properties, particularly transparency.

Examples of methods for improving transparency that have been proposed include a method in which an organosiloxane compound having a particular functional group is used to improve compatibility with polycarbonate resins (e.g., refer to Patent Documents 11 to 13), a method using an organosiloxane compound having a phenyl group and a low degree of polymerization (e.g., refer to Patent Document 14), and a method using a low-molecular-weight organosiloxane compound (e.g., refer to Patent Documents 15 and 16).

In accordance with recent studies, polysilanes having the main chain composed of silicon atoms are blended with resins to improve mechanical properties, lubricity, and flame resistance. (e.g., refer to Patent Documents 17 to 19)

Hitherto, fluoropolymers have been blended with thermoplastic resins to improve the melt properties and surface properties, such as sliding characteristics, scratch resistance, water repellency, oil repellency, stain resistance, and fingerprint resistance, of the thermoplastic resins.

Among others, fluoroolefin polymers capable of forming fibrils can effectively modify the melt properties of thermoplastic resins. In particular, the blend of fluoroolefin polymers with flame-retarded thermoplastic resin compositions can improve anti-dripping properties during combustion and thereby can prevent the spread of fire when a thermoplastic resin formed product burns, thus showing excellent blending effects.

In the case where flame resistance is imparted to thermoplastic resins, fluoropolymers generally need to be used in combination with flame retardants because, normally, the addition of a fluoropolymer alone improves anti-dripping properties, but does not improve extinction properties (e.g., refer to Patent Documents 20 and 21).

In recent years, attempts have been actively made to weld thermoplastic resin formed products using a near-infrared laser (so-called laser welding) in automobile, electrical and electronics, and precision apparatus fields. Laser welding methods are noncontact methods, produce no abrasion powder or burrs, and cause minimal damage to products. Thus, laser welding methods have considerable industrial advantages.

Near-infrared light having a wavelength of 800 to 1200 nm is generally suitably used as a laser for use in laser welding for safety and cost reasons. Thus, thermoplastic resin compositions that are highly transparent to light in the near-infrared region are used in a laser welding field (e.g., refer to Patent Documents 22 and 23).

Many thermoplastic resin compositions are used in members for sensing devices, exemplified by various automobile sensing devices, such as face direction detection systems and rain sensors, various security systems, such as face recognition systems, fingerprint recognition systems, and vein recognition systems, and various information/communication devices, such as remote controllers and infrared communication devices. The wavelength of infrared light used in such fields depends on the devices and systems. In general, near-infrared light in the range of 800 to 1500 nm is used. Thus, also in such fields, there is a demand for thermoplastic resin compositions that are highly transparent to light in a near-infrared region.

CITATION LIST

Patent Document

Patent Document 1: Japanese Examined Patent Application Publication No. 47-40445
Patent Document 2: Japanese Examined Patent Application Publication No. 54-32456
Patent Document 3: Japanese Unexamined Patent Application Publication No. 2000-169696
Patent Document 4: Japanese Unexamined Patent Application Publication No. 2001-181493
Patent Document 5: Japanese Examined Patent Application Publication No. 62-60421
Patent Document 6: Japanese Patent No. 3240972
Patent Document 7: Japanese Patent No. 3716754
Patent Document 8: Japanese Patent No. 3835497
Patent Document 9: Japanese Unexamined Patent Application Publication No. 11-217494
Patent Document 10: Japanese Unexamined Patent Application Publication No. 11-263903
Patent Document 11: Japanese Unexamined Patent Application Publication No. 2004-524423
Patent Document 12: Japanese Patent No. 3163596
Patent Document 13: Japanese Patent No. 2719486
Patent Document 14: Japanese Patent No. 2746519
Patent Document 15: Japanese Patent No. 3503095
Patent Document 16: Japanese Unexamined Patent Application Publication No. 2003-531940
Patent Document 17: Japanese Unexamined Patent Application Publication No. 2003-268247
Patent Document 18: Japanese Unexamined Patent Application Publication No. 2003-277617
Patent Document 19: Japanese Unexamined Patent Application Publication No. 2003-277756
Patent Document 20: Japanese Unexamined Patent Application Publication No. 11-181265
Patent Document 21: Japanese Unexamined Patent Application Publication No. 2000-239509
Patent Document 22: Japanese Unexamined Patent Application Publication No. 2006-199861
Patent Document 23: Japanese Unexamined Patent Application Publication No. 2007-131692

OBJECT AND SUMMARY OF INVENTION

Objects to be Achieved by Invention

[Object I]

Hitherto, organosiloxane (silicone) compounds used to improve surface properties, particularly dimethylsiloxane, are effective in improving water repellency or the like but tend to have poor compatibility with resins and markedly poor dispersibility in resins. Thus, the blend of organosiloxane (silicone) compounds with resins causes a significant deterioration in mechanical properties.

Furthermore, because of poor compatibility with resins, organosiloxane (silicone) compounds bleed during forming or from a formed product over time, resulting in mold fouling, poor surface appearances, stickiness, or unsustainable water-repellent effects.

Polysilane compounds also inevitably cause a deterioration in mechanical properties, and resin compositions containing such polysilane compounds are unsatisfactory.

In particular, the blend of these compounds having poor dispersibility in and compatibility with resins with polycarbonate resins results in degradation of the intrinsic transparency of the polycarbonate resins and also causes a significant deterioration in heat resistance and mechanical properties, such as impact resistance.

In accordance with a first aspect, the present invention provides a polycarbonate resin composition having surface properties, such as water repellency, oil repellency, anti-fogging properties, anti-fouling properties, stain removability, moisture resistance, lubricity, abrasion resistance, mold releasability, chemical resistance, and scratch resistance, modified with a modifier having excellent dispersibility in and compatibility with a polycarbonate resin without adversely affecting the intrinsic characteristics of the polycarbonate resin, such as transparency, heat resistance, and impact resistance, and a polycarbonate resin formed product manufactured by shaping the polycarbonate resin composition (Object I).

[Object II]

Although the methods according to Patent Documents 11 to 16 can provide relatively high transparency, the organosiloxane compounds have still insufficient dispersibility in polycarbonate resins, often resulting in unstable flame resistance. Furthermore, since the organosiloxane compounds having a low degree of polymerization or a low molecular weight are used to improve dispersibility, even the addition of a small amount of organosiloxane compound tends to generate a large amount of gas while kneading and shaping resin compositions and foul a metal mold. An increase in the amount of organosiloxane compound so as to achieve stable flame resistance causes serious gas evolution and mold fouling problems. Thus, the methods are unsatisfactory for practical use.

Such an organosiloxane compound deposited on a surface of a formed product or bleeding from a formed product can be responsible for electrical troubles, such as contact failure, in electrical and electronic applications. Thus, such an organosiloxane compound cannot be used.

Thus, it is significantly difficult to impart flame resistance to polycarbonate resins and suppress outgassing and mold fouling by blending organosiloxane compounds with the polycarbonate resins without adversely affecting the mechanical properties, thermophysical properties, and transparency of the polycarbonate resins.

Patent Document 17 proposes a resin composition blended with a polysilane compound, which is a silicon compound different from organosiloxane compounds. The polysilane compound also has poor compatibility with and dispersibility in polycarbonate resins and cannot suppress deterioration in mechanical properties, such as impact resistance, or transparency of the polycarbonate resins.

Thus, polycarbonate resin compositions having excellent flame resistance, shaping processability, mechanical properties, heat resistance, and transparency have not been manufactured.

In accordance with a second aspect, the present invention provides a polycarbonate resin composition that has excellent flame resistance and mechanical properties, such as impact resistance, causes very little outgassing and mold fouling, and has high transparency, and a polycarbonate resin formed product manufactured by shaping the polycarbonate resin composition (Object II).

[Object III]

Fluoropolymers used to improve the melt properties or surface properties of thermoplastic resins have considerably poor compatibility with and dispersibility in the thermoplastic resins. The blend of even a small amount of fluoropolymer therefore results in significantly lowered light transmittance or poor appearance.

In particular, with the recent demand for stricter fire prevention, there is a growing tendency to use flame-retarded thermoplastic resin compositions in electrical and electronic device components and members for sensing devices manufactured by laser welding described above. Use of thermoplastic resin compositions blended with fluoropolymers in such fields significantly lowers light transmittance, particularly in a near-infrared region. This limits the application of the thermoplastic resin compositions, thus presenting a critical drawback.

For example, a decrease in the light transmittance in a near-infrared region through a thermoplastic resin composition for laser welding results in a low transmittance of a laser beam and must be compensated by a reduction in thickness. This narrows the degree of freedom of product thickness design and tends to lower the product strength. An increase in laser output can cause problems. For example, defects, such as fusion and fuming on a laser incident surface and bubbles caused by abnormal heat generation at a bonding interface, can make welding impossible. An increase in laser output can also result in poor appearance and strength reduction.

Likewise, in various sensing devices, a decrease in the light transmittance in a near-infrared region through a thermoplastic resin composition constituting the sensing devices results in a significant reduction in the sensitivity of the sensing devices. A thickness reduction to increase the transmittance of infrared light results in lower product strength and an increase in the transmittance at wavelengths other than the wavelength used, which also results in a reduction in the sensitivity of the sensing devices and possibly causes malfunctions.

Thus, there is a strong demand for a technique for improving the compatibility and dispersibility of a fluoropolymer in a thermoplastic resin and thus increasing light transmittance in a near-infrared region.

In accordance with a third aspect, for the purpose of modifying the melt properties and surface properties of thermoplastic resins, such as sliding characteristics, abrasion resistance, water repellency, oil repellency, stain resistance, and fingerprint resistance, the present invention provides a thermoplastic resin composition blended with a fluoropolymer in which improvements have been made in the dispersibility of the fluoropolymer in the thermoplastic resin and light transmittance, particularly light transmittance in a near-infrared region, as well as flame resistance, appearance, and strength, and also provides a thermoplastic resin formed product manufactured by shaping the thermoplastic resin composition (Object III).

[Object IV]

The flame resistance of polycarbonate resins imparted by metal salt compounds is catalytic. An increase in the amount of metal salt compound to improve flame resistance is therefore not effective or even lowers flame resistance. Since the blend of polysilanes has a very small flame-retardant effect, polycarbonate resin compositions blended with polysilanes are unsatisfactory for practical use.

In accordance with a fourth aspect, the present invention provides a polycarbonate resin composition whose flame resistance and flowability can be improved and a polycarbonate resin formed product manufactured by shaping the polycarbonate resin composition (Object IV).

[Objects V and VI]

The flame resistance of polycarbonate resins imparted by metal salt compounds is catalytic. An increase in the amount of metal salt compound to improve flame resistance is therefore not effective or even lowers flame resistance.

It is presumed that a flame retardation technique using metal salt compounds is achieved by a carbonization promoting effect during combustion. In the case of thin-walled formed products, however, metal salt compounds also have a decomposition promoting effect during combustion, as well as the carbonization promoting effect, thereby increasing dripping.

In general, an electrical and electronic device field requires V-1 or higher flame resistance in the UL 94 Test specified by the U.S.A. Underwriters Laboratories (UL). This requirement involves the suppression of dripping during combustion.

Thus, fluoropolymers are generally blended to enhance anti-dripping properties during combustion. However, even with the combination of a metal salt compound and a fluoropolymer, the thin-walled formed products described above cannot have sufficient flame resistance.

Since the blend of such polysilanes has a very small flame-retardant effect, polycarbonate resin compositions blended with the polysilanes are unsatisfactory for practical use.

In accordance with a fifth aspect, the present invention provides a polycarbonate resin composition that can exhibit reduced dripping during combustion and has high flame resistance even in the case of thin-walled formed products, and a polycarbonate resin formed product manufactured by shaping the polycarbonate resin composition (Object V).

In accordance with a sixth aspect, the present invention provides a polycarbonate resin composition having high flame resistance, as well as high transparency, excellent hue, and high impact resistance, and a polycarbonate resin formed product manufactured by shaping the polycarbonate resin composition (Object VI).

SUMMARY OF INVENTION

In order to achieve Object I, the present inventor has focused on the molecular structure, particularly the structure of the main chain, of a modifier to be blended with polycarbonate resins and has conducted extensive studies thereon.

As a result, the present inventor has completed the first aspect of the present invention by finding that a polycarbosilane compound can be blended as a modifier for a polycarbonate resin to modify surface properties, such as water repellency, oil repellency, anti-fogging properties, anti-fouling properties, stain removability, moisture resistance, lubricity, abrasion resistance, mold releasability, chemical resistance, and scratch resistance, without adversely affecting the intrinsic characteristics of the polycarbonate resin, such as transparency and impact resistance.

The first aspect of the present invention includes a polycarbonate resin composition containing a polycarbonate resin and a polycarbosilane compound, a polycarbonate resin formed product manufactured by shaping the polycarbonate resin composition, and a modifier for polycarbonate resins, the modifier containing a polycarbosilane compound.

In order to achieve Object II, the present inventor has focused on the molecular structure, particularly the structure of the main chain, of a silicon compound to be blended with polycarbonate resins and has conducted extensive studies thereon.

As a result, the present inventor has completed the second aspect of the present invention by finding that predetermined amounts of a metal salt compound and an organosilicon compound having a predetermined structure can be blended with a polycarbonate resin to achieve markedly improved flame resistance, very little outgassing and mold fouling, and high transparency, without losing impact resistance and heat resistance.

The second aspect of the present invention includes a polycarbonate resin composition containing 100 parts by mass of a polycarbonate resin, 0.001 to 1 part by mass of a metal salt compound, and 0.005 to 5 parts by mass of a polycarbosilane compound, and a polycarbonate resin formed product manufactured by shaping the polycarbonate resin composition.

As a result of extensive studies in view of Object III, the present inventor has completed the third aspect of the present invention by finding that, in a thermoplastic resin composition containing a fluoropolymer and blended with a polycarbosilane compound, the polycarbosilane compound can effectively function as a fluoropolymer dispersant, improve the compatibility and dispersibility of the fluoropolymer in the thermoplastic resin, increase the light transmittance of a thermoplastic resin composition in a near-infrared region, improve flame resistance, and solve poor appearance and strength reduction.

The third aspect of the present invention includes a thermoplastic resin composition containing a thermoplastic resin, a fluoropolymer, and a fluoropolymer dispersant, wherein the fluoropolymer dispersant contains a polycarbosilane compound, and a thermoplastic resin formed product manufactured by shaping the thermoplastic resin composition.

As a result of extensive studies to achieve Object IV, the present inventor has completed the fourth aspect of the present invention by finding that the addition of predetermined amounts of a metal salt compound and a polysilane compound to a polycarbonate resin can markedly improve flame resistance and also improve flowability.

The fourth aspect of the present invention includes a polycarbonate resin composition containing 100 parts by mass of a polycarbonate resin, 0.01 to 1 part by mass of a metal salt compound, and 0.01 to 5 parts by mass of a polysilane, and a polycarbonate resin formed product manufactured by shaping the polycarbonate resin composition.

As a result of extensive studies to achieve Object V, the present inventor has completed the fifth aspect of the present invention by finding that the addition of predetermined amounts of a metal salt compound, a fluoropolymer, and a polysilane compound to a polycarbonate resin can improve anti-dripping properties during combustion and markedly improve flame resistance.

The fifth aspect of the present invention includes a polycarbonate resin composition containing 100 parts by mass of a polycarbonate resin, 0.001 to 1 part by mass of a metal salt compound, 0.001 to 1 part by mass of a fluoropolymer, and 0.01 to 2 parts by mass of a polysilane, and a polycarbonate resin formed product manufactured by shaping the polycarbonate resin composition.

As a result of extensive studies to achieve Object VI, the present inventor has completed the sixth aspect of the present invention by finding that the addition of predetermined amounts of a metal salt compound and a polysilane compound to a polycarbonate resin can markedly improve flame resistance, and use of a particular polysilane, more specifically a polysilane having an aryl group, can provide a polycarbonate resin composition having excellent transparency, hue, and impact resistance.

The sixth aspect of the present invention includes a polycarbonate resin composition containing 100 parts by mass of a polycarbonate resin, 0.01 to 1 part by mass of a metal salt compound, and 0.3 to 5 parts by mass of a polysilane having an aryl group, and a polycarbonate resin formed product manufactured by shaping the polycarbonate resin composition.

Advantageous Effects of Invention

[Advantageous Effect I]

The polycarbonate resin composition containing a polycarbosilane compound as a modifier according to the first aspect of the present invention has excellent surface properties, such as water repellency, oil repellency, anti-fogging properties, anti-fouling properties, stain removability, moisture resistance, lubricity, abrasion resistance, mold releasability, chemical resistance, and scratch resistance while retaining the intrinsic characteristics of polycarbonate resins, such as transparency, heat resistance, and impact resistance.

Unlike organosiloxane (silicone) compounds or polysilane compounds that have been conventionally used as surface modifiers, polycarbosilane compounds have high dispersibility in and compatibility with polycarbonate resins, cause no bleedout problem, and do not adversely affect the intrinsic characteristics of polycarbonate resins.

The polycarbonate resin formed product according to the first aspect of the present invention has excellent transparency, mechanical properties, such as impact resistance, and heat resistance, modified surface properties, such as water repellency, oil repellency, anti-fogging properties, anti-fouling properties, stain removability, moisture resistance, lubricity, abrasion resistance, mold releasability, chemical resistance, and scratch resistance, causes no outgassing or mold fouling problem, can be manufactured with high productivity and high yield, and is industrially very useful as an automotive material, an electrical and electronic device material, a housing material, or a material for use in the manufacture of components in other industrial fields, particularly as a member for OA and information appliances, such as computers, notebook computers, cellular phones, printers, and copying machines, or a sheet or film member.

[Advantageous Effect II]

The polycarbonate resin composition according to the second aspect of the present invention contains a metal salt compound effective in improving flame resistance and, together with this metal salt compound, a polycarbosilane compound, and thereby can further improve flame resistance without adversely affecting mechanical properties, such as impact resistance, transparency, and other physical properties and without causing outgassing and mold fouling problems.

Unlike organosiloxane (silicone) compounds or polysilane compounds that have been conventionally used in combination with metal salt compounds, even the addition of a relatively large amount of polycarbosilane compound to a polycarbonate resin does not adversely affect impact resistance, heat resistance, or transparency and causes little outgassing or mold fouling. Thus, use of a polycarbosilane compound in combination with a metal salt compound can provide a polycarbonate resin composition that has high flame resistance and impact resistance, causes very little outgassing and mold fouling, and has high transparency.

The polycarbonate resin formed product according to the second aspect of the present invention has excellent flame resistance, mechanical properties, such as impact resistance, and heat resistance, as well as high transparency, causes no outgassing or mold fouling problem, can be manufactured with high productivity and high yield, and is industrially very useful as an automotive material, an electrical and electronic device material, a housing material, or a material for use in the manufacture of components in other industrial fields, particularly as a member for OA and information appliances, such as computers, notebook computers, cellular phones, printers, and copying machines, or a sheet or film member.

[Advantageous Effect III]

A polycarbosilane compound can effectively function as a dispersant for a fluoropolymer blended with a thermoplastic resin, improve the compatibility and dispersibility of the fluoropolymer in the thermoplastic resin composition, and thereby prevent poor appearance and strength reduction, and can also improve light transmittance, particularly near-infrared light transmittance, and even flame resistance.

The thermoplastic resin formed product manufactured by shaping the thermoplastic resin composition according to the third aspect of the present invention has melt properties and surface properties, such as sliding characteristics, abrasion resistance, water repellency, oil repellency, stain resistance, and fingerprint resistance, improved by the blend of the fluoropolymer, has high light transmittance, particularly near-infrared light transmittance, and high flame resistance, and is industrially very useful as a member for near-infrared laser welding or a member for sensing devices, exemplified by various automobile sensing devices, such as face direction detection systems and rain sensors, various security systems, such as face recognition systems, fingerprint recognition systems, and vein recognition systems, and various information communication devices, such as remote controllers and infrared communication devices in automobile, electrical and electronic, and other precision apparatus fields.

[Advantageous Effect IV]

The polycarbonate resin composition according to the fourth aspect of the present invention can achieve higher flame resistance and flowability than before.

[Advantageous Effect V]

The polycarbonate resin composition according to the fifth aspect of the present invention can achieve higher flame resistance than before.

[Advantageous Effect VI]

The polycarbonate resin composition according to the sixth aspect of the present invention can achieve higher flame resistance, transparency, and impact resistance than before.

DESCRIPTION OF EMBODIMENTS

The present invention will be described in detail in the following embodiments and examples. However, the present invention is not limited to these embodiments and examples, and any modification can be made without departing from the gist of the present invention.

I. First Aspect of the Present Invention

[1. Overview]

A polycarbonate resin composition according to the first aspect of the present invention contains at least a polycarbonate resin and a polycarbosilane compound. The polycarbonate resin composition according to the first aspect of the present invention may optionally contain other components.

Polycarbosilane compounds are compounds having two or more repeating units each having a silicon-carbon bond (Si—C bond) in their main chains. The polycarbosilane compound used in the first aspect of the present invention has the Si—C bond in its main chain and thus has excellent dispersibility in and compatibility with polycarbonate resins. Consequently, there can be solved the problems of existing polycarbonate resin compositions containing an organosiloxane (silicone) compound or a polysilane compound, such as degradations of transparency, impact resistance, and heat resistance, and outgassing and mold fouling.

[2. Polycarbonate Resin]

There is no limitation on the type of polycarbonate resin used in the polycarbonate resin composition according to the first aspect of the present invention. Polycarbonate resins may be used alone, or two or more polycarbonate resins may be combined with each other at any ratio.

The polycarbonate resin in the first aspect of the present invention is a polymer having a basic structure with a carbonate bond represented by the following formula (7).

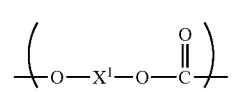

(7)

In the formula (7), $X^1$ generally represents a hydrocarbon group, and $X^1$ containing a heteroatom or a hetero bond for imparting various characteristics may be used.

Polycarbonate resins can be classified into aromatic polycarbonate resins in which each carbon directly bonded to the carbonate bond is aromatic carbon and aliphatic polycarbonate resins in which each carbon directly bonded to the carbonate bond is aliphatic carbon. Both aromatic polycarbonate resins and aliphatic polycarbonate resins can be used. Aromatic polycarbonate resins are preferred in terms of heat resistance, mechanical properties, and electrical characteristics.

The type of polycarbonate resin is not particularly limited. One example is a polycarbonate polymer produced through the reaction between a dihydroxy compound and a carbonate precursor. In addition to the dihydroxy compound and the carbonate precursor, a polyhydroxy compound may be involved in the reaction. Alternatively, carbon dioxide may be used as the carbonate precursor to react with a cyclic ether. The polycarbonate polymer may have a straight chain or a branched chain. The polycarbonate polymer may be a homopolymer composed of one repeating unit or a copolymer composed of two or more repeating units. The copolymer may be selected from various copolymerization forms, such as a random copolymer and a block copolymer. In general, such polycarbonate polymers are thermoplastic resins.

[2-1. Dihydroxy Compound]

Among dihydroxy compounds serving as a raw material of the polycarbonate resin, examples of aromatic dihydroxy compounds serving as a raw material of the aromatic polycarbonate resin include:
dihydroxybenzenes, such as
1,2-dihydroxybenzene,
1,3-dihydroxybenzene (or resorcinol), and
1,4-dihydroxybenzene,
dihydroxybiphenyls, such as
2,5-dihydroxybiphenyl,
2,2'-dihydroxybiphenyl, and
4,4'-dihydroxybiphenyl,
dihydroxynaphthalenes, such as
2,2'-dihydroxy-1,1'-binaphthyl,
1,2-dihydroxynaphthalene,
1,3-dihydroxynaphthalene,
2,3-dihydroxynaphthalene,
1,6-dihydroxynaphthalene,
2,6-dihydroxynaphthalene,
1,7-dihydroxynaphthalene, and
2,7-dihydroxynaphthalene,
dihydroxydiaryl ethers, such as
2,2'-dihydroxydiphenyl ether,
3,3'-dihydroxydiphenyl ether,
4,4'-dihydroxydiphenyl ether,
4,4'-dihydroxy-3,3'-dimethyldiphenyl ether,
1,4-bis(3-hydroxyphenoxy)benzene, and
1,3-bis(4-hydroxyphenoxy)benzene,
bis(hydroxyaryl)alkanes, such as
2,2-bis(4-hydroxyphenyl)propane (or bisphenol A),
1,1-bis(4-hydroxyphenyl)propane,
2,2-bis(3-methyl-4-hydroxyphenyl)propane,
2,2-bis(3-methoxy-4-hydroxyphenyl)propane,
2-(4-hydroxyphenyl)-2-(3-methoxy-4-hydroxyphenyl)propane,
1,1-bis(3-tert-butyl-4-hydroxyphenyl)propane,
2,2-bis(4-hydroxy-3,5-dimethylphenyl)propane,
2,2-bis(3-cyclohexyl-4-hydroxyphenyl)propane,
2-(4-hydroxyphenyl)-2-(3-cyclohexyl-4-hydroxy-phenyl)propane,
α,α'-bis(4-hydroxyphenyl)-1,4-diisopropylbenzene,
1,3-bis[2-(4-hydroxyphenyl)-2-propyl]benzene,
bis(4-hydroxyphenyl)methane,
bis(4-hydroxyphenyl)cyclohexylmethane,
bis(4-hydroxyphenyl)phenylmethane,
bis(4-hydroxyphenyl)(4-propenylphenyl)methane,
bis(4-hydroxyphenyl)diphenylmethane,
bis(4-hydroxyphenyl)naphthylmethane,
1,1-bis(4-hydroxyphenyl)ethane,
1,2-bis(4-hydroxyphenyl)ethane,
1,1-bis(4-hydroxyphenyl)-1-phenylethane,
1,1-bis(4-hydroxyphenyl)-1-naphthylethane,
1,1-bis(4-hydroxyphenyl)butane,
2,2-bis(4-hydroxyphenyl)butane,
2,2-bis(4-hydroxyphenyl)pentane,
1,1-bis(4-hydroxyphenyl)hexane,
2,2-bis(4-hydroxyphenyl)hexane,
1,1-bis(4-hydroxyphenyl)octane,
2,2-bis(4-hydroxyphenyl)octane,
1-bis(4-hydroxyphenyl)hexane,
2-bis(4-hydroxyphenyl)hexane,
4,4-bis(4-hydroxyphenyl)heptane,
2,2-bis(4-hydroxyphenyl)nonane,
1,10-bis(4-hydroxyphenyl)decane, and
1,1-bis(4-hydroxyphenyl)dodecane,
bis(hydroxyaryl)cycloalkanes, such as
1,1-bis(4-hydroxyphenyl)cyclopentane,
1,1-bis(4-hydroxyphenyl)cyclohexane,
1,4-bis(4-hydroxyphenyl)cyclohexane,
1,1-bis(4-hydroxyphenyl)-3,3-dimethylcyclohexane,
1,1-bis(4-hydroxyphenyl)-3,4-dimethylcyclohexane,
1,1-bis(4-hydroxyphenyl)-3,5-dimethylcyclohexane,
1,1-bis(4-hydroxyphenyl)-3,3,5-trimethylcyclohexane,
1,1-bis(4-hydroxy-3,5-dimethylphenyl)-3,3,5-trimethylcyclohexane,
1,1-bis(4-hydroxyphenyl)-3-propyl-5-methylcyclohexane,
1,1-bis(4-hydroxyphenyl)-3-tert-butyl-cyclohexane,
1,1-bis(4-hydroxyphenyl)-4-tert-butyl-cyclohexane,
1,1-bis(4-hydroxyphenyl)-3-phenylcyclohexane, and
1,1-bis(4-hydroxyphenyl)-4-phenylcyclohexane,
bisphenols having a cardo structure, such as
9,9-bis(4-hydroxyphenyl)fluorene, and
9,9-bis(4-hydroxy-3-methylphenyl)fluorene,
dihydroxydiaryl sulfides, such as
4,4'-dihydroxydiphenyl sulfide, and
4,4'-dihydroxy-3,3'-dimethyldiphenyl sulfide,
dihydroxydiaryl sulfoxides, such as
4,4'-dihydroxydiphenyl sulfoxide, and
4,4'-dihydroxy-3,3'-dimethyldiphenyl sulfoxide, and
dihydroxydiarylsulfones, such as
4,4'-dihydroxydiphenylsulfone, and
4,4'-dihydroxy-3,3'-dimethyldiphenylsulfone.

Among these, bis(hydroxyaryl)alkanes are preferred, and bis(4-hydroxyphenyl)alkanes are more preferred. In particular, 2,2-bis(4-hydroxyphenyl)propane (or bisphenol A) is preferred in terms of impact resistance and heat resistance.

These aromatic dihydroxy compounds may be used alone, or two or more of the aromatic dihydroxy compounds may be combined with each other at any ratio.

Examples of aliphatic dihydroxy compounds serving as a raw material of the aliphatic polycarbonate resin include:
alkanediols, such as
ethane-1,2-diol,
propane-1,2-diol,
propane-1,3-diol,
2,2-dimethylpropane-1,3-diol,
2-methyl-2-propylpropane-1,3-diol,
butane-1,4-diol,
pentane-1,5-diol,
hexane-1,6-diol, and
decane-1,10-diol,
cycloalkanediols, such as
cyclopentane-1,2-diol,
cyclohexane-1,2-diol,
cyclohexane-1,4-diol,
1,4-cyclohexanedimethanol,
4-(2-hydroxyethyl)cyclohexanol, and
2,2,4,4-tetramethyl-cyclobutane-1,3-diol,
glycols, such as 2,2'-oxydiethanol (or ethylene glycol),
diethylene glycol,
triethylene glycol,
propylene glycol, and
spiroglycol,
aralkyl diols, such as
1,2-benzenedimethanol,
1,3-benzenedimethanol,
1,4-benzenedimethanol,
1,4-benzenediethanol,
1,3-bis(2-hydroxyethoxy)benzene,
1,4-bis(2-hydroxyethoxy)benzene,
2,3-bis(hydroxymethyl)naphthalene,
1,6-bis(hydroxyethoxy)naphthalene,
4,4'-biphenyldimethanol,
4,4'-biphenyldiethanol,
1,4-bis(2-hydroxyethoxy)biphenyl,
bisphenol A bis(2-hydroxyethyl)ether, and
bisphenol S bis(2-hydroxyethyl)ether, and
    cyclic ethers, such as
1,2-epoxyethane (or ethylene oxide),
1,2-epoxypropane (or propylene oxide),
1,2-epoxycyclopentane,
1,2-epoxycyclohexane,
1,4-epoxycyclohexane,
1-methyl-1,2-epoxycyclohexane,
2,3-epoxynorbornane, and
1,3-epoxypropane.

These aliphatic dihydroxy compounds may be used alone, or two or more of the aliphatic dihydroxy compounds may be combined with each other at any ratio.

[2-2. Carbonate Precursor]

Among monomers serving as a raw material of the polycarbonate resin, examples of the carbonate precursor include carbonyl halides and carbonate esters.

These carbonate precursors may be used alone, or two or more of the carbonate precursors may be combined with each other at any ratio.

Specific examples of carbonyl halides include phosgene and haloformates, such as bischloroformates of dihydroxy compounds and monochloroformates of dihydroxy compounds.

Specific examples of carbonate esters include diaryl carbonates, such as diphenyl carbonate and ditolyl carbonate; dialkyl carbonates, such as dimethyl carbonate and diethyl carbonate; and carbonates of dihydroxy compounds, such as biscarbonates of dihydroxy compounds, monocarbonates of dihydroxy compounds, and cyclic carbonates.

[2-3. Method for Producing Polycarbonate Resin]

A method for producing a polycarbonate resin is not particularly limited and may be any method. Examples of the method include an interfacial polymerization method, a melt transesterification method, a pyridine method, a ring-opening polymerization method of cyclic carbonate compounds, and a solid phase transesterification method of prepolymers. Among these, particularly suitable methods are more specifically described below.

<Interfacial Polymerization Method>

An interfacial polymerization method for producing polycarbonate resins is described below. In accordance with the interfacial polymerization method, a dihydroxy compound and a carbonate precursor (preferably phosgene) are allowed to react with each other in the presence of an organic solvent inert to the reaction and an aqueous alkaline solution normally at a pH of 9 or more, and subsequent interfacial polymerization in the presence of a polymerization catalyst yields a polycarbonate resin. If necessary, the reaction system may include a molecular weight modifier (terminating agent) and an antioxidant for preventing the oxidation of the dihydroxy compound.

Dihydroxy compounds and carbonate precursors to be used are described above. Among the carbonate precursors, phosgene is preferably used. A method using phosgene is particularly referred to as a phosgene method.

Examples of the organic solvent inert to the reaction include chlorinated hydrocarbons, such as dichloromethane, 1,2-dichloroethane, chloroform, monochlorobenzene, and dichlorobenzene; and aromatic hydrocarbons, such as benzene, toluene, and xylene. These organic solvents may be used alone, or two or more of the organic solvents may be combined with each other at any ratio.

Examples of an alkaline compound contained in the aqueous alkaline solution include alkali metal compounds and alkaline-earth metal compounds, such as sodium hydroxide, potassium hydroxide, lithium hydroxide, and sodium hydrogen carbonate. Among these, sodium hydroxide and potassium hydroxide are preferred. These alkaline compounds may be used alone, or two or more of the alkaline compounds may be combined with each other at any ratio.

The concentration of the alkaline compound in the aqueous alkaline solution is not particularly limited and generally ranges from 5% to 10% by mass to control the pH of the reaction system within the range of 10 to 12. For example, in the case of blowing with phosgene, in order to control the pH of an aqueous phase within the range of 10 to 12, preferably 10 to 11, it is preferable that the molar ratio of the dihydroxy compound to the alkaline compound is generally 1:1.9 or more, particularly 1:2.0 or more, and generally 1:3.2 or less, particularly 1:2.5 or less.

Examples of the polymerization catalyst include aliphatic tertiary amines, such as trimethylamine, triethylamine, tributylamine, tripropylamine, and trihexylamine; alicyclic tertiary amines, such as N,N'-dimethylcyclohexylamine and N,N'-diethylcyclohexylamine; aromatic tertiary amines, such as N,N'-dimethylaniline and N,N'-diethylaniline; quaternary ammonium salts, such as trimethylbenzylammonium chloride, tetramethylammonium chloride, and triethylbenzylammonium chloride; pyridine; guanine; and salts of guanidine. These polymerization catalysts may be used alone, or two or more of the polymerization catalysts may be combined with each other at any ratio.

Examples of the molecular weight modifier include aromatic phenols having a monovalent phenolic hydroxy group; aliphatic alcohols, such as methanol and butanol; mercaptans; and phthalimide. Among these, aromatic phenols are preferred. Specific examples of the aromatic phenols include alkyl-substituted phenols, such as m-methylphenol, p-methylphenol, m-propylphenol, p-propylphenol, p-tert-butylphenol, and p-long-chain-alkyl-substituted phenols; phenols having a vinyl group, such as isopropanylphenol; phenols having an epoxy group; and phenols having a carboxyl group, such as o-oxybenzoic acid and 2-methyl-6-hydroxyphenylacetic acid. These molecular weight modifiers may be used alone, or two or more of the molecular weight modifiers may be combined with each other at any ratio.

The amount of molecular weight modifier to be used is generally 0.5 mol or more and preferably 1 mol or more and generally 50 mol or less and preferably 30 mol or less relative to 100 mol of the dihydroxy compound. By setting the amount of molecular weight modifier to be used within the range, the thermal stability and hydrolysis resistance of the polycarbonate resin composition can be improved.

In the reaction, a reaction substrate, a reaction medium, a catalyst, and an additive agent are mixed in any order provided that a desired polycarbonate resin can be produced. Thus, the order may be appropriately determined. For example, when phosgene is used as the carbonate precursor, the molecular weight modifier may be added at any point between the reaction (phosgenation) of the dihydroxy compound with phosgene and the beginning of the polymerization reaction.

The reaction temperature generally ranges from 0° C. to 40° C., and the reaction time generally ranges from several minutes (for example, 10 minutes) to several hours (for example, 6 hours).

<Melt Transesterification Method>

A melt transesterification method for producing polycarbonate resins is described below. The melt transesterification method involves, for example, transesterification between a carbonic acid diester and a dihydroxy compound.

Dihydroxy compounds to be used are described above.

Examples of the carbonic acid diester include dialkyl carbonate compounds, such as dimethyl carbonate, diethyl carbonate, and di-tert-butyl carbonate; diphenyl carbonate; and substituted diphenyl carbonates, such as ditolyl carbonate. Among these, diphenyl carbonate and substituted diphenyl carbonates are preferred, and particularly diphenyl carbonate is more preferred. These carbonic acid diesters may be used alone, or two or more of the carbonic acid diesters may be combined with each other at any ratio.

The ratio of the dihydroxy compound to the carbonic acid diester is not particularly limited provided that a desired polycarbonate resin can be produced. Preferably 1 or more, more preferably 1.01 or more, mol of the carbonic acid diester is used relative to 1 mol of the dihydroxy compound. The upper limit is generally 1.30 mol or less. Within the range, the number of terminal hydroxy groups can be controlled within a suitable range.

In polycarbonate resins, the number of terminal hydroxy groups tends to significantly affect their thermal stability, hydrolytic stability, and color tone. Therefore, the number of terminal hydroxy groups may be optionally controlled by a known method. In transesterification, the mixing ratio of the carbonic acid diester to the dihydroxy compound and the degree of vacuum in transesterification are generally controlled to produce a polycarbonate resin having a controlled number of terminal hydroxy groups. In general, this procedure also allows the control of the molecular weights of polycarbonate resins produced.

When the number of terminal hydroxy groups is controlled using the mixing ratio of the carbonic acid diester to the dihydroxy compound, the mixing ratio is as described above.

A more active control method is a method in which a terminating agent is separately mixed during the reaction. Examples of the terminating agent include monovalent phenols, monovalent carboxylic acids, and carbonic acid diesters. These terminating agents may be used alone, or two or more of the terminating agents may be combined with each other at any ratio.

The production of polycarbonate resins by the melt transesterification method generally employs a transesterification catalyst. Any transesterification catalyst may be used. Among others, for example, an alkali metal compound and/or an alkaline-earth metal compound is preferably used. In an auxiliary manner, for example, a basic compound, such as a basic boron compound, a basic phosphorus compound, a basic ammonium compound, or an amine compound, may be used together. These transesterification catalysts may be used alone, or two or more of the transesterification catalysts may be combined with each other at any ratio.

In the melt transesterification method, the reaction temperature generally ranges from 100° C. to 320° C. The reaction pressure is generally a reduced pressure of 2 mmHg or less. Specifically, a melt polycondensation reaction may be performed under the conditions described above while removing by-products, such as an aromatic hydroxy compound.

The melt polycondensation reaction may be performed batchwise or continuously. In a batchwise reaction, a reaction substrate, a reaction medium, a catalyst, and an additive agent are mixed in any order provided that a desired aromatic polycarbonate resin can be produced. Thus, the order may be appropriately determined. In consideration of the stability or the like of polycarbonate resins and polycarbonate resin compositions produced, the melt polycondensation reaction is preferably performed continuously.

The melt transesterification method may optionally employ a catalyst deactivator. The catalyst deactivator may be any compound that can neutralize the transesterification catalyst. Examples of the catalyst deactivator include sulfur-containing acidic compounds and the derivatives thereof. These catalyst deactivators may be used alone, or two or more of the catalyst deactivators may be combined with each other at any ratio.

The amount of catalyst deactivator to be used is generally 0.5 equivalents or more and preferably 1 equivalent or more and generally 10 equivalents or less and preferably 5 equivalents or less with respect to an alkali metal or alkaline-earth metal contained in the transesterification catalyst. The amount of catalyst deactivator to be used is generally 1 ppm or more and generally 100 ppm or less and preferably 20 ppm or less with respect to the polycarbonate resin.

[2-4. Other Matters Regarding Polycarbonate Resin]

The molecular weight of the polycarbonate resin used in the first aspect of the present invention is not particularly limited and may be appropriately determined. The viscosity-average molecular weight [Mv] converted from the solution viscosity is generally 10000 or more, preferably 16000 or more, and more preferably 18000 or more and generally 40000 or less and preferably 30000 or less. The viscosity-average molecular weight not less than the above-described lower limit results in improved mechanical strength of the polycarbonate resin composition according to the first aspect of the present invention. This is therefore more preferred in applications that require high mechanical strength. The viscosity-average molecular weight not more than the above-described upper limit results in the suppression of reduction in the flowability of the polycarbonate resin composition according to the first aspect of the present invention, improving shaping processability and facilitating shape processing. Two or more polycarbonate resins having different viscosity-average molecular weights may be used in combination. In this case, polycarbonate resins having viscosity-average molecular weights outside the suitable range described above may be mixed.

The viscosity-average molecular weight [Mv] is a value determined by measuring the intrinsic viscosity [η](dl/g) with an Ubbelohde viscometer at a temperature of 20° C. using methylene chloride as a solvent and calculating Mv from the Schnell's viscosity equation $\eta=1.23\times10^{-4}Mv^{0.83}$. The intrinsic viscosity [η] is a value determined by measuring the specific viscosities [$\eta_{sp}$] at different solution concentrations [0] (g/dl) and calculating $\eta$ from the following formula.

$$\eta = \lim_{c \to 0} \eta_{sp}/c$$

The terminal hydroxyl group concentration of the polycarbonate resin is not particularly limited and may be appropriately determined. The terminal hydroxyl group concentration of the polycarbonate resin is generally 1000 ppm or less, preferably 800 ppm or less, and more preferably 600 ppm or less. The terminal hydroxyl group concentration not more than the upper limit results in further improved thermal stability in residence and color tone of the polycarbonate resin composition according to the first aspect of the present invention. The lower limit, particularly for polycarbonate resins produced by the melt transesterification method, is generally 10 ppm or more, preferably 30 ppm or more, and more preferably 40 ppm or more. The terminal hydroxyl group concentration not less than the lower limit results in the suppression of reduction in the molecular weight and further improved mechanical properties of the polycarbonate resin composition according to the first aspect of the present invention.

The terminal hydroxyl group concentration is the weight ratio of the terminal hydroxyl group to the polycarbonate resin expressed in ppm. The measurement method of the terminal hydroxyl group concentration is colorimetry that uses a titanium tetrachloride/acetic acid method (a method described in Macromol. Chem. 88 215 (1965)).

The polycarbonate resin may be a polycarbonate resin alone (the term "a polycarbonate resin alone" includes not only an aspect involving only one type of polycarbonate resin, but also an aspect involving multiple types of polycarbonate resins, for example, having different monomer compositions, molecular weights, or physical properties) or may be an alloy (mixture) of a polycarbonate resin and another thermoplastic resin. For example, the polycarbonate resin may be a copolymer mainly composed of a polycarbonate resin: for example, for the purpose of further improving flame resistance and impact resistance, a copolymer with an oligomer or polymer having a siloxane structure; for the purpose of further improving thermo-oxidative stability and flame resistance, a copolymer with a monomer, oligomer, or polymer having a phosphorus atom; for the purpose of improving thermo-oxidative stability, a copolymer with a monomer, oligomer, or polymer having a dihydroxy anthraquinone structure; for the purpose of improving optical properties, a copolymer with an oligomer or polymer having an olefin structure, such as polystyrene; or for the purpose of improving chemical resistance, a copolymer with a polyester resin oligomer or polymer.

Furthermore, in order to improve the appearance and flowability of formed products, the polycarbonate resin may contain a polycarbonate oligomer. The polycarbonate oligomer generally has a viscosity-average molecular weight [Mv] of 1500 or more and preferably 2000 or more and generally 9500 or less and preferably 9000 or less. In this case, the content of the polycarbonate oligomer in the polycarbonate resin composition according to the first aspect of the present invention is preferably 30% by mass or less of the polycarbonate resin (including the polycarbonate oligomer).

The polycarbonate resin may be not only made of virgin raw materials but also a polycarbonate resin regenerated from used products (so-called material-recycled polycarbonate resin). Examples of the used products include optical recording media, such as optical disks; light guide plates; vehicle transparent members, such as automobile window glass, automobile headlight lenses, and windshields; containers, such as water bottles; eyeglass lenses; and architectural members, such as sound barriers, glass windows, and corrugated sheets. Moreover, for example, nonconforming products, ground products obtained from a sprue, a runner, and the like, and pellets manufactured by melting such products may also be used.

The amount of regenerated polycarbonate resin is preferably 80% by mass or less and more preferably 50% by mass or less of the polycarbonate resin contained in the polycarbonate resin composition according to the first aspect of the present invention. This is because regenerated polycarbonate resins are likely to have undergone degradation, such as thermal degradation or aging degradation, and use of such a polycarbonate resin more than the upper limit can cause a deterioration in hue and mechanical properties.

[3. Polycarbosilane Compound]

The polycarbonate resin composition according to the first aspect of the present invention contains a polycarbosilane compound, that is, a silicon compound having a silicon-carbon bond in the main chain. In the first aspect of the present invention, the polycarbosilane compound can improve surface properties, such as water repellency, oil repellency, anti-fogging properties, anti-fouling properties, stain removability, moisture resistance, lubricity, abrasion resistance, mold releasability, chemical resistance, and scratch resistance, without adversely affecting the characteristics of the polycarbonate resin composition according to the first aspect of the present invention. A polycarbonate resin composition having higher transparency, impact resistance, and heat resistance and causing less outgassing and mold fouling can be produced using a polycarbosilane compound according to the first aspect of the present invention compared with the case where a conventional organosiloxane (silicone) compound or polysilane compound is used. The reason for this is described below.

Conventional organosiloxanes (silicones) are silicon compounds having a silicon-oxygen bond as the main chain. Polysilane compounds are silicon compounds having a silicon-silicon bond as the main chain. These silicon compounds therefore have highly inorganic characteristics and consequently poor compatibility with and dispersibility in polycarbonate resins, which are organic resins. Thus, these silicon compounds tend to cause poor mechanical properties, such as impact resistance, and poor transparency.

In particular, since organosiloxanes generally have low melting points, the blend of the organosiloxanes with polycarbonate resins tends to cause low heat resistance of their resin compositions and increased outgassing, which easily causes mold fouling. Use of organosiloxanes having lower molecular weights so as to achieve higher transparency increases outgassing and mold fouling. Although polysilane compounds tend to be better in terms of heat resistance than organosiloxane compounds, because of the same reasons as described above, use of the polysilane compounds results in markedly poor mechanical properties, possibly low transparency, and increased outgassing and mold fouling.

In contrast, polycarbosilane compounds having a silicon-carbon bond in the main chain contain an organic moiety (organic residue) in the main chain and have more organic characteristics. Polycarbosilane compounds therefore have much higher dispersibility in polycarbonate resins than organosiloxanes or polysilane compounds and have excellent surface modifying effects without causing deterioration in mechanical properties, such as impact resistance, and transparency. Furthermore, a polycarbosilane compound according to the first aspect of the present invention has high heat resistance, resulting in reduced deterioration in the heat resistance of a polycarbonate resin composition and markedly reduced outgassing and mold fouling.

A polycarbosilane compound according to the first aspect of the present invention may contain a bond between a silicon atom and an atom other than carbon in the main chain without departing from the object of the first aspect of the present invention. Examples of such a bond include a silicon-silicon (Si—Si) bond, a silicon-oxygen (Si—O) bond, a silicon-nitrogen (Si—N) bond, a silicon-boron (Si—B) bond, a silicon-phosphorus (Si—P) bond, and a silicon-titanium (Si—Ti) bond. Such a bond may be introduced from components, such as raw materials and catalysts, or may be unintentionally introduced by oxidation or other actions during the production of silicon compounds substantially having a silicon-carbon bond alone.

A polycarbosilane compound used in the first aspect of the present invention may have any chemical structure and morphology provided that the polycarbosilane compound has two or more repeating units having a silicon-carbon bond (Si—C bond) in the main chain. The polycarbosilane compound is preferably a silicon compound having a main chain structure in which silicon or a silicon-silicon bond unit and a hydrocarbon residue are alternately linked to each other, particularly a silicon compound having a main chain structure containing at least one of structural units represented by the following formulae (1) to (3) and a hydrocarbon residue.

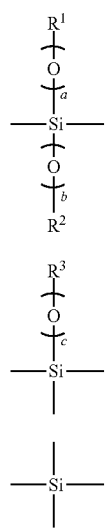

(1)

(2)

(3)

In the formulae (1) to (3), $R^1$, $R^2$, and $R^3$ each independently represent a monovalent hydrocarbon group, a hydrogen atom, or a silyl group; a, b, and c each independently represent 0 or 1; and a plurality of $R^1$s, $R^2$s and $R^3$s in the main chain structure may each be the same or different.

Examples of such a polycarbosilane compound include linear or cyclic polycarbosilane compounds having a structural unit represented by the formula (1) and a hydrocarbon residue, branched or network polycarbosilane compounds having a structural unit represented by the formula (2) or (3) and a hydrocarbon residue, and polycarbosilane compounds having a combination of structural units represented by the formulae (1) to (3), for example, a combination of the formula (1) and the formula (2), the formula (1) and the formula (3), the formula (2) and the formula (3), or the formulae (1) to (3), and a hydrocarbon residue. In particular, linear polycarbosilane compounds having a main chain structure containing the structural unit represented by the formula (1) and a divalent hydrocarbon residue are preferred because they tend to have high dispersibility in polycarbonate resins. The linear polycarbosilane compounds may have a branched or network structure.

The linear polycarbosilane compounds having a main chain structure containing a structural unit represented by the formula (1) and a divalent hydrocarbon residue are preferably those having a repeating unit represented by the following formula (4):

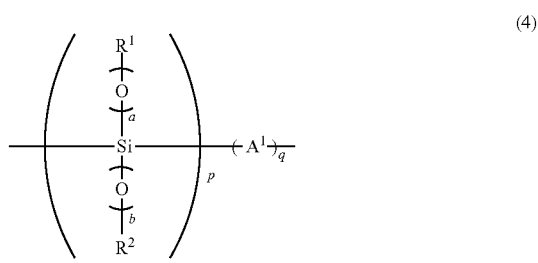

(4)

In the formula (4), $R^1$, $R^2$, a, and b are as defined in the formula (1); $A^1$ represents a divalent hydrocarbon group having 1 to 12 carbon atoms; p and q each independently represent an integer of 1 to 8; and $R^1$s, $R^2$s, and $A^1$s in all the repeating units may each be the same or different.

In the formula (4), p and q each independently represent an integer of 1 to 8, preferably 1 to 4, more preferably 1 or 2, and still more preferably 1.

Such linear polycarbosilane compounds are preferably those having a repeating unit represented by the following formula (5). Such a linear structure tends to improve the dispersibility in polycarbonate resins and the transparency and mechanical properties of the polycarbonate resin composition according to the first aspect of the present invention.

(5)

In the formula (5), $R^1$ and $R^2$ are as defined in the formula (4), $A^2$ represents an alkylene group having 1 to 12 carbon atoms, and $R^1$s, $R^2$s, and $A^2$s in all the repeating units may each be the same or different.

In the formulae (1) to (5), the groups represented by $R^1$, $R^2$, and $R^3$ represent at least one selected from a monovalent hydrocarbon group, a hydrogen atom, and a silyl group. Examples of the monovalent hydrocarbon group include alkyl groups, cycloalkyl groups, alkenyl groups, cycloalkenyl groups, alkynyl groups, aryl groups, and aralkyl groups. Among these, alkyl groups and aryl groups are preferred, alkyl groups are more preferred, and a methyl group is particularly preferred. The substituents represented by $R^1$, $R^2$, and $R^3$ in all the repeating units may each be the same or different.

Examples of the alkyl groups include a methyl group, an ethyl group, a propyl group, an isopropyl group, a butyl group, a t-butyl group, a pentyl group, a hexyl group, an octyl group, a decyl group, and a dodecyl group. In general, alkyl groups having 1 to 12 carbon atoms are preferred. Among these, alkyl groups having 1 to 6 carbon atoms, such as a methyl group, an ethyl group, a propyl group, an isopropyl group, a butyl group, a t-butyl group, a pentyl group, and a hexyl group, are preferred. A methyl group is particularly preferred.

Examples of the cycloalkyl groups include cycloalkyl groups having 5 to 14 carbon atoms, such as a cyclopentyl group and a cyclohexyl group. Among these, cycloalkyl groups having 5 to 8 carbon atoms are preferred.

Examples of the alkenyl groups include alkenyl groups having 2 to 8 carbon atoms, such as a vinyl group and an allyl group. Examples of the cycloalkenyl groups include cycloalkenyl groups having 5 to 12 carbon atoms, such as a cyclopentyl group and a cyclohexyl group.

Examples of the alkynyl groups include alkynyl groups having 2 to 8 carbon atoms, such as an ethynyl group and a propynyl group, and arylalkynyls, such as an ethynylbenzene group.

Examples of the aryl groups include aryl groups having 6 to 20 carbon atoms, such as a phenyl group, a methylphenyl (or tolyl) group, a dimethylphenyl (or xylyl) group, and a naphthyl group. Among these, aryl groups having 6 to 10 carbon atoms are preferred, and a phenyl group is particularly preferred.

Examples of the aralkyl groups include aralkyl groups having 6 to 20 carbon atoms, such as a benzyl group, a phenethyl group, and a phenylpropyl group. Among these, aralkyl groups having 6 to 10 carbon atoms are preferred, and a benzyl group is particularly preferred.

Examples of the silyl groups include silyl groups having 1 to 10 silicon atoms, such as a silyl group, a disilanyl group, and a trisilanyl group. Among these, silyl groups having 1 to 6 silicon atoms are preferred. In the case of the silyl group, at least one of the hydrogen atoms may be substituted with a functional group, such as an alkyl group, an aryl group, or an alkoxy group.

In the formulae (1) to (5), the substituents represented by $R^1$, $R^2$, and $R^3$ each independently represent more preferably a monovalent hydrocarbon group or a hydrogen atom, still more preferably an alkyl group or a hydrogen atom, and particularly preferably a methyl group or a hydrogen atom.

In the formulae (1) to (4), a, b, and c represent 0 or 1. The case where each of a, b, and c is 0 means that the silicon atoms of the polycarbosilane compound have an alkyl group, a cycloalkyl group, an alkenyl group, a cycloalkenyl group, an alkynyl group, an aryl group, an aralkyl group, or a silyl group as a substituent or are unsubstituted (have hydrogen atoms). The case where each of a, b, and c is 1 means that the silicon atoms of the polycarbosilane compound have an alkoxy group, a cycloalkyloxy group, an alkenyloxy group, a cycloalkenyloxy group, an alkynyloxy group, an aryloxy group, an aralkyloxy group, or a hydroxyl group as a substituent. Although each of a, b, and c is preferably 0 in terms of the heat resistance of the polycarbosilane compound, each of a, b, and c may intentionally be 1 to improve an affinity for resins or unintentionally be 1 by oxidation or other actions.

The hydrocarbon residue to be bonded to the structural units represented by the formulae (1) to (3) to form a main chain structure of the polycarbosilane compound is not particularly limited, may have a straight chain, a branched chain, or a cyclic structure, and may include not only a saturated bond but also an unsaturated bond. In addition to a carbon atom and a hydrogen atom, the hydrocarbon residue may contain a heteroatom, such as an oxygen atom, a nitrogen atom, a sulfur atom, a phosphorus atom, or a fluorine atom.

Among these, divalent to tetravalent hydrocarbon groups are preferred, and divalent hydrocarbon groups are particularly preferred.

Specific examples of the divalent hydrocarbon residue to be bonded to the structural units represented by the formulae (1) to (3) to form the main chain structure of the polycarbosilane compound include the following linear or branched divalent hydrocarbon residues:

alkylene groups having 1 to 12 carbon atoms, such as a methylene group, an ethylene group, a trimethylene group, a propylene group, an isopropylidene group, a tetramethylene group, an isobutylene group, a tert-butylene group, an isobutylene group, a pentamethylene group, a hexamethylene group, and an octamethylene group;

alkylidene groups having 2 to 12 carbon atoms, such as an ethylidene group, a propylidene group, a butylidene group, a sec-butylidene group, and an isohexylidene group;

cycloalkylene groups having 3 to 12 carbon atoms, such as a cyclopentylene group, a cyclohexylene group, a methylcyclohexylene group, a trimethylcyclohexylene group, a cycloheptylene group, a cyclooctylene group, a cyclononylene group, and a cyclodecylene group;

alkenylene groups having 2 to 12 carbon atoms, such as a vinylene group, a propenylene group, a 1-butenylene group, a 2-butenylene group, a 1,3-butadienylene group, a 1-methylpropenylene group, a 1-methyl-2-propenylene group, a 1-pentenylene group, a 2-pentenylene group, a 1,3-pentadienylene group, a 1,4-pentadienylene group, a 1-methylbutenylene group, a 1-methyl-1,2-butadienylene group, a 1-hexenylene group, a 2-hexenylene group, a 3-hexenylene group, a 1-methylpentenylene group, a 2-methyl-2-pentenylene group, a 1,1-dimethyl-2-propenylene group, a 1-ethyl-2-propenylene group, a 1,2-dimethylpropenylene group, a 1-methyl-1-butenylene group, a 1-heptenylene group, a 1-methylhexenylene group, a 2-methyl-2-hexenylene group, a 1,2-dimethylpentenylene group, a 1-octenylene group, a 2-octenylene group, a 3-nonenylene group, and a 4-decenylene group;

alkenylidene groups having 2 to 12 carbon atoms, such as a vinylidene group, a propynylidene group, and an allylidene group;

cycloalkenylene groups having 3 to 12 carbon atoms, such as a 1-cyclopropenylene group, a 2-cyclopentenylene group, a 2,4-cyclopentadienylene group, a 1-cyclohexenylene group, a 2-cyclohexenylene group, a 1-cycloheptenylene group, a 2-cyclononenylene group, a 3-cyclodecenylene group, and a 2-cyclododecenylene group;

alkynylene groups having 2 to 12 carbon atoms, such as an ethynylen group, a 1,3-(1-propynylene) group, a 3,3-(1-propynylene) group, a 1,4-(1-butynylene) group, a 1,5-(1-pentynylene) group, a 1,6-(1-hexynylene) group, and a 1,12-(1-dodecynylene) group;

arylene groups having 6 to 12 carbon atoms, such as an o-phenylene group, a m-phenylene group, a p-phenylene group, a methylphenylene group, a dimethylphenylene group, a p-xylene-α,α'-diyl group, a biphenylene group, and a naphthylene group; and aralkylene groups having 6 to 12 carbon atoms, such as —$CH_2$—$C_6H_4$—, —$CH_2$—$C_6H_4CH_2$—, —$CH_2CH_2$—$C_6H_4$—, —$CH_2CH_2$—$C_6H_4$—$CH_2$—, —$CH_2CH_2CH_2$—$C_6H_4$—, —$CH(CH_3)$ $CH_2$—$C_6H_4$—, —$CH_2CH_2CH_2CH_2$—$C_6H_4$—, and —$CH_2CH_2CH(CH_3)$—$C_6H_4$—.

Examples of the trivalent hydrocarbon group to be bonded to the structural units represented by the formulae (1) to (3) to form the main chain structure of the polycarbosilane compound include hydrocarbon groups represented by the following formulae (15) and (16).

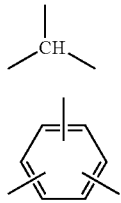
(15)

(16)

An example of the tetravalent hydrocarbon group to be bonded to the structural units represented by the formulae (1) to (3) to form the main chain structure of the polycarbosilane compound is a hydrocarbon group represented by the following formula (17).

(17)

As described above, the hydrocarbon residue is preferably a divalent hydrocarbon group. Among these, an alkylene group, an alkenylene group, an alkynylene group, or an arylene group is preferred, an alkylene group or an arylene group is particularly preferred, and an alkylene group is most preferred. The alkylene group is more preferably an alkylene group having 1 to 8 carbon atoms, particularly preferably an alkylene group having 1 to 4 carbon atoms, and most preferably a methylene group.

$A^1$ in the formula (4) represents a linear or branched divalent hydrocarbon group having 1 to 12 carbon atoms and, more specifically, the divalent hydrocarbon residue described above. $A^2$ in the formula (5) represents an alkylene group having 1 to 12 carbon atoms and, more specifically, the alkylene group having 1 to 12 carbon atoms described above. The alkylene groups of $A^1$ and $A^2$ are more preferably alkylene groups having 1 to 8 carbon atoms, particularly preferably alkylene groups having 1 to 4 carbon atoms, and most preferably a methylene group.

Examples of the polycarbosilane compound used in the first aspect of the present invention include those having repeating units described below. However, the polycarbosilane compound is not limited to these examples. The polycarbonate resin composition according to the first aspect of the present invention may contain only one polycarbosilane compound or any combination of two or more polycarbosilane compounds at any ratio.

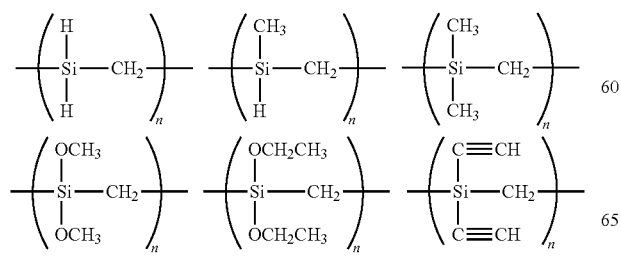

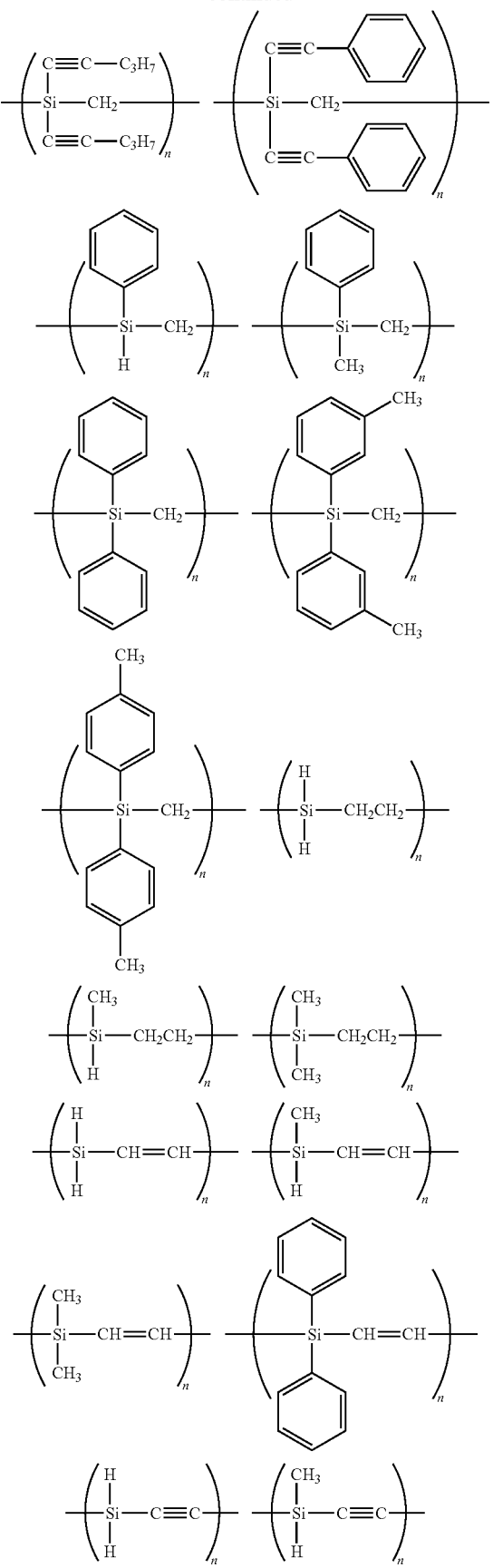

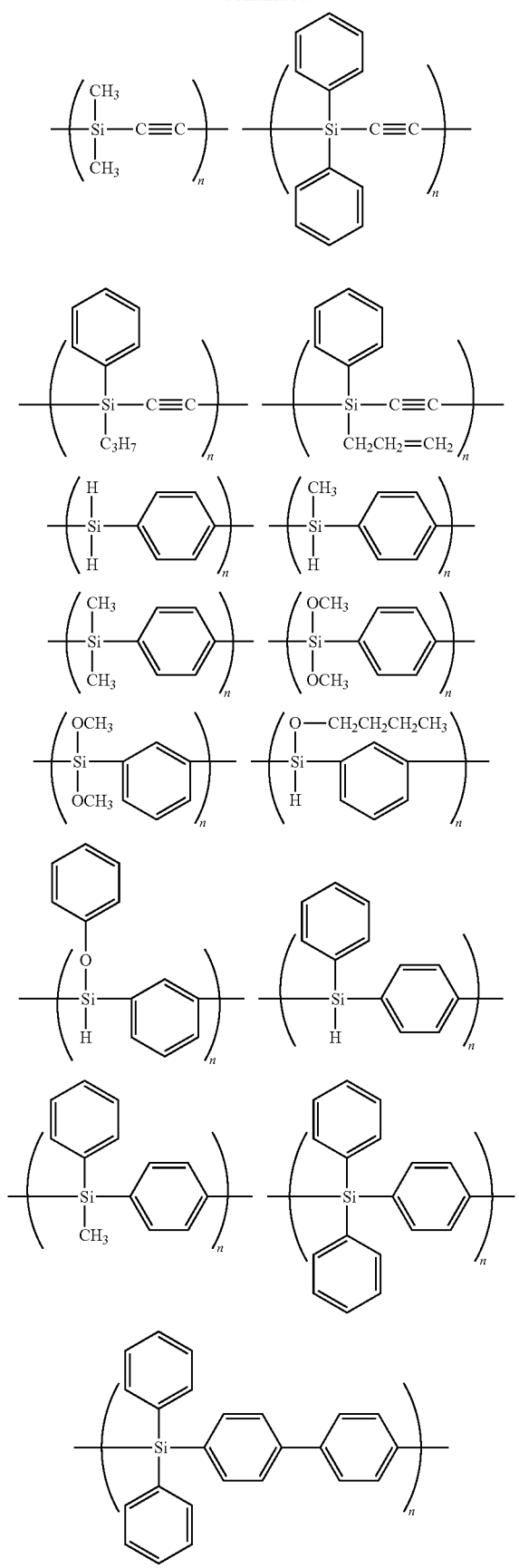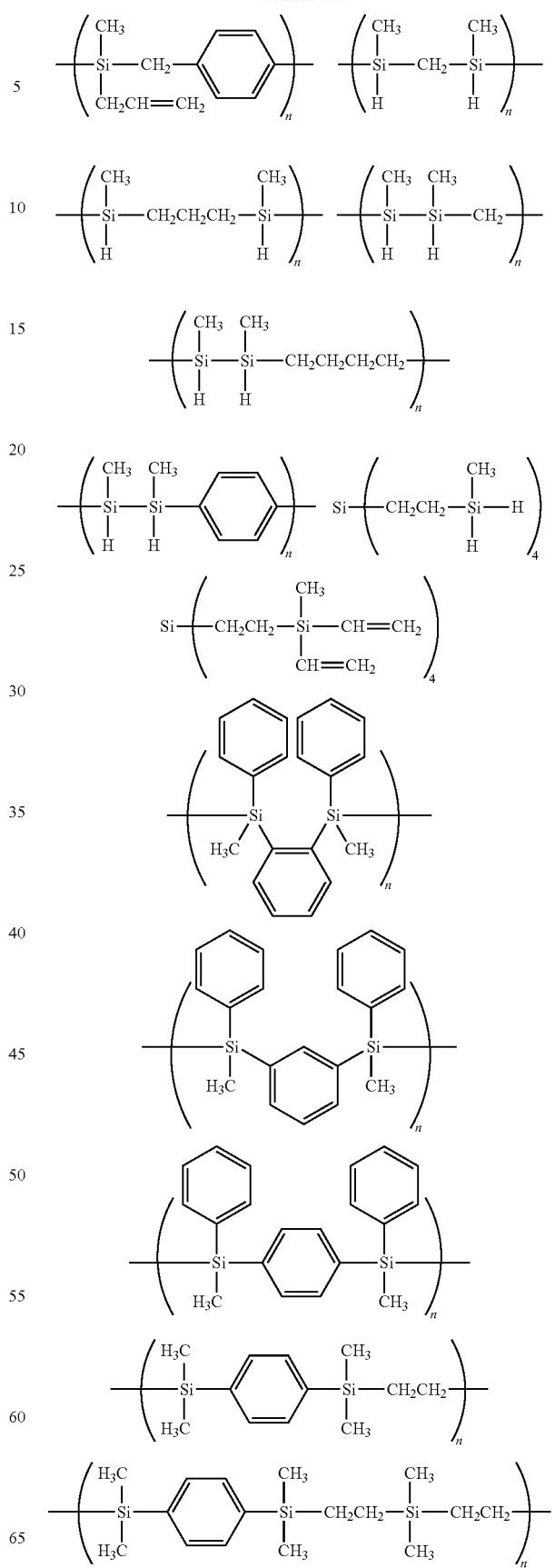

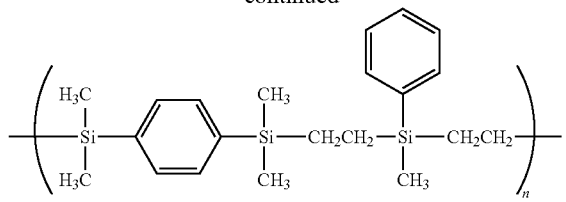

Among these, polycarbosilane compounds having a repeating unit represented by the following formula (6) are particularly preferred. Such polycarbosilane compounds can be easily produced by the thermal decomposition of polydimethylsilanes with high yields and thus provide great industrial advantages.

In the exemplary formulae above, n represents the degree of polymerization of the polycarbosilane compound and is generally 2 or more, more preferably 3 or more, particularly preferably 5 or more, and still more preferably 10 or more and generally 20000 or less, more preferably 5000 or less, particularly preferably 1000 or less, and still more preferably 500 or less. Herein, n not less than the lower limit can result in reduced outgassing and mold fouling in the polycarbonate resin composition according to the first aspect of the present invention and is therefore preferred. On the other hand, n not more than the upper limit results in improved dispersibility in the polycarbonate resin according to the first aspect of the present invention and tends to result in improved mechanical properties of the polycarbonate resin composition according to the first aspect of the present invention.

The molecular weight of the polycarbosilane compound according to the first aspect of the present invention is not particularly limited and may be appropriately determined. The number-average molecular weight [Mn] of the polycarbosilane compound is generally 100 or more, preferably 200 or more, more preferably 300 or more, and particularly preferably 500 or more and generally 20000 or less, preferably 10000 or less, more preferably 5000 or less, and particularly preferably 3000 or less. The number-average molecular weight not less than the lower limit can result in reduced outgassing and mold fouling in the polycarbonate resin composition according to the first aspect of the present invention and is therefore preferred. The number-average molecular weight not more than the upper limit results in the suppression of reduction in the flowability of the polycarbonate resin composition according to the first aspect of the present invention, improving shaping processability and facilitating shape processing. The number-average molecular weight not more than the upper limit also tends to result in improved mechanical properties. Two or more polycarbosilane compounds having different number-average molecular weights may be used in combination. In this case, polycarbosilane compounds having number-average molecular weights outside the suitable range described above may be mixed.

The number-average molecular weight [Mn], as used herein, is a value measured by gel permeation chromatography (GPC) (apparatus: Tosho 8020, column: Tosoh TSKgel Multipore Hxl-M) at a temperature of 40° C. using tetrahydrofuran as a solvent.

The melting point of the polycarbosilane compound according to the first aspect of the present invention is not particularly limited and may be appropriately determined. The melting point of the polycarbosilane compound is generally 20° C. or more, preferably 30° C. or more, more preferably 40° C. or more, and particularly preferably 60° C. or more and generally 500° C. or less, preferably 300° C. or less, more preferably 280° C. or less, and particularly preferably 260° C. or less. The melting point not less than the lower limit can result in reduced mold fouling in the polycarbonate resin composition according to the first aspect of the present invention and is therefore preferred. The melting point not more than the upper limit results in improved dispersibility in the polycarbonate resin according to the first aspect of the present invention and tends to result in improved mechanical properties of the polycarbonate resin composition according to the first aspect of the present invention. Two or more polycarbosilane compounds having different melting points may be used in combination. In this case, polycarbosilane compounds having melting points outside the suitable range described above may be mixed.

A method for producing a polycarbosilane compound according to the first aspect of the present invention is not particularly limited and may be appropriately determined. Among others, a direct synthesis method and a thermal decomposition method are exemplified.

An example of the direct synthesis method is a method in which at least one dihalogen silane and at least one dihalogen hydrocarbon are co-condensed in the presence of a catalyst, such as an alkali metal. In this case, the reaction is generally performed in a suspension of a catalyst, such as an alkali metal, using a solvent. Examples of the solvent for use in the suspension preferably include hydrocarbon solvents, more preferably toluene, xylene, and decalin. After other components (dihalogen silane and dihalogen hydrocarbon) are introduced in the catalyst suspension and the reaction is performed, an objective product can be obtained from the reaction mixture by an appropriate method. When the polycarbosilane compound is, for example, soluble in the solvent, other insoluble components may be removed by filtration. The polycarbosilane compound remaining in the solvent can be cleaned by washing with water and can be dried into a powder by removing the solvent. When the synthesized polycarbosilane compound is insoluble in the solvent, the polycarbosilane compound can be extracted with an appropriate solvent. Subsequently, the polycarbosilane compound can be cleaned by washing with water and can be dried into a powder by removing the solvent.

An example of the thermal decomposition method is a method in which a polycarbosilane compound is produced by pyrolytic conversion by heating an alkylsilane, such as tetramethylsilane, or a polysilane, such as polydimethylsilane (polymethylsilylene), at high temperature. The heating temperature generally ranges from 350° C. to 1000° C. and more preferably 400° C. to 800° C. Although the reaction may be performed under atmospheric pressure or high pressure, high pressure is preferred because the yield tends to increase. The addition of a catalytic amount of a boron compound, such as polyborodiphenylsiloxane, is also preferred. The amount of boron compound to be added is generally 0.1 parts by mass or more, preferably 0.2 parts by mass or more, and more preferably 0.5 parts by mass or more and generally 5 parts by mass or less, preferably 3 parts by mass or less, and more preferably 2 parts by mass or less relative to 100 parts by mass of the alkylsilane or polysilane. The boron compound content not less than the lower limit tends to result in an increased yield of the polycarbosilane compound according to the first aspect of the present invention. The boron compound content not more than the upper limit can result in a reduced oxygen content of the polycarbosilane compound according to the first aspect of the present invention and the suppression of reduction in heat resistance and dispersibility in polycarbonate resins.

Among these, a method for producing a polycarbosilane compound from the polysilane compound by the thermal decomposition method is preferred in terms of quality and cost as a method for producing a polycarbosilane compound according to the first aspect of the present invention. Two or more polycarbosilane compounds produced by different methods may be used in combination. In this case, polycarbosilane compounds produced by methods outside the suitable method described above may be mixed.

The content of the polycarbosilane compound in the polycarbonate resin composition according to the first aspect of the present invention is preferably 0.001 parts by mass or more, 0.005 parts by mass or more, more preferably 0.01 parts by mass or more, still more preferably 0.02 parts by mass or more, particularly preferably 0.05 parts by mass or more, and most preferably 0.1 parts by mass or more and preferably 20 parts by mass or less, more preferably 15 parts by mass or less, still more preferably 10 parts by mass or less, and particularly preferably 7.5 parts by mass or less relative to 100 parts by mass of the polycarbonate resin. An excessively low content of polycarbosilane compound can result in insufficient effects of modifying surface properties, such as water repellency, oil repellency, anti-fogging properties, anti-fouling properties, stain removability, moisture resistance, lubricity, abrasion resistance, mold releasability, chemical resistance, and scratch resistance. On the other hand, at an excessively high content of polycarbosilane compound, its effects may be leveled off and thus its use may be uneconomical, and also the polycarbonate resin composition may have low mechanical strength.

The polycarbosilane compound according to the first aspect of the present invention may be used alone or in combination.

[4. Other Components]

The polycarbonate resin composition according to the first aspect of the present invention may optionally contain components other than those described above provided that desired physical properties are not deteriorated significantly. Examples of the other components include resins other than polycarbonate resins and various resin additive agents. The other components may be contained alone, or two or more of the other components may be contained at any ratio.

<Other Resins>

Examples of other resins that can be blended together with a polycarbonate resin in the polycarbonate resin composition according to the first aspect of the present invention include:

thermoplastic polyester resins, such as a polyethylene terephthalate resin (PET resin), polytrimethylene terephthalate (PTT resin), a polybutylene terephthalate resin (PBT resin), polylactic acid (PLA), a polybutylene succinate resin (PBS), and polycaprolactone (PCL);

styrene resins, such as a polystyrene resin (PS resin), a high-impact polystyrene resin (HIPS), an acrylonitrile-styrene copolymer (AS resin), an acrylonitrile-butadiene-styrene copolymer (ABS resin), an acrylonitrile-styrene-acrylic rubber copolymer (ASA resin), and an acrylonitrile-ethylene propylene rubber-styrene copolymer (AES resin);

polyolefin resins, such as a polyethylene resin (PE resin), a polypropylene resin (PP resin), a cyclic cycloolefin resin (COP resin), and a cyclic cycloolefin copolymer resin (COC resin);

polyamide resins (PA resins); polyimide resins (PI resins); polyetherimide resins (PEI resins); polyurethane resins (PU resins); polyphenylene ether resins (PPE resins); polyphenylene sulfide resins (PPS resins); polysulfone resins (PSU resins); and polymethyl methacrylate resins (PMMA resins).

The other resins may be contained alone, or two or more of the other resins may be contained at any ratio.

<Resin Additive Agents>

Examples of the resin additive agents include a flame retardant, a heat stabilizer, an antioxidant, a mold-release agent, an ultraviolet absorber, a dye or pigment, a flame retardant, an anti-dripping agent, an antistatic agent, an anti-fogging agent, a lubricant, an anti-blocking agent, a flow modifier, a sliding modifier, a plasticizer, a dispersant, and an antimicrobial agent. The resin additive agents may be contained alone, or two or more of the resin additive agents may be contained at any ratio.

Examples of the resin additive agents suitable for the polycarbonate resin composition according to the first aspect of the present invention will be more specifically described below.

[Flame Retardant]

Examples of the flame retardant include metal salt compounds, halides, and phosphorus compounds. Metal salt compounds can be suitably used.

The description of [3. Metal Salt Compound] in II. Second Aspect of the Present Invention described below can be applied to the metal salt compounds.

The content of metal salt compound serving as a flame retardant in the polycarbonate resin composition according to the first aspect of the present invention is preferably 0.01 parts by mass or more, more preferably 0.02 parts by mass or more, still more preferably 0.03 parts by mass or more, and particularly preferably 0.05 parts by mass or more and preferably 1 part by mass or less, more preferably 0.75 parts by mass or less, still more preferably 0.5 parts by mass or less, and particularly preferably 0.3 parts by mass or less relative to 100 parts by mass of the polycarbonate resin. An excessively low content of metal salt compound has insufficient effects of improving the flame resistance of the polycarbonate resin composition. On the other hand, an excessively high content of metal salt compound may result in reduced thermal stability of the polycarbonate resin composition and poor appearance and low mechanical strength of a formed product.

[Heat Stabilizer]

Examples of the heat stabilizer include phosphorus compounds.

Phosphorus compounds may be any known phosphorus compounds. Specific examples of the phosphorus compounds include phosphorus oxo acids, such as phosphoric acid, phosphonic acid, phosphorous acid, phosphinic acid, and polyphosphoric acid; acid pyrophosphate metal salts, such as sodium acid pyrophosphate, potassium acid pyrophosphate, and calcium acid pyrophosphate; phosphates of periodic table group 1 or 2B metal, such as potassium phosphate, sodium phosphate, cesium phosphate, and zinc phosphate; and organic phosphate compounds, organic phosphite compounds, and organic phosphonite compounds.

Among these, organic phosphite compounds represented by the following formulae (18) to (20), organic phosphonite compounds represented by the following formula (21), and organic phosphate compounds represented by the following formula (22) are preferred.

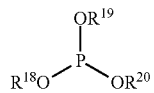  (18)

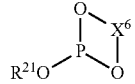  (19)

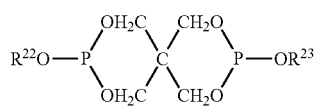  (20)

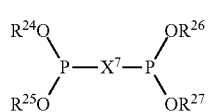  (21)

$O=P(OH)_d(OR^{28})_{3-d}$  (22)

In the formulae (18) to (22), $R^{18}$, $R^{19}$, $R^{20}$, $R^{21}$, $R^{22}$, $R^{23}$, $R^{24}$, $R^{25}$, $R^{26}$, $R^{27}$, and $R^{28}$ represent an alkyl group or an aryl group. Among these, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ more preferably represent an alkyl group generally having 1 or more, preferably 2 or more, and generally 30 or less, preferably 25 or less, carbon atoms, or an aryl group generally having 6 or more and 30 or less carbon atoms. $R^{18}$, $R^{19}$, $R^{20}$, $R^{21}$, $R^{22}$ and $R^{23}$ preferably represent an aryl group rather than an alkyl group. $R^{21}$, $R^{24}$, $R^{25}$, $R^{26}$, $R^{27}$, and $R^{28}$ preferably represent an alkyl group rather than an aryl group. $R^{18}$, $R^{19}$, $R^{20}$, $R^{21}$, $R^{22}$, $R^{23}$, $R^{24}$, $R^{25}$, $R^{26}$, $R^{27}$, and $R^{28}$ may be the same or different.

In the formulae (19) and (21), $X^6$ and $X^7$ represent an aryl residue having 6 to 30 carbon atoms. In the formula (22), d generally represents an integer of 0 or more and preferably 1 or more and generally 2 or less.

Examples of the organic phosphite compounds represented by the formula (18) include triphenyl phosphite, tris(mononylphenyl)phosphite, tris(mononyl/dinonyl.phenyl)phosphite, tris(2,4-di-tert-butylphenyl)phosphite, monooctyldiphenyl phosphite, dioctylmonophenyl phosphite, monodecyldiphenyl phosphite, didecylmonophenyl phosphite, tridecyl phosphite, trilauryl phosphite, and tristearyl phosphite. Specific examples of the organic phosphite compounds include "ADK STAB 1178" and "ADK STAB 2112" manufactured by Adeka Corp., "JP-351", "JP-360", and "JP-3CP" manufactured by Johoku Chemical Co., Ltd., and "Irgafos 168" manufactured by Ciba Specialty Chemicals Co., Ltd.

An example of the organic phosphite compounds represented by the formula (19) is 2,2-methylenebis(4,6-di-tert-butylphenyl)octyl phosphite. A specific example of the organic phosphite compounds is "ADK STAB HP-10" manufactured by Adeka Corp.

Examples of the organic phosphite compounds represented by the formula (20) include distearyl pentaerythritol diphosphite, bis(2,4-di-tert-butylphenyl)pentaerythritol diphosphite, and bis(2,6-di-tert-butyl-4-methylphenyl)pentaerythritol diphosphite. Specific examples of the organic phosphite compounds include "ADK STAB PEP-8", "ADK STAB PEP-24G", and "ADK STAB PEP-36" manufactured by Adeka Corp. and "JPP-2000" manufactured by Johoku Chemical Co., Ltd.

An example of the organic phosphonite compounds represented by the formula (21) is tetrakis(2,4-di-tert-butylphenyl)-4,4'-biphenylene-di-phosphonite. A specific example of the organic phosphonite compounds is "Sandostab P-EPQ" manufactured by Sandoz.

Examples of the organic phosphate compounds represented by the formula (22) include mono-stearic acid phosphate, di-stearic acid phosphate, mono-2-ethylhexyl acid phosphate, di-2-ethylhexyl acid phosphate, monooleyl acid phosphate, and di-oleyl acid phosphate. Specific examples of the organic phosphate compounds include "ADK STAB AX-71" manufactured by Adeka Corp. and "JP-508" and "JP-518-O" manufactured by Johoku Chemical Co., Ltd.

The heat stabilizers may be contained alone, or two or more of the heat stabilizers may be contained at any ratio.

The content of the heat stabilizer in the polycarbonate resin composition according to the first aspect of the present invention is generally 0.001 parts by mass or more, preferably 0.01 parts by mass or more, and more preferably 0.03 parts by mass or more and generally 1 part by mass or less, preferably 0.7 parts by mass or less, and more preferably 0.5 parts by mass or less relative to 100 parts by mass of the polycarbonate resin. A heat stabilizer content less than or equal to the lower limit may result in an insufficient heat stabilizing effect. At a heat stabilizer content more than the upper limit, its effect may be leveled off and thus its use may be uneconomical.

[Antioxidant]

An example of the antioxidant is a hindered phenol antioxidant. Specific examples of the antioxidant include pentaerythritol tetrakis[3-(3,5-di-tert-butyl-4-hydroxyphenyl)propionate], octadecyl-3-(3,5-di-tert-butyl-4-hydroxyphenyl)propionate, thiodiethylenebis[3-(3,5-di-tert-butyl-4-hydroxyphenyl)propionate], N,N'-hexane-1,6-diylbis[3-(3,5-di-tert-butyl-4-hydroxyphenylpropionamide), 2,4-dimethyl-6-(1-methylpentadecyl)phenol, diethyl[[3,5-bis(1,1-dimethylethyl)-4-hydroxyphenyl]methyl]phosphoate, 3,3',3",5,5',5"-hexa-tert-butyl-a,a',a"-(mesitylene-2,4,6-triyl)tri-p-cresol, 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trion, and 2,6-di-tert-butyl-4-(4,6-bis(octylthio)-1,3,5-triazine-2-ylamino)phenol.

Among these, pentaerythritol tetrakis[3-(3,5-di-tert-butyl-4-hydroxyphenyl)propionate] and octadecyl-3-(3,5-di-tert-butyl-4-hydroxyphenyl)propionate are preferred. Specific examples of the phenol antioxidant include "Irganox 1010" and "Irganox 1076" manufactured by Ciba Specialty Chemicals Co., Ltd. and "ADK STAB AO-50" and "ADK STAB AO-60" manufactured by Adeka Corp.

The antioxidants may be contained alone, or two or more of the antioxidants may be contained at any ratio.

The content of the antioxidant in the polycarbonate resin composition according to the first aspect of the present invention is generally 0.001 parts by mass or more and preferably 0.01 parts by mass or more and generally 1 part by mass or less and preferably 0.5 parts by mass or less relative to 100 parts by mass of the polycarbonate resin. An antioxidant content less than or equal to the lower limit may result in an insufficient antioxidant effect. At an antioxidant content more than the upper limit, its effect may be leveled off and thus its use may be uneconomical.

[Mold-Release Agent]

Examples of the mold-release agent include aliphatic carboxylic acids, esters of aliphatic carboxylic acids and alcohols, aliphatic hydrocarbon compounds having a number-average molecular weight of 200 to 15000, and polysiloxane silicone oils.

Examples of the aliphatic carboxylic acids include saturated and unsaturated aliphatic monovalent, divalent, and trivalent carboxylic acids. The aliphatic carboxylic acids include alicyclic carboxylic acids. Among these, preferred aliphatic carboxylic acids are monovalent and divalent carboxylic acids having 6 to 36 carbon atoms. Aliphatic saturated monovalent carboxylic acids having 6 to 36 carbon atoms are more preferred. Examples of the aliphatic carboxylic acids include palmitic acid, stearic acid, caproic acid, capric acid, lauric acid, arachidic acid, behenic acid, lignoceric acid, cerotic acid, melissic acid, tetrariacontanoic acid, montanic acid, adipic acid, and azelaic acid.

Examples of the aliphatic carboxylic acids in the esters of aliphatic carboxylic acids and alcohols include the aliphatic carboxylic acids described above. Examples of the alcohols include saturated and unsaturated monohydric and polyhydric alcohols. These alcohols may have a substituent, such as a fluorine atom or an aryl group. Among these, saturated monohydric and polyhydric alcohols having 30 or less carbon atoms are preferred, and aliphatic saturated monohydric alcohols and aliphatic saturated polyhydric alcohols each having 30 or less carbon atoms are more preferred. The aliphatics, as used herein, include alicyclic compounds.

Specific examples of the alcohols include octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, and dipentaerythritol.

The esters may contain an aliphatic carboxylic acid and/or an alcohol as an impurity. The esters may be pure substances or mixtures of a plurality of compounds. The aliphatic carboxylic acids and the alcohols to constitute the esters may be used alone or in any combination at any ratio.

The esters of aliphatic carboxylic acids and alcohols are classified into full esters in which all the carboxyl groups of the aliphatic carboxylic acid are esterified and partial esters in which the carboxyl groups are partly esterified. The esters of aliphatic carboxylic acids and alcohols used in the first aspect of the present invention may be full esters or partial esters.

Specific examples of the esters of aliphatic carboxylic acids and alcohols include beeswax (a mixture mainly composed of myricyl palmitate), stearyl stearate, behenyl behenate, stearyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate, and pentaerythritol tetrastearate.

Examples of the aliphatic hydrocarbons having a number-average molecular weight of 200 to 15000 include liquid paraffin, paraffin wax, microcrystalline wax, polyethylene wax, Fischer-Tropsch wax, and α-olefin oligomers having 3 to 12 carbon atoms. The aliphatic hydrocarbons include alicyclic hydrocarbons. These hydrocarbons may be partially oxidized.

Among these, paraffin wax, polyethylene wax, and partially oxidized polyethylene wax are preferred, and paraffin wax and polyethylene wax are more preferred.

The aliphatic hydrocarbons preferably have a number-average molecular weight of 5000 or less.

Each of the aliphatic hydrocarbons may be a single substance or a mixture of substances having different compositions and molecular weights provided that the main component is within the range described above.

Examples of the polysiloxane silicone oils include dimethyl silicone oil, methylphenyl silicone oil, diphenyl silicone oil, and fluorinated alkyl silicone.

The mold-release agents may be contained alone, or two or more of the mold-release agents may be contained at any ratio.

The content of the mold-release agent in the polycarbonate resin composition according to the first aspect of the present invention is generally 0.001 parts by mass or more and preferably 0.01 parts by mass or more and generally 2 parts by mass or less and preferably 1 part by mass or less relative to 100 parts by mass of the polycarbonate resin. A mold-release agent content less than or equal to the lower limit may result in insufficient mold releasability. A mold-release agent content more than the upper limit may result in low hydrolysis resistance and mold fouling during injection molding.

[Ultraviolet Absorber]

Examples of the ultraviolet absorber include inorganic ultraviolet absorbers, such as cerium oxide and zinc oxide; and organic ultraviolet absorbers, such as benzotriazole compounds, benzophenone compounds, salicylate compounds, cyanoacrylate compounds, triazine compounds, oxanilide compounds, malonate compounds, and hindered amine compounds. Among these, the organic ultraviolet absorbers are preferred, and benzotriazole compounds are more preferred. The organic ultraviolet absorbers can be used to improve the transparency and mechanical properties of the polycarbonate resin composition according to the first aspect of the present invention.

Specific examples of the benzotriazole compounds include 2-(2'-hydroxy-5'-methylphenyl)benzotriazole, 2-[2'-hydroxy-3',5'-bis(α,α-dimethylbenzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole), 2-(2'-hydroxy-3',5'-di-tert-amyl)-benzotriazole, 2-(2'-hydroxy-5'-tert-octylphenyl)benzotriazole, and 2,2'-methylenebis[4-(1,1,3,3-tetramethylbutyl)-6-(2N-benzotriazol-2-yl)phenol]. Among these, 2-(2'-hydroxy-5'-tert-octylphenyl)benzotriazole and 2,2'-methylenebis[4-(1,1,3,3-tetramethylbutyl)-6-(2N-benzotriazol-2-yl)phenol] are preferred, and 2-(2'-hydroxy-5'-tert-octylphenyl)benzotriazole is particularly preferred.

Examples of commercially available benzotriazole compounds include "Seesorb 701", "Seesorb 705", "Seesorb 703", "Seesorb 702", "Seesorb 704", and "Seesorb 709" manufactured by Shipro Kasei Kaisha Ltd., "Viosorb 520", "Viosorb 582", "Viosorb 580", and "Viosorb 583" manufactured by Kyodo Chemical Co., Ltd., "Kemisorb 71" and "Kemisorb 72" manufactured by Chemipro Kasei Kaisha, Ltd., "Cyasorb UV5411" manufactured by Cytec Industries Inc., "LA-32", "LA-38", "LA-36", "LA-34", and "LA-31" manufactured by Adeka Corp., and "Tinuvin P", "Tinuvin 234", "Tinuvin 326", "Tinuvin 327", and "Tinuvin 328" manufactured by Ciba Specialty Chemicals Co., Ltd.

Specific examples of the benzophenone compounds include 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-n-dodesiloxybenzophenone, bis(5-benzoyl-4-hydroxy-2-methoxyphenyl)methane, 2,2'-dihydroxy-4-methoxybenzophenone, and 2,2'-dihydroxy-4,4'-dimethoxybenzophenone.

Examples of commercially available benzophenone compounds include "Seesorb 100", "Seesorb 101", "Seesorb 101S", "Seesorb 102", "Seesorb 103" manufactured by Shipro Kasei Kaisha Ltd., "Viosorb 100", "Viosorb 110", and "Viosorb 130" manufactured by Kyodo Chemical Co., Ltd., "Kemisorb 10", "Kemisorb 11", "Kemisorb 11S", "Kemisorb 12", "Kemisorb 13", and "Kemisorb 111" manufactured by Chemipro Kasei Kaisha, Ltd., "Uvinul 400" manufactured by BASF, "Uvinul M-40" manufactured by BASF, "Uvinul MS-40" manufactured by BASF, "Cyasorb UV9", "Cyasorb UV284", "Cyasorb UV531", and "Cyasorb UV24" manufactured by Cytec Industries Inc., and "ADK STAB 1413" and "ADK STAB LA-51" manufactured by Adeka Corp.

Specific examples of salicylate compounds include phenyl salicylate and 4-tert-butylphenyl salicylate. Examples of commercially available salicylate compounds include "Seesorb 201" and "Seesorb 202" manufactured by Shipro Kasei Kaisha Ltd. and "Kemisorb 21" and "Kemisorb 22" manufactured by Chemipro Kasei Kaisha, Ltd.

Specific examples of cyanoacrylate compounds include ethyl-2-cyano-3,3-diphenyl acrylate and 2-ethylhexyl-2-cyano-3,3-diphenyl acrylate. Examples of commercially available cyanoacrylate compounds include "Seesorb 501" manufactured by Shipro Kasei Kaisha Ltd., "Viosorb 910" manufactured by Kyodo Chemical Co., Ltd., "Uvisolator 300" manufactured by Daiichi Kasei Co., Ltd., and "Uvinul N-35" and "Uvinul N-539" manufactured by BASF.

A specific example of the oxanilide compounds is 2-ethoxy-2'-ethyloxanilic acid bisanilide. An example of the commercially available oxanilide compounds include "Sanduvor VSU" manufactured by Clariant AG.

The malonate compounds are preferably 2-(alkylidene) malonates and more preferably 2-(1-arylalkylidene) malonates. Examples of commercially available malonate compounds include "PR-25" manufactured by Clariant (Japan) K.K. and "B-CAP" manufactured by Ciba Specialty Chemicals Co., Ltd.

The content of the ultraviolet absorber in the polycarbonate resin composition according to the first aspect of the present invention is generally 0.01 parts by mass or more and preferably 0.1 parts by mass or more and generally 3 parts by mass or less and preferably 1 part by mass or less relative to 100 parts by mass of the polycarbonate resin. An ultraviolet absorber content less than or equal to the lower limit may result in an insufficient effect of improving weatherability. An ultraviolet absorber content more than the upper limit results in the occurrence of mold deposit or the like, possibly causing mold fouling. The ultraviolet absorbers may be contained alone, or two or more of the ultraviolet absorbers may be contained at any ratio.

[Dye or Pigment]

Examples of the dye or pigment include inorganic pigments, organic pigments, and organic dyes.

Examples of the inorganic pigments include carbon black; sulfide pigments, such as cadmium red and cadmium yellow; silicate pigments, such as ultramarine blue; oxide pigments, such as titanium oxide, zinc white, red iron oxide, chromium oxide, iron black, titan yellow, zinc-iron brown, titanium cobalt green, cobalt green, cobalt blue, copper-chromium black, and copper-iron black; chromate pigments, such as chrome yellow and molybdate orange; and ferrocyanide pigments, such as iron blue.

Examples of the organic pigments and organic dyes include phthalocyanine dyes and pigments, such as copper phthalocyanine blue and copper phthalocyanine green; azo dyes and pigments, such as nickel azo yellow; thioindigo-based, perinone-based, perylene-based, quinoline-based, quinacridone-based, dioxazine-based, isoindolinone-based, and quinophthalone-based condensed polycyclic dyes and pigments; anthraquinone-based, heterocycle-based, and methyl-based dyes and pigments.

Among these, in terms of thermal stability, titanium oxide, carbon black, and cyanine-based, quinoline-based, anthraquinone-based, and phthalocyanine-based compounds are preferred.

The dyes and pigments may be contained alone, or two or more of the dyes and pigments may be contained at any ratio. The dye or pigment may be contained in a masterbatch together with a polystyrene resin, a polycarbonate resin, or an acrylic resin to improve handleability during extrusion and dispersibility in resin compositions.

The content of the dye or pigment in the polycarbonate resin composition according to the first aspect of the present invention is generally 5 parts by mass or less, preferably 3 parts by mass or less, and more preferably 2 parts by mass or less relative to 100 parts by mass of the polycarbonate resin. An excessively high content of dye or pigment may result in insufficient impact resistance.

[Anti-Dripping Agent]

Examples of the anti-dripping agent include fluoropolymers. Among these, fluoroolefin resins are preferred.

The description of [3. Fluoropolymer] in III. Third Aspect of the Present Invention described below can be applied to the fluoropolymers serving as anti-dripping agents.

The anti-dripping agents may be contained alone, or two or more of the anti-dripping agents may be contained at any ratio.

The content of the anti-dripping agent in the polycarbonate resin composition according to the first aspect of the present invention is generally 0.001 parts by mass or more, preferably 0.005 parts by mass or more, more preferably 0.01 parts by mass or more, and particularly preferably 0.02 parts by mass or more and generally 1 part by mass or less, preferably 0.5 parts by mass or less, more preferably 0.3 parts by mass or less, and particularly preferably 0.1 parts by mass or less relative to 100 parts by mass of the polycarbonate resin. An anti-dripping agent content less than or equal to the lower limit may result in insufficient effects on flame resistance produced by the anti-dripping agent. An anti-dripping agent content more than the upper limit may result in poor appearance, low mechanical strength, or significantly low transparency of formed products obtained by shaping the polycarbonate resin composition.

[5. Method for Producing Polycarbonate Resin Composition]

A method for producing the polycarbonate resin composition according to the first aspect of the present invention is not particularly limited. Various known methods for producing polycarbonate resin compositions can be employed.

A specific example is a method in which a polycarbonate resin, a polycarbosilane compound, and other components to be optionally blended are mixed in advance, for example, in a mixer, such as a tumbler or a Henschel mixer, and are melt-kneaded in a mixer, such as a Banbury mixer, a roll, a Brabender, a single-screw extruder, a twin-screw extruder, or a kneader.

Alternatively, for example, the components are not mixed in advance, or part of the components is mixed in advance, and the components are supplied to an extruder with a feeder and then melt-kneaded to produce the polycarbonate resin composition according to the first aspect of the present invention.

Alternatively, for example, part of the components is mixed in advance and is supplied to and melt-kneaded in an extruder to produce a resin composition as a masterbatch. This masterbatch is again mixed with the other components and melt-kneaded to produce the polycarbonate resin composition according to the first aspect of the present invention.

When a component that is difficult to disperse is mixed, the component that is difficult to disperse can be dissolved or dispersed in advance in a solvent, such as water or an organic solvent. The solution or dispersion liquid is kneaded with other components and thus high dispersibility can be achieved.

[6. Polycarbonate Resin Formed Product]

The polycarbonate resin composition according to the first aspect of the present invention can generally be formed into polycarbonate resin formed products having any shape. The shape, design, color, and size of the formed products are not particularly limited and may be appropriately determined in accordance with each application of the formed products.

Examples of the formed products include components of electrical and electronic devices, OA equipment, information terminals, mechanical parts, household electrical appliances, vehicle parts, architectural members, various containers, recreational equipment and miscellaneous articles, and illuminators. Among these, the formed products are suitably used for components of electrical and electronic devices, OA equipment, information terminals, household electrical appliances, and illuminators and are particularly suitably used for components of electrical and electronic devices.

Examples of the electrical and electronic devices include personal computers, game machines, display units, such as television sets, printers, copying machines, scanners, facsimiles, electronic notebooks and PDAs, electronic calculators, electronic dictionaries, cameras, video cameras, cellular phones, battery packs, recording medium drives and readers, mouses, numeric keypads, CD players, MD players, and portable radios and audio-players.

A method for manufacturing formed products is not particularly limited. Any common molding method for polycarbonate resin compositions can be employed. Examples of the common molding method include an injection molding method, an ultra-high-speed injection molding method, an injection compression molding method, a coinjection molding method, gas-assisted blow molding methods and the like, molding methods using insulated metal dies, molding methods using rapid heating metal dies, a foam molding (including supercritical fluid) method, an insert molding method, an IMC (in-mold coating molding) molding method, an extrusion molding method, a sheet forming method, a thermoforming method, a rotational molding method, a laminate molding method, and a press forming method. A hot-runner molding method may also be used.

The polycarbonate resin formed product according to the first aspect of the present invention obtained by shaping the polycarbonate resin composition according to the first aspect of the present invention has surface properties, such as water repellency, oil repellency, anti-fogging properties, anti-fouling properties, stain removability, moisture resistance, lubricity, abrasion resistance, mold releasability, chemical resistance, and scratch resistance, modified without adversely affecting the excellent intrinsic characteristics of polycarbonate resins. Thus, the polycarbonate resin formed product can be used as a practical formed product in a wide variety of applications.

[7. Modifier for Polycarbonate Resin]

The modifier for polycarbonate resins according to the first aspect of the present invention contains the polycarbosilane compound according to the first aspect of the present invention, preferably having a main chain structure containing at least one of structural units represented by the formulae (1) to (3) and a hydrocarbon residue, wherein the hydrocarbon residue is a divalent hydrocarbon group. More preferably, the modifier for polycarbonate resins contains a polycarbosilane compound having a repeating unit represented by the formula (4), particularly the formula (5), and more particularly the formula (6) and a number-average molecular weight of 100 to 20000. The modifier for polycarbonate resins is industrially quite useful in improving the surface properties of the polycarbonate resin composition, such as water repellency, oil repellency, anti-fogging properties, anti-fouling properties, stain removability, moisture resistance, lubricity, abrasion resistance, mold releasability, chemical resistance, and scratch resistance, without adversely affecting the intrinsic characteristics of polycarbonate resins, such as transparency, heat resistance, and mechanical properties, e.g., impact resistance.

II. Second Aspect of the Present Invention

[1. Overview]

A polycarbonate resin composition according to a second aspect of the present invention contains at least a polycarbonate resin, a metal salt compound, and a polycarbosilane compound. The polycarbonate resin composition according to the second aspect of the present invention may optionally contain other components.

Polycarbosilane compounds are compounds having two or more repeating units each having a silicon-carbon bond (Si—C bond) in their main chains. The polycarbosilane compound used in the second aspect of the present invention has the Si—C bond in its main chain and thus has excellent dispersibility in and compatibility with polycarbonate resins. Consequently, there can be solved the problems of existing polycarbonate resin compositions containing an organosiloxane (silicone) compound or a polysilane compound, such as degradations of transparency, impact resistance, and heat resistance, and outgassing and mold fouling.

[2. Polycarbonate Resin]

There is no limitation on the type of polycarbonate resin used in the polycarbonate resin composition according to the second aspect of the present invention. Polycarbonate resins may be used alone, or two or more polycarbonate resins may be combined with each other at any ratio.

Among these, the polycarbonate resin preferably contains a predetermined percentage of a polycarbonate resin having a structural viscosity index N within a predetermined range.

The polycarbonate resin in the second aspect of the present invention is a polymer having a basic structure having a carbonate bond represented by the following formula (7).

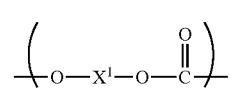

(7)

In the formula (7), $X^1$ generally represents a hydrocarbon group, and $X^1$ containing a heteroatom or a hetero bond for imparting various characteristics may be used.

Polycarbonate resins can be classified into aromatic polycarbonate resins in which each carbon directly bonded to the carbonate bond is aromatic carbon and aliphatic polycarbonate resins in which each carbon directly bonded to the carbonate bond is aliphatic carbon. Both aromatic polycarbonate resins and aliphatic polycarbonate resins may be used. Aromatic polycarbonate resins are preferred in terms of heat resistance, mechanical properties, and electrical characteristics.

The type of polycarbonate resin is not particularly limited. One example is a polycarbonate polymer produced through the reaction between a dihydroxy compound and a carbonate precursor. In addition to the dihydroxy compound and the carbonate precursor, a polyhydroxy compound may be involved in the reaction. Alternatively, carbon dioxide may be used as the carbonate precursor to react with a cyclic ether. The polycarbonate polymer may have a straight chain or a branched chain. The polycarbonate polymer may be a homopolymer composed of one repeating unit or a copolymer composed of two or more repeating units. The copolymer may be selected from various copolymerization forms, such as a random copolymer and a block copolymer. In general, such polycarbonate polymers are thermoplastic resins.

In the second aspect of the present invention, the above descriptions of [2-1. Dihydroxy Compound], [2-2. Carbonate Precursor], and [2-3. Method for Producing Polycarbonate Resin] in I. First Aspect of the Present Invention can be applied to [2-1. Dihydroxy Compound], [2-2. Carbonate Precursor], and [2-3. Method for Producing Polycarbonate Resin] of the polycarbonate resin, respectively.

The polycarbonate resin used in the second aspect of the present invention is preferably produced by the melt transesterification method described above, because such polycarbonate resins can be produced with relatively inexpensive and industrially available raw materials.

[2-4. Structural Viscosity Index of Polycarbonate Resin]

The polycarbonate resin in the second aspect of the present invention preferably contains at least a certain percentage of a polycarbonate resin having a structural viscosity index N within a predetermined range.

The structural viscosity index N is an index for evaluating the rheological characteristics of a molten substance. In general, the melt property of a polycarbonate resin can be expressed by the numerical formula: $\gamma = a \cdot \sigma^N$, wherein $\gamma$ represents the shear rate, a represents a constant, $\sigma$ represents the stress, and N represents the structural viscosity index.

In this numerical formula, N=1 indicates Newtonian flow, and an increase in N results in an increase in non-Newtonian flow. Thus, the rheological characteristics of a molten substance can be evaluated by the structural viscosity index N. In general, polycarbonate resins having a high structural viscosity index N tend to have a high melt viscosity in a low-shear region. Thus, a polycarbonate resin having a high structural viscosity index N can be mixed with another polycarbonate resin to suppress the dripping of the resulting polycarbonate resin composition during combustion, thereby improving flame resistance. In order to maintain high formability of the resulting polycarbonate resin composition, however, it is preferable that the structural viscosity index N of the polycarbonate resin is not excessively high.

Thus, the polycarbonate resin in the polycarbonate resin composition according to the second aspect of the present invention preferably contains at least a certain percentage of a polycarbonate resin, preferably an aromatic polycarbonate resin, having a structural viscosity index N of generally 1.2 or more, preferably 1.25 or more, and more preferably 1.28 or more and generally 1.8 or less and preferably 1.7 or less. A polycarbonate resin, particularly an aromatic polycarbonate resin, having a high structural viscosity index N can suppress the dripping of the polycarbonate resin composition according to the second aspect of the present invention during combustion, thereby improving flame resistance.

As described in, for example, Japanese Unexamined Patent Application Publication No. 2005-232442, the "structural viscosity index N" can also be expressed by $\text{Log } \eta_a = [(1-N)/N] \times \text{Log } \gamma + C$, from which the equation described above has been derived. In this equation, N represents the structural viscosity index, $\gamma$ represents the shear rate, C represents a constant, and $\theta_a$ represents the apparent viscosity. As shown by this equation, the N value can also be determined from $\gamma$ values and $\eta_a$ values in low-shear regions that are greatly different in viscosity behavior. For example, the N value can be determined from $\eta_a$ values at $\gamma = 12.16 \text{ sec}^{-1}$ and $\gamma = 24.32 \text{ sec}^{-1}$.

In the polycarbonate resin composition according to the second aspect of the present invention, it is desirable that the polycarbonate resin contain generally 20% by mass or more, preferably 50% by mass or more, and more preferably 60% by mass or more of a polycarbonate resin (this polycarbonate resin is sometimes referred to as a "predetermined N polycarbonate resin"), preferably an aromatic polycarbonate resin (sometimes referred to as a "predetermined N aromatic polycarbonate resin"), having a structural viscosity index N within a predetermined range. This is because the combination with the predetermined N polycarbonate resin allows the synergistic effects that are typical of a metal salt compound and a polycarbosilane compound according to the second aspect of the present invention to be significantly produced. The largest amount of predetermined N polycarbonate resin, preferably predetermined N aromatic polycarbonate resin, in the polycarbonate resin is generally, but not limited to, 100% by mass or less, preferably 90% by mass or less, and more preferably 85% by mass or less.

The predetermined N polycarbonate resins may be used alone, or two or more of the predetermined N polycarbonate resins may be combined with each other at any ratio.

In addition to the predetermined N polycarbonate resin, the polycarbonate resin may contain a polycarbonate resin having a structural viscosity index N outside the predetermined range. Although the type is not particularly limited, linear polycarbonate resins are particularly preferred. A combination of a predetermined N polycarbonate resin with a linear polycarbonate resin has the advantage that the flame resistance (anti-dripping properties) and the formability (flowability) of the resulting polycarbonate resin composition can be easily balanced. In this regard, a polycarbonate resin containing a predetermined N polycarbonate resin and a linear polycarbonate resin is particularly preferably used.

The structural viscosity index N of the linear polycarbonate resin generally ranges from approximately 1 to 1.15.

In the case where the polycarbonate resin contains a linear polycarbonate resin, the percentage of the linear polycarbonate resin in the polycarbonate resin is generally 80% by mass or less, preferably 50% by mass or less, and more preferably 40% by mass or less and generally more than 0% by mass, preferably 10% by mass or more, and more preferably 15% by mass or more. When the content of the linear polycarbonate resin in the polycarbonate resin is set within the range, there can be provided the advantages that a metal salt compound serving as a flame retardant, a polycarbosilane compound, and other additive agents can be easily dispersed and that a polycarbonate resin having high flame resistance and formability can be easily produced.

The polycarbonate resin may contain only a polycarbonate resin having a structural viscosity index N outside the predetermined range alone or two or more of such polycarbonate resins at any ratio. That is, the polycarbonate resin according to the second aspect of the present invention may contain only a linear polycarbonate resin or two or more linear polycarbonate resins at any ratio.

[2-5. Method for Producing Predetermined N Polycarbonate Resin]

The predetermined N polycarbonate resin may be produced by the method for producing the polycarbonate resin. In this case, a polycarbonate resin having a branched structure (hereinafter sometimes referred to as a "branched polycarbonate resin") is preferably produced because the production of the predetermined N polycarbonate resin is favorably facilitated. This is because the branched polycarbonate resin tends to increase the structural viscosity index N.

Examples of a method for producing a branched polycarbonate resin include methods described in Japanese Unexamined Patent Application Publication No. 8-259687, Japanese Unexamined Patent Application Publication No. 8-245782, and the like. In accordance with the methods described in these publications, the catalytic conditions or manufacturing conditions in a reaction between an aromatic dihydroxy compound and a carbonic acid diester by a melt transesterification method can be appropriately selected to produce a polycarbonate resin having a high structural viscosity index N and excellent hydrolytic stability without using a branching agent.

Another method for producing a branched polycarbonate resin is a method in which a trifunctional or higher polyfunctional compound (branching agent) and the raw materials of the polycarbonate resin, a dihydroxy compound and a carbonate precursor, are copolymerized by an interfacial polymerization method or a melt transesterification method.

Examples of the trifunctional or higher polyfunctional compound used herein include:
1,3,5-trihydroxybenzene(phloroglucin),
4,6-dimethyl-2,4,6-tri(4-hydroxyphenyl)heptene-2,
4,6-dimethyl-2,4,6-tri(4-hydroxyphenyl)heptane,
2,6-dimethyl-2,4,6-tri(4-hydroxyphenyl)heptene-3,
1,3,5-tri(4-hydroxyphenyl)benzene,
3,3-bis(4-hydroxyaryl)oxindole (or isatinbisphenol),
5-chloroisatin,
5,7-dichloroisatin,
5-bromisatin, and the like;
silicon-containing trisphenol compounds, such as
$C_6H_5$—Si—(O—SiMe$_2$-C$_3$H$_6$—C$_6$H$_4$—OH)$_3$,
$C_6H_5$—Si—(O—SiPh$_2$-C$_3$H$_6$—C$_6$H$_4$—OH)$_3$,
$C_6H_5$—Si—(O—SiMe$_2$-C$_2$H$_4$—C$_6$H$_4$—OH)$_3$,
$C_6H_5$—Si—(O—SiPh$_2$-C$_2$H$_4$—C$_6$H$_4$—OH)$_3$,
$C_6H_5$—Si—([O—SiMe$_2$]$_5$—C$_3$H$_6$—C$_6$H$_4$—OH)$_3$,
$C_6H_5$—Si—([O—SiMe$_2$]$_{10}$—C$_3$H$_6$—C$_6$H$_4$—OH)$_3$,
$C_6H_5$—Si—([O—SiMe$_2$]$_{50}$—C$_3$H$_6$—C$_6$H$_4$—OH)$_3$,
$C_6H_5$—Si—([O—SiPh$_2$]$_{50}$—C$_3$H$_6$—C$_6$H$_4$—OH)$_3$,
$C_6H_5$—Si—([O—SiMe$_2$]$_8$—[O—SiPh$_2$]$_2$—C$_3$H$_6$—C$_6$H$_4$—OH)$_3$, and
$C_6H_5$—Si—([O—SiMe$_2$]$_{16}$—[O—SiPh$_2$]$_4$—C$_3$H$_6$—C$_6$H$_4$—OH)$_3$,
(wherein Me represents a methyl group, and Ph represents a phenyl group); and
polyhydroxy compounds, such as trisphenol compounds, represented by the following formulae (8) and (9).

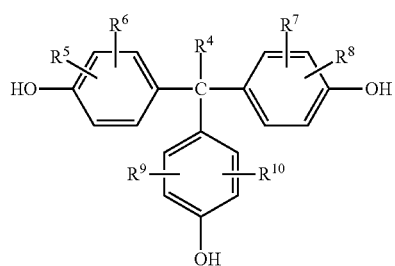

(8)

In the formula (8), $R^4$ represents an alkyl group having 1 to 5 carbon atoms, and $R^5$, $R^6$, $R^7$, $R^8$, $R^9$, and $R^{10}$ each independently represent a hydrogen atom or an alkyl group having 1 to 10 carbon atoms.

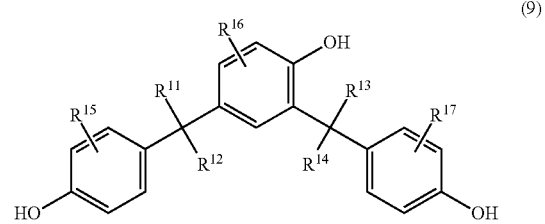

(9)

In the formula (9), $R^{11}$, $R^{12}$, $R^{13}$, and $R^{14}$ each independently represent an alkyl group having 1 to 10 carbon atoms, a cycloalkyl group having 5 to 10 carbon atoms, or a cycloaryl group having 5 to 10 carbon atoms, and $R^{15}$, $R^{16}$, and $R^{17}$ each independently represent a hydrogen atom or an alkyl group having 1 to 10 carbon atoms.

Specific examples of the compound represented by the formula (8) include:
1,1,1-tris(4-hydroxyphenyl)-methane,
1,1,1-tris(4-hydroxyphenyl)-ethane,
1,1,1-tris(4-hydroxyphenyl)-propane,
1,1,1-tris(2-methyl-4-hydroxyphenyl)-methane,
1,1,1-tris(2-methyl-4-hydroxyphenyl)-ethane,
1,1,1-tris(3-methyl-4-hydroxyphenyl)-methane,
1,1,1-tris(3-methyl-4-hydroxyphenyl)-ethane,
1,1,1-tris(3,5-dimethyl-4-hydroxyphenyl)-methane, and
1,1,1-tris(3,5-dimethyl-4-hydroxyphenyl)-ethane.

In the formula (9), $R^{11}$, $R^{12}$, $R^{13}$, and $R^{14}$ are particularly preferably a methyl group. The cycloalkyl ring of the cycloalkyl group of $R^{11}$, $R^{12}$, $R^{13}$, and $R^{14}$ may be substituted with an alkyl group having 1 to 4 carbon atoms, preferably a methyl group. $R^{15}$, $R^{16}$, and $R^{17}$ are particularly preferably a hydrogen atom.

The compound represented by the formula (9) is particularly preferably a compound represented by the following formula (10).

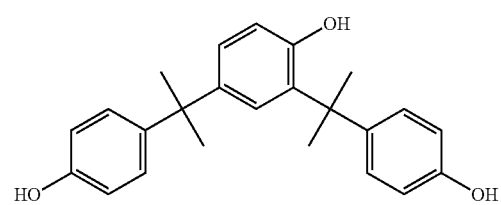

(10)

The polyfunctional compound may be used by substituting part of the raw material dihydroxy compound. The amount of polyfunctional compound to be used is generally 0.01% by mole or more and preferably 0.1% by mole or more and generally 10% by mole or less and preferably 3% by mole or less of the dihydroxy compound.

The polyfunctional compounds may be used alone, or two or more of the polyfunctional compounds may be combined with each other at any ratio.

Examples of the branched structure of the branched polycarbonate resin produced by the melt transesterification method include the structures represented by the following formulae (11) to (14). In the following formulae (11) to (14), $X^2$, $X^3$, $X^4$, and $X^5$ are selected from the group consisting of a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, and divalent groups represented by —O—, —S—, —CO—, —SO—, and —SO$_2$—.

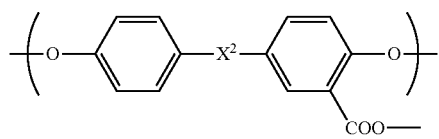

(11)

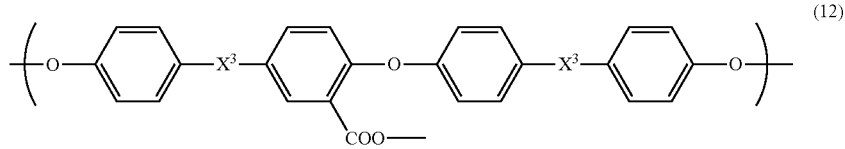

(12)

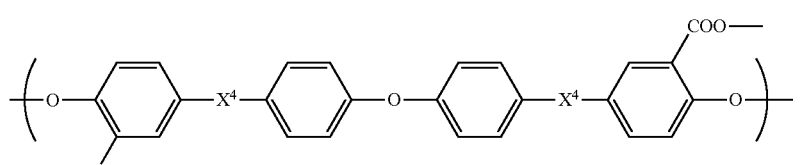

(13)

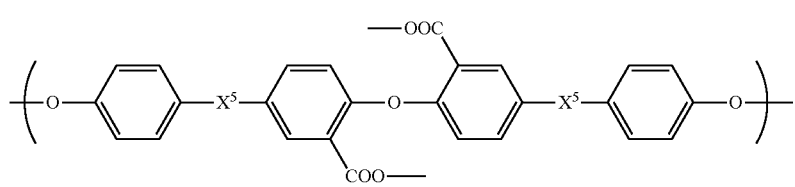

(14)

Among the above-described methods for producing the branched polycarbonate resin, a method involving the melt transesterification method is particularly preferred. This is because the branched polycarbonate resin can be produced with relatively inexpensive and industrially available raw materials, as described in the method for producing a polycarbonate resin.

The description of [2-4. Other Matters regarding Polycarbonate Resin] in I. First Aspect of the Present Invention can be applied to [2-6. Other Matters regarding Polycarbonate Resin] of the polycarbonate resin used in the second aspect of the present invention.

[3. Metal Salt Compound]

The polycarbonate resin composition according to the second aspect of the present invention contains a metal salt compound. The metal salt compound can improve the flame resistance of the polycarbonate resin composition according to the second aspect of the present invention.

Examples of the metal of the metal salt compound include alkali metals, such as lithium (Li), sodium (Na), potassium (K), rubidium (Rb), and cesium (Cs); alkaline-earth metals, such as magnesium (Mg), calcium (Ca), strontium (Sr), and barium (Ba); and aluminum (Al), titanium (Ti), iron (Fe), cobalt (Co), nickel (Ni), copper (Cu), zinc (Zn), zirconium (Zr), and molybdenum (Mo). Among these, alkali metals and alkaline-earth metals are preferred.

This is because they can promote the formation of a carbonized layer during the combustion of the polycarbonate resin composition according to the second aspect of the present invention, thereby improving flame resistance, and can maintain excellent mechanical properties, such as impact resistance, heat resistance, and electrical characteristics of the polycarbonate resin. Thus, the metal salt compound is more preferably at least one metal salt compound selected from the group consisting of alkali metal salts and alkaline-earth metal salts, still more preferably an alkali metal salt compound, and particularly preferably a sodium salt compound, a potassium salt compound, and a cesium salt compound.

Examples of the metal salt compounds include organic metal salt compounds and inorganic metal salt compounds. In terms of dispersibility in polycarbonate resins, organic metal salt compounds are preferred.

Examples of the organic metal salt compounds include organic sulfonic acid metal salts, organic sulfonamide metal salts, organic carboxylic acid metal salts, organic boric acid metal salts, and organic phosphoric acid metal salts. Among these, in terms of thermal stability when mixed with a polycarbonate resin, organic sulfonic acid metal salts, organic sulfonamide metal salts, and organic phosphoric acid metal salts are preferred, and organic sulfonic acid metal salts are particularly preferred.

Examples of the organic sulfonic acid metal salts include organic sulfonic acid lithium (Li) salts, organic sulfonic acid sodium (Na) salts, organic sulfonic acid potassium (K) salts, organic sulfonic acid rubidium (Rb) salts, organic sulfonic acid cesium (Cs) salts, organic sulfonic acid magnesium (Mg) salts, organic sulfonic acid calcium (Ca) salts, organic sulfonic acid strontium (Sr) salts, and organic sulfonic acid barium (Ba) salts. Among these, organic sulfonic acid alkali metal salts, such as organic sulfonic acid sodium (Na) salts, organic sulfonic acid potassium (K) salt compounds, and organic sulfonic acid cesium (Cs) salt compounds, are particularly preferred.

Preferred examples of the metal salt compound include fluorine-containing aliphatic sulfonic acid metal salts, fluorine-containing aliphatic sulfonimide metal salts, aromatic sulfonic acid metal salts, and aromatic sulfonamide metal salts. Among these, preferred specific examples include:

<Fluorine-Containing Aliphatic Sulfonic Acid Metal Salts> fluorine-containing aliphatic sulfonic acid alkali metal salts having at least one C—F bond in its molecule, such as potassium perfluorobutanesulfonate, lithium perfluorobutanesulfonate, sodium perfluorobutanesulfonate, cesium perfluorobutanesulfonate, lithium trifluoromethanesulfonate, sodium trifluoromethanesulfonate, potassium trifluoromethanesulfonate, potassium perfluoroethanesulfonate, and potassium perfluoropropanesulfonate;

fluorine-containing aliphatic sulfonic acid alkaline-earth metal salts having at least one C—F bond in its molecule, such as magnesium perfluorobutanesulfonate, calcium perfluorobutanesulfonate, barium perfluorobutanesulfonate, magnesium trifluoromethanesulfonate, calcium trifluoromethanesulfonate, and barium trifluoromethanesulfonate; and fluorine-containing aliphatic disulfonic acid alkali metal salts having at least one C—F bond in its molecule, such as disodium perfluoromethanedisulfonate, dipotassium perfluoromethanedisulfonate, sodium perfluoroethanedisulfonate, dipotassium perfluoroethanedisulfonate, dipotassium perfluoropropanedisulfonate, dipotassium perfluoroisopropanedisulfonate, disodium perfluorobutanedisulfonate, dipotassium perfluorobutanedisulfonate, and dipotassium perfluorooctanedisulfonate;

<Fluorine-Containing Aliphatic Sulfonimide Metal Salts> fluorine-containing aliphatic sulfonimide alkali metal salts having at least one C—F bond in its molecule, such as lithium bis(perfluoropropanesulfonyl)imide, sodium bis(perfluoropropanesulfonyl)imide, potassium bis(perfluoropropanesulfonyl)imide, lithium bis(perfluorobutanesulfonyl)imide, sodium bis(perfluorobutanesulfonyl)imide, potassium bis(perfluorobutanesulfonyl)imide, potassium trifluoromethane(pentafluoroethane)sulfonylimide, sodium trifluoromethane(nonafluorobutane)sulfonylimide, and potassium trifluoromethane(nonafluorobutane)sulfonylimide; and cyclic fluorine-containing aliphatic sulfonimide alkali metal salts having at least one C—F bond in its molecule, such as lithium cyclo-hexafluoropropane-1,3-bis(sulfonyl) imide, sodium cyclo-hexafluoropropane-1,3-bis(sulfonyl) imide, and potassium cyclo-hexafluoropropane-1,3-bis(sulfonyl)imide;

<Aromatic Sulfonic Acid Metal Salts> aromatic sulfonic acid alkali metal salts having at least one aromatic group in its molecule, such as dipotassium diphenylsulfone-3,3'-disulfonate, potassium diphenylsulfone-3-sulfonate, sodium benzenesulfonate, poly(sodium styrenesulfonate), sodium paratoluenesulfonate, (branched) sodium dodecylbenzenesulfonate, sodium trichlorobenzenesulfonate, potassium benzenesulfonate, potassium styrenesulfonate, poly(potassium styrenesulfonate), potassium paratoluenesulfonate, (branched) potassium dodecylbenzenesulfonate, potassium trichlorobenzenesulfonate, cesium benzenesulfonate, poly(cesium styrenesulfonate), cesium paratoluenesulfonate, (branched) cesium dodecylbenzenesulfonate, and cesium trichlorobenzenesulfonate; and aromatic sulfonic acid alkaline-earth metal salts having at least one aromatic group in its molecule, such as magnesium paratoluenesulfonate, calcium paratoluenesulfonate, strontium paratoluenesulfonate, barium paratoluenesulfonate, (branched) magnesium dodecylbenzenesulfonate, and (branched) calcium dodecylbenzenesulfonate; and <Aromatic Sulfonamide Metal Salts> aromatic sulfonamide alkali metal salts having at least one aromatic group in its molecule, such as saccharin sodium salt, N-(p-tolylsulfonyl)-p-toluene sulfonimide potassium salt, N-(N'-benzylaminocarbonyl)sulfanilimide potassium salt, and N-(phenylcarboxyl)-sulfanilimide potassium salt.

Among these examples, fluorine-containing aliphatic sulfonic acid metal salts and aromatic sulfonic acid metal salts are more preferred, and fluorine-containing aliphatic sulfonic acid metal salts are particularly preferred.

The fluorine-containing aliphatic sulfonic acid metal salts are more preferably fluorine-containing aliphatic sulfonic acid alkali metal salts having at least one C—F bond in its molecule and particularly preferably perfluoroalkane sulfonic acid alkali metal salts. More specifically, potassium perfluorobutanesulfonate is preferred.

The aromatic sulfonic acid metal salts are more preferably aromatic sulfonic acid alkali metal salts; particularly preferably diphenylsulfone-sulfonic acid alkali metal salts, such as dipotassium diphenylsulfone-3,3'-disulfonate and potassium diphenylsulfone-3-sulfonate, and paratoluenesulfonic acid alkali metal salts, such as sodium paratoluenesulfonate, potassium paratoluenesulfonate, and cesium paratoluenesulfonate; and still more preferably paratoluenesulfonic acid alkali metal salts.

These metal salt compounds may be used alone, or two or more of the metal salt compounds may be combined with each other at any ratio.

The content of metal salt compound in the polycarbonate resin composition according to the second aspect of the present invention is 0.01 parts by mass or more, preferably 0.02 parts by mass or more, more preferably 0.03 parts by mass or more, and particularly preferably 0.05 parts by mass or more and 1 part by mass or less, preferably 0.75 parts by mass or less, more preferably 0.5 parts by mass or less, and particularly preferably 0.3 parts by mass or less relative to 100 parts by mass of the polycarbonate resin. An excessively low content of metal salt compound may result in insufficient flame resistance of the resulting polycarbonate resin composition. On the other hand, an excessively high content of metal salt compound may result in reduced thermal stability of the polycarbonate resin composition and poor appearance and low mechanical strength of a formed product.

[4. Polycarbosilane Compound]

The polycarbonate resin composition according to the second aspect of the present invention contains a polycarbosilane compound, that is, a silicon compound having a silicon-carbon bond in the main chain. In accordance with the second aspect of the present invention, a combination of the polycarbosilane compound and a metal salt compound can markedly improve the flame resistance of the polycarbonate resin composition according to the second aspect of the present invention. A polycarbonate resin composition having higher transparency, impact resistance, and heat resistance and causing less outgassing and mold fouling can be produced using a polycarbosilane compound according to the second aspect of the present invention compared with the case where a conventional organosiloxane (silicone) compound or polysilane compound is used. The reason for this is described below.

Conventional organosiloxanes (silicones) are silicon compounds having a silicon-oxygen bond as the main chain. Polysilane compounds are silicon compounds having a silicon-silicon bond as the main chain. These silicon compounds therefore have strong inorganic characteristics and consequently poor compatibility with and dispersibility in polycarbonate resins, which are organic resins. Thus, these silicon compounds tend to cause poor mechanical properties, such as impact resistance, and poor transparency.

In particular, since organosiloxanes generally have low melting points, the blend of the organosiloxanes with polycarbonate resins tends to cause low heat resistance of their resin compositions and increased outgassing, which tends to cause mold fouling. Use of organosiloxanes having lower molecular weights so as to achieve higher transparency increases outgassing and mold fouling. Although polysilane compounds tend to be better in terms of heat resistance than organosiloxane compounds, because of the same reasons as described above, use of the polysilane compounds results in markedly poor mechanical properties, possibly low transparency, and increased outgassing and mold fouling.

In contrast, polycarbosilane compounds having a silicon-carbon bond in the main chain contain an organic moiety (organic residue) in the main chain and have more organic characteristics. Polycarbosilane compounds therefore have much higher dispersibility in polycarbonate resins than organosiloxanes or polysilane compounds and can improve the flame resistance of the polycarbonate resin composition without causing deterioration in mechanical properties, such as impact resistance, and transparency. Furthermore, a polycarbosilane compound according to the second aspect of the present invention has high heat resistance, resulting in reduced deterioration in the heat resistance of a polycarbonate resin composition and markedly reduced outgassing and mold fouling.

In a method for improving flame resistance with an organosiloxane (silicone) compound, a silicon-oxygen bond of organosiloxane is believed to be important because the silicon-oxygen bond is converted into a $SiO_2$ component during combustion to improve flame resistance. However, as a result of studies performed by the inventors, it was found that a bond between a silicon atom and a side chain (for example, a methyl group or a phenyl group), that is, a silicon-carbon bond of organosiloxane contributed to flame resistance more than the silicon-oxygen bond. This is probably because organic components are vaporized by the cleavage of the silicon-carbon bond during combustion to form a foam layer.

Since the polycarbosilane compound according to the second aspect of the present invention has a silicon-carbon bond in the main chain as well as the side chains, the polycarbosilane compound has the advantage that it can improve flame resistance more efficiently than organosiloxane and polysilane compounds.

The polycarbosilane compound according to the second aspect of the present invention may contain a bond between a silicon atom and an atom other than carbon in the main chain without departing from the object of the second aspect of the present invention. Examples of such a bond include a silicon-silicon (Si—Si) bond, a silicon-oxygen (Si—O) bond, a silicon-nitrogen (Si—N) bond, a silicon-boron (Si—B) bond, a silicon-phosphorus (Si—P) bond, and a silicon-titanium (Si—Ti) bond. Such a bond may be introduced from components, such as raw materials and catalysts, or may be unintentionally introduced by oxidation or other actions during the production of silicon compounds substantially having a silicon-carbon bond alone.

A polycarbosilane compound used in the second aspect of the present invention is the same as the polycarbosilane compound used in the first aspect of the present invention. Thus, the description of [3. Polycarbosilane Compound] in I. First Aspect of the Present Invention can be applied.

The content of the polycarbosilane compound in the polycarbonate resin composition according to the second aspect of the present invention is 0.005 parts by mass or more, preferably 0.01 parts by mass or more, more preferably 0.02 parts by mass or more, particularly preferably 0.05 parts by mass or more, and most preferably 0.1 parts by mass or more and 5 parts by mass or less, preferably 3 parts by mass or less, more preferably 2 parts by mass or less, and particularly preferably 1 part by mass or less relative to 100 parts by mass of the polycarbonate resin. An excessively low content of polycarbosilane compound may result in insufficient flame resistance of the resulting polycarbonate resin composition. On the other hand, at an excessively high content of polycarbosilane compound, its effect may be leveled off and thus its use may be uneconomical, and the polycarbonate resin composition may have low mechanical strength.

The polycarbosilane compound according to the second aspect of the present invention may be used alone or in combination.

[5. Other Components]

The polycarbonate resin composition according to the second aspect of the present invention may optionally contain components other than those described above provided that desired physical properties are not significantly deteriorated. Examples of the other components include resins other than polycarbonate resins and various resin additive agents. The other components may be contained alone, or two or more of the other components may be contained at any ratio.

The description of <Other Resins> that may be contained in the polycarbonate resin composition according to I. First Aspect of the Present Invention can be applied to <Other Resins> that may be contained in the polycarbonate resin composition according to the second aspect of the present invention.

<Resin Additive Agents>

Examples of the resin additive agents include a heat stabilizer, an antioxidant, a mold-release agent, an ultraviolet absorber, a dye or pigment, a flame retardant, an anti-dripping agent, a light-diffusing agent, an antistatic agent, an anti-fogging agent, a lubricant, an anti-blocking agent, a flow modifier, a sliding modifier, a plasticizer, a dispersant, and an antimicrobial agent. The resin additive agents may be contained alone, or two or more of the resin additive agents may be contained at any ratio.

The descriptions of Heat Stabilizer, Antioxidant, Mold-Release Agent, Ultraviolet Absorber, Dye or Pigment, and Anti-Dripping Agent of <Resin Additive Agents> that may be contained in the polycarbonate resin composition according to I. First Aspect of the Present Invention can be applied to exemplary resin additive agents Heat Stabilizer, Antioxidant, Mold-Release Agent, Ultraviolet Absorber, Dye or Pigment, and Anti-Dripping Agent suitable for the polycarbonate resin composition according to the second aspect of the present invention, respectively.

[Light-Diffusing Agent]

A light-diffusing agent contains inorganic or organic fine particles. Examples of the light-diffusing agent include glass fine particles and organic fine particles of, for example, polystyrene resins, (meth)acrylic resins, and silicone resins. Organic fine particles are preferred in terms of light diffusion and particle dispersion.

The organic fine particles of the light-diffusing agent are preferably cross-linked organic fine particles that do not melt in the polycarbonate resin even when heated to the shaping temperature of the polycarbonate resin. Thus, cross-linked (meth)acrylic resins and cross-linked silicone resins are preferred. Specific examples thereof include partially cross-linked polymethyl methacrylate polymer fine particles, cross-linked silicone resin particles, and silicone rubber powders containing silicone rubber coated with a silicone resin.

The shape of the light-diffusing agent is preferably spherical in terms of light-diffusing effects.

The average particle size of the particulate light-diffusing agent preferably ranges from 0.1 to 50 μm, more preferably 0.5 to 10 μm, and particularly 1 to 5 μm. An excessively small average particle size of the light-diffusing agent results in insufficient light dispersion effects. An excessively large average particle size may result in a rough surface or low mechanical strength of formed products. The average particle size of the light-diffusing agent refers to a volume-average particle size measured by a Coulter counter method. The Coulter counter method can determine the particle size by passing sample particles suspended in an electrolyte through a pore (aperture) and reading a change in voltage pulse generated in proportion to the particle volume. Furthermore, the voltage pulse height can be measured one by one to prepare the volume distribution histogram of the sample particles. The measurements of the particle size or the particle size distribution by the Coul counter method are most frequently used as a particle size distribution analysis.

In the second aspect of the present invention, two or more light-diffusing agents made of different materials or having different average particle sizes may be used in combination.

In the case where the polycarbonate resin composition according to the second aspect of the present invention contains a light-diffusing agent, the preferred content of the light-diffusing agent generally ranges from 0.1 to 20 parts by mass and more preferably 0.3 to 10 parts by mass relative to 100 parts by mass of the polycarbonate resin. An excessively low content of light-diffusing agent results in insufficient light diffusion. Thus, a light source tends to be seen through a formed product, resulting in an insufficient effect of reducing glare. An excessively high content of light-diffusing agent results in insufficient luminance.

[6. Method for Producing Polycarbonate Resin Composition]

A method for producing the polycarbonate resin composition according to the second aspect of the present invention is not particularly limited. Various known methods for producing polycarbonate resin compositions can be employed.

A specific example is a method in which a polycarbonate resin, a metal salt compound, a polycarbosilane compound, and other components to be optionally blended are mixed in advance, for example, in a mixer, such as a tumbler or a Henschel mixer, and are melt-kneaded in a mixer, such as a Banbury mixer, a roll, a Brabender, a single-screw extruder, a twin-screw extruder, or a kneader.

Alternatively, for example, the components are not mixed in advance, or part of the components is mixed in advance, and the components are supplied to an extruder with a feeder and then melt-kneaded to produce the polycarbonate resin composition according to the second aspect of the present invention.

Alternatively, for example, part of the components is mixed in advance and is supplied to and melt-kneaded in an extruder to produce a resin composition as a masterbatch. This masterbatch is again mixed with the other components and melt-kneaded to produce the polycarbonate resin composition according to the second aspect of the present invention.

When a component that is difficult to disperse is mixed, the component that is difficult to disperse can be dissolved or dispersed in advance in a solvent, such as water or an organic solvent. The solution or dispersion liquid is kneaded with other components and thus high dispersibility can be achieved.

[7. Polycarbonate Resin Formed Product]

The polycarbonate resin composition according to the second aspect of the present invention can generally be formed into polycarbonate resin formed products having any shape. The shape, design, color, and size of the formed products are not particularly limited and may be appropriately determined in accordance with each application of the formed products.

Examples of the formed products include components of electrical and electronic devices, OA equipment, information terminals, mechanical parts, household electrical appliances, vehicle parts, architectural members, various containers, recreational equipment and miscellaneous articles, and illuminators. Among these, the formed products are suitably used for components of electrical and electronic devices, OA equipment, information terminals, household electrical appliances, and illuminators and are particularly suitably used for components of electrical and electronic devices.

Examples of the electrical and electronic devices include personal computers, game machines, display units, such as television sets, printers, copying machines, scanners, facsimiles, electronic notebooks and PDAs, electronic calculators, electronic dictionaries, cameras, video cameras, cellular phones, battery packs, recording medium drives and readers, mouses, numeric keypads, CD players, MD players, and portable radios and audio-players.

A method for manufacturing formed products is not particularly limited. Any common molding method for polycarbonate resin compositions can be employed. Examples of the common molding method include an injection molding method, an ultra-high-speed injection molding method, an injection compression molding method, a coinjection molding method, gas-assisted blow molding methods and the like, molding methods using insulated metal dies, molding methods using rapid heating metal dies, a foam molding (including supercritical fluid) method, an insert molding method, an IMC (in-mold coating molding) molding method, an extrusion molding method, a sheet forming method, a thermoforming method, a rotational molding method, a laminate molding method, and a press forming method. A hot-runner molding method may also be used.

The polycarbonate resin formed product according to the second aspect of the present invention obtained by shaping the polycarbonate resin composition according to the second aspect of the present invention has excellent transparency, flame resistance, mechanical properties, and other characteristics, without adversely affecting the excellent intrinsic characteristics of polycarbonate resins. Thus, the polycarbonate resin formed product can be used as a practical formed product in a wide variety of applications.

III. Third Aspect of the Present Invention

[1. Overview]

A thermoplastic resin composition according to a third aspect of the present invention contains at least a thermoplastic resin, a fluoropolymer, and a polycarbosilane compound serving as a fluoropolymer dispersant. The thermoplastic resin composition according to the third aspect of the present invention may optionally contain a flame retardant and other components.

Polycarbosilane compounds are compounds having two or more repeating units each having a silicon-carbon bond (Si—C bond) in their main chains. The polycarbosilane compound used in the third aspect of the present invention has the Si—C bond in its main chain and thus has significant effects of improving the compatibility and dispersibility of the fluoropolymer in thermoplastic resins. Consequently, there can be solved the problems of existing thermoplastic resin compositions containing a fluoropolymer, such as low light transmittance, particularly low transmittance of near-infrared light, poor appearance, and strength reduction.

[2. Thermoplastic Resin]

Examples of thermoplastic resins for use in the thermoplastic resin composition according to the third aspect of the present invention include, but are not limited to:

polycarbonate resins (PC resins), such as aromatic polycarbonate resins and aliphatic polycarbonate resins;

thermoplastic polyester resins, such as a polyethylene terephthalate resin (PET resin), polytrimethylene terephthalate (PTT resin), a polybutylene terephthalate resin (PBT resin), polylactic acid (PLA), a polybutylene succinate resin (PBS), and polycaprolactone (PCL);

styrene resins, such as a polystyrene resin (PS resin), a high-impact polystyrene resin (HIPS), an acrylonitrile-styrene copolymer (AS resin), an acrylonitrile-butadiene-styrene copolymer (ABS resin), an acrylonitrile-styrene-acrylic rubber copolymer (ASA resin), and an acrylonitrile-ethylene propylene rubber-styrene copolymer (AES resin);

polyolefin resins, such as a polyethylene resin (PE resin), a polypropylene resin (PP resin), a cyclic cycloolefin resin (COP resin), and a cyclic cycloolefin copolymer (COC resin); and polyamide resins (PA resins); polyimide resins (PI resins); polyetherimide resins (PEI resins); polyurethane resins (PU resins); polyphenylene ether resins (PPE resins); polyphenylene sulfide resins (PPS resins); polysulfone resins (PSU resins); and polymethyl methacrylate resins (PMMA resins).

The thermoplastic resin composition according to the third aspect of the present invention may contain one of these thermoplastic resins or any combination of two or more of these thermoplastic resins at any ratio.

In particular, in the third aspect of the present invention, among these thermoplastic resins, because of excellent optical properties, such as transparency, heat resistance, mechanical properties, and electrical characteristics, polycarbonate resins are preferably used, and aromatic polycarbonate resins are particularly preferably used. Preferably, 50% or more, particularly 70% by mass or more, of the thermoplastic resin contained in the thermoplastic resin composition according to the third aspect of the present invention is a polycarbonate resin, particularly an aromatic polycarbonate resin. Polycarbonate resins may be used alone, or two or more polycarbonate resins may be combined with each other at any ratio.

The polycarbonate resin is a polymer having a basic structure having a carbonate bond represented by the following formula (7):

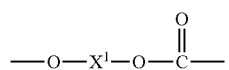

(7)

In the formula (7), $X^1$ generally represents a hydrocarbon group, and $X^1$ containing a heteroatom or a hetero bond for imparting various characteristics may be used.

Polycarbonate resins can be classified into aromatic polycarbonate resins in which each carbon directly bonded to the carbonate bond is aromatic carbon and aliphatic polycarbonate resins in which each carbon directly bonded to the carbonate bond is aliphatic carbon. Both aromatic polycarbonate resins and aliphatic polycarbonate resins may be used. Aromatic polycarbonate resins are preferred in terms of heat resistance, mechanical properties, and electrical characteristics.

The type of polycarbonate resin is not particularly limited. One example is a polycarbonate polymer produced through the reaction between a dihydroxy compound and a carbonate precursor. In addition to the dihydroxy compound and the carbonate precursor, a polyhydroxy compound may be involved in the reaction. Alternatively, carbon dioxide may be used as the carbonate precursor to react with a cyclic ether.

The polycarbonate polymer may have a straight chain or a branched chain. The polycarbonate polymer may be a homopolymer composed of one repeating unit or a copolymer composed of two or more repeating units. The copolymer may be selected from various copolymerization forms, such as a random copolymer and a block copolymer. In general, such polycarbonate polymers are thermoplastic resins.

In the third aspect of the present invention, the descriptions of [2-1. Dihydroxy Compound], [2-2. Carbonate Precursor], [2-3. Method for Producing Polycarbonate Resin], and [2-4. Other Matters regarding Polycarbonate Resin] in the first aspect of the present invention can be applied to [2-1. Dihydroxy Compound], [2-2. Carbonate Precursor], [2-3. Method for Producing Polycarbonate Resin], and [2-4. Other Matters regarding Polycarbonate Resin] of the polycarbonate resin, respectively.

[3. Fluoropolymer]

The thermoplastic resin composition according to the third aspect of the present invention contains a fluoropolymer, for the purpose of modifying the melt properties (for example, anti-dripping properties during combustion) and surface properties, such as sliding characteristics, abrasion resistance, water repellency, oil repellency, stain resistance, and fingerprint resistance, of the thermoplastic resin.

The fluoropolymer used in the third aspect of the present invention is particularly preferably a fluoroolefin resin.

The fluoroolefin resin is generally a polymer or copolymer having a fluoroethylene structure. Specific examples thereof include difluoroethylene resins, tetrafluoroethylene resins, and tetrafluoroethylene/hexafluoropropylene copolymer resins. Among these, tetrafluoroethylene resins are preferred.

In particular, the fluoropolymer is preferably a fluoropolymer capable of forming fibrils, more specifically a fluoroolefin resin capable of forming fibrils. The fluoropolymer capable of forming fibrils tends to markedly improve the anti-dripping properties during combustion.

Examples of commercially available fluoroolefin resins capable of forming fibrils include "Teflon (registered trademark) 6J" manufactured by DuPont-Mitsui Fluorochemicals Co., Ltd. and "Polyflon (registered trademark) F201L" and "Polyflon (registered trademark) F103" manufactured by Daikin Industries, Ltd. Examples of commercially available aqueous fluoroolefin resin dispersions include "Teflon (registered trademark) 30J" and "Teflon (registered trademark) 31-JR" manufactured by DuPont-Mitsui Fluorochemicals Co., Ltd. and "Fluon (registered trademark) D-1" manufactured by Daikin Industries, Ltd.

Organic-polymer-coated fluoroolefin resins may also be suitably used as the fluoropolymer. The organic-polymer-coated fluoroolefin resins can improve dispersibility and the surface appearance of formed products and reduce surface foreign substances. The organic-polymer-coated fluoroolefin resins can be produced by known various methods, for example, (1) a method in which an aqueous polyfluoroethylene particle dispersion and an aqueous organic polymer particle dispersion are mixed and powdered by coagulation or spray-drying, (2) a method in which monomers of the organic polymer are polymerized in the presence of an aqueous polyfluoroethylene particle dispersion and the resultant polymer is powdered by coagulation or spray-drying, and (3) a method in which monomers having an ethylenically unsaturated bond are subjected to emulsion polymerization in a mixed dispersion liquid of an aqueous polyfluoroethylene particle dispersion and an aqueous organic polymer particle dispersion and the resultant polymer is powdered by coagulation or spray-drying.

The organic polymer coating the fluoroolefin resin is not particularly limited. Specific examples of monomers for use in the production of the organic polymer include:

aromatic vinyl monomers, such as styrene, α-methylstyrene, p-methylstyrene, o-methylstyrene, tert-butylstyrene, o-ethylstyrene, p-chlorostyrene, o-chlorostyrene, 2,4-dichlorostyrene, p-methoxystyrene, o-methoxystyrene, and 2,4-dimethylstyrene;

(meth)acrylate monomers, such as methyl acrylate, methyl methacrylate, ethyl acrylate, ethyl methacrylate, butyl acrylate, butyl methacrylate, 2-ethylhexyl acrylate, 2-ethylhexyl methacrylate, dodecyl acrylate, dodecyl methacrylate, tridecyl acrylate, tridecyl methacrylate, octadecyl acrylate, octadecyl methacrylate, cyclohexyl acrylate, and cyclohexyl methacrylate;

vinyl cyanide monomers, such as acrylonitrile and methacrylonitrile;

α,β-unsaturated carboxylic acids, such as maleic anhydride;

maleimide monomers, such as N-phenylmaleimide, N-methylmaleimide, and N-cyclohexylmaleimide;

monomers containing a glycidyl group, such as glycidyl methacrylate;

vinyl ether monomers, such as vinyl methyl ether and vinyl ethyl ether;

vinyl carboxylate monomers, such as vinyl acetate and vinyl butyrate;

olefin monomers, such as ethylene, propylene, and isobutylene; and diene monomers, such as butadiene, isoprene, and dimethylbutadiene.

These monomers may be used alone or in combination.

Among these, in the case where the thermoplastic resin is a polycarbonate resin, the monomers for producing the organic polymer coating the fluoroolefin resin are preferably monomers having a high affinity for polycarbonate resins in terms of dispersibility of the monomers in polycarbonate resins. Aromatic vinyl monomers, (meth)acrylate monomers, and vinyl cyanide monomers are more preferred.

The content ratio of the fluoroolefin resin in the organic-polymer-coated fluoroolefin resin is generally 30% by mass or more, preferably 35% by mass or more, more preferably 40% by mass or more, and particularly preferably 45% by mass or more and generally 95% by mass or less, preferably 90% by mass or less, more preferably 80% by mass or less, and particularly preferably 75% by mass or less. When the content ratio of the fluoroolefin resin in the organic-polymer-coated fluoroolefin resin is within the above-described range, a good balance between flame resistance and appearance of formed products tends to be favorably achieved.

Examples of commercially available organic-polymer-coated fluoroolefin resins include "Metablen (registered trademark) A-3800" manufactured by MITSUBISHI RAYON Co., Ltd., "Blendex (registered trademark) 449" manufactured by GE Specialty Chemicals Inc., and "Poly TS AD001" manufactured by PIC.

The fluoropolymers may be contained alone, or two or more of the fluoropolymers may be contained at any ratio.

The content of the fluoropolymer in the thermoplastic resin composition according to the third aspect of the present invention is generally 0.001 parts by mass or more, preferably 0.005 parts by mass or more, more preferably 0.01 parts by mass or more, and particularly preferably 0.02 parts by mass or more and generally 3 parts by mass or less, preferably 2 parts by mass or less, more preferably 1 part by mass or less, and particularly preferably 0.5 parts by mass or less relative to 100 parts by mass of the thermoplastic resin. A fluoropolymer content less than or equal to the lower limit may result in an insufficient effect supposed to be produced by the blend of the fluoropolymer. A fluoropolymer content more than the upper limit may result in poor appearance, low mechanical strength, or significantly low transmittance in a near-infrared region or transparency of formed products obtained by shaping the thermoplastic resin composition.

[4. Polycarbosilane Compound]

The thermoplastic resin composition according to the third aspect of the present invention contains a polycarbosilane compound serving as a fluoropolymer dispersant, that is, a silicon compound having a silicon-carbon bond in the main chain. In accordance with the third aspect of the present invention, the polycarbosilane compound improves the compatibility and dispersibility of the fluoropolymer in the thermoplastic resin composition according to the third aspect of the present invention, light transmittance, particularly transmittance of near-infrared light, and flame resistance, thereby suppressing poor appearance and strength reduction.

This is because the polycarbosilane compound having a silicon-carbon bond in the main chain contains an organic moiety (organic residue) in the main chain and have more organic characteristics and can therefore effectively improve the compatibility and dispersibility of the fluoropolymer in thermoplastic resins.

A polycarbosilane compound according to the third aspect of the present invention may contain a bond between a silicon atom and an atom other than carbon in the main chain without departing from the object of the third aspect of the present invention. Examples of such a bond include a silicon-silicon (Si—Si) bond, a silicon-oxygen (Si—O) bond, a silicon-nitrogen (Si—N) bond, a silicon-boron (Si—B) bond, a silicon-phosphorus (Si—P) bond, and a silicon-titanium (Si—Ti) bond. Such a bond may be introduced from components, such as raw materials and catalysts, or may be unintentionally introduced by oxidation or other actions during the production of silicon compounds substantially having a silicon-carbon bond alone.

A polycarbosilane compound used in the third aspect of the present invention is the same as the polycarbosilane compound used in the first aspect of the present invention. Thus, the description of [3. Polycarbosilane Compound] in I. First Aspect of the Present Invention can be applied.

The content of the polycarbosilane compound in the thermoplastic resin composition according to the third aspect of the present invention is preferably 0.005 parts by mass or more, more preferably 0.01 parts by mass or more, still more preferably 0.02 parts by mass or more, particularly preferably 0.05 parts by mass or more, and most preferably 0.75 parts by mass or more and preferably 10 parts by mass or less, more preferably 7.5 parts by mass or less, still more preferably 3 parts by mass or less, and particularly preferably 1.75 parts by mass or less relative to 100 parts by mass of the thermoplastic resin. An excessively low content of polycarbosilane compound may result in insufficient effects of improving the compatibility and dispersibility of the fluoropolymer in thermoplastic resins. On the other hand, at an excessively high content of polycarbosilane compound, its effect may be leveled off and thus its use may be uneconomical, and the thermoplastic resin composition may have low mechanical strength.

The polycarbosilane compound according to the third aspect of the present invention may be used alone or in combination.

[5. Flame Retardant]

The thermoplastic resin composition according to the third aspect of the present invention may further contain a flame retardant, and the combination of the flame retardant with the fluoropolymer can provide significantly high flame resistance.

Any known flame retardant may be suitably selected. Examples of such a flame retardant include a halogen-based flame retardant, a phosphorus-based flame retardant, a nitrogen-based flame retardant, a boron-based flame retardant, a metal salt-based flame retardant, a silicone-based flame retardant, and an inorganic compound-based flame retardant. Among these, a metal salt-based flame retardant (hereinafter sometimes referred to as "metal salt compound") can be preferably used because it does not easily cause a reduction in the light transmittance, particularly transmittance of near-infrared light, and mechanical properties of the thermoplastic resin composition and produces less effects on environment and human bodies. The combination of the metal salt compound with the thermoplastic resin that can be suitably used in the third aspect of the present invention can effectively provide flame resistance.

Examples of the metal of the metal salt compound include alkali metals, such as lithium (Li), sodium (Na), potassium (K), rubidium (Rb), and cesium (Cs); alkaline-earth metals, such as magnesium (Mg), calcium (Ca), strontium (Sr), and barium (Ba); and aluminum (Al), titanium (Ti), iron (Fe), cobalt (Co), nickel (Ni), copper (Cu), zinc (Zn), zirconium (Zr), and molybdenum (Mo). Among these, alkali metals and alkaline-earth metals are preferred.

This is because they can promote the formation of a carbonized layer during the combustion of the thermoplastic resin composition according to the third aspect of the present invention, thereby improving flame resistance, and can maintain excellent mechanical properties, such as impact resistance, heat resistance, and electrical characteristics of the polycarbonate resin. Thus, the metal salt compound is more preferably at least one metal salt compound selected from the group consisting of alkali metal salts and alkaline-earth metal salts, still more preferably an alkali metal salt compound, and particularly preferably a sodium salt compound, a potassium salt compound, or a cesium salt compound.

Examples of the metal salt compound include organic metal salt compounds and inorganic metal salt compounds. In terms of dispersibility in thermoplastic resins, organic metal salt compounds are preferred.

The description of [3. Metal Salt Compound] in II. Second Aspect of the Present Invention can be applied to the metal salt compound used in the third aspect of the present invention.

The content of the flame retardant in the thermoplastic resin composition according to the third aspect of the present invention is preferably 0.001 parts by mass or more, more preferably 0.02 parts by mass or more, and still more preferably 0.05 parts by mass or more and preferably 30 parts by mass or less, more preferably 20 parts by mass or less, and still more preferably 10 parts by mass or less relative to 100 parts by mass of the thermoplastic resin.

In the case that the flame retardant in the thermoplastic resin composition according to the third aspect of the present invention is the metal salt compound described above, the content of the flame retardant is preferably 0.001 parts by mass or more, more preferably 0.02 parts by mass or more, still more preferably 0.03 parts by mass or more, and particularly preferably 0.05 parts by mass or more and preferably 30 parts by mass or less, more preferably 20 parts by mass or less, still more preferably 10 parts by mass or less, and particularly preferably 1 part by mass or less.

An excessively low content of metal salt compound has insufficient effects, of improving the flame resistance of the thermoplastic resin composition, supposed to be produced by the blend thereof. On the other hand, an excessively high content of metal salt compound may result in reduced thermal stability of the thermoplastic resin composition and poor appearance and low mechanical strength of a formed product.

[6. Other Components]

The thermoplastic resin composition according to the third aspect of the present invention may optionally contain various resin additive agents as components other than those described above, provided that desired physical properties are not significantly deteriorated.

Examples of the resin additive agents include a heat stabilizer, an antioxidant, a mold-release agent, an ultraviolet absorber, a dye or pigment, a fibrous reinforcement, an optical function regulator, a flame retardant, an antistatic agent, an anti-fogging agent, a lubricant, an anti-blocking agent, a flow modifier, a sliding modifier, a plasticizer, a dispersant, and an antimicrobial agent. The resin additive agents may be contained alone, or two or more of the resin additive agents may be contained at any ratio.

The descriptions of Heat Stabilizer, Antioxidant, Mold-Release Agent, Ultraviolet Absorber, and Dye or Pigment in <Resin Additive Agents> that may be contained in the polycarbonate resin composition according to I. First Aspect of the Present Invention can be applied to resin additive agents Heat Stabilizer, Antioxidant, Mold-Release Agent, Ultraviolet Absorber, and Dye or Pigment, respectively, suitable for the thermoplastic resin composition according to the third aspect of the present invention. Their amounts to be blended may be determined by replacing the polycarbonate resin in the polycarbonate resin composition with the thermoplastic resin in the thermoplastic resin composition.

[Fibrous Reinforcement]

Examples of the fibrous reinforcement include glass fibers, carbon fibers, various metal fibers, and whiskers, which are used as reinforcements for thermoplastic resins, and glass fibers or carbon fibers are preferably used.

The blend of the fibrous reinforcement with the thermoplastic resin composition according to the third aspect of the present invention provides a resin composition that achieves a formed product having high mechanical strength required for electrical and electronic devices, OA equipment, and the like.

A fibrous reinforcement having a large diameter has poor flexibility and a fibrous reinforcement having a small diameter of less than 1 μm is not easily available. Therefore, the average diameter (average fiber diameter) of the fibrous reinforcement is generally 1 to 100 μm and more preferably 2 to 50 μm. In consideration of availability and effects as a reinforcement, a fibrous reinforcement having an average diameter of 3 to 30 μm, particularly 5 to 20 μm, is preferably used.

The length of the fibrous reinforcement is preferably 0.1 mm or more in terms of reinforcement effects. The upper limit of the length of the fibrous reinforcement is generally 20 mm. A fibrous reinforcement having a length larger than the upper limit is generally shortened due to breaking when a resin composition is prepared by melt-kneading. A fibrous reinforcement having an average length of 0.3 to 5 mm is preferably used.

The fibrous reinforcement is generally used in the form of a chopped strand obtained by chopping a bunch of fibers so as to have a certain length. The blend of carbon fibers imparts conductivity to resin compositions. If a resin composition having high resistance is desired, glass fibers are used.

In the case where the fibrous reinforcement is blended with the thermoplastic resin composition according to the third aspect of the present invention, the content of the fibrous reinforcement in the thermoplastic resin composition is generally 5 to 100 parts by mass relative to 100 parts by mass of the thermoplastic resin. A fibrous reinforcement content of less than 5 parts by mass results in a small reinforcement effect, and a fibrous reinforcement content of more than 100 parts by mass deteriorates the mechanical properties, such as impact resistance, of the resin composition. The preferred content of the fibrous reinforcement in the thermoplastic resin composition of the present invention is 10 to 70 parts by mass, particularly 15 to 50 parts by mass, relative to 100 parts by mass of the thermoplastic resin.

[Optical Function Regulator]

An optical function regulator improves the light-shielding effect, whiteness, and light reflection characteristics of a formed product obtained from the thermoplastic resin composition according to the third aspect of the present invention. Specifically, titanium oxide is used as the optical function regulator.

The production method, crystal form, and average particle size of titanium oxide used in the third aspect of the present invention are not particularly limited, but are preferably as follows.

The production method of titanium oxide includes a sulfuric acid method and a chlorine method. Since titanium oxide produced by the sulfuric acid method tends to be inferior in terms of the whiteness of a composition containing the titanium oxide, titanium oxide is suitably produced by the chlorine method in order to effectively achieve the object provided by blending an optical function regulator.

The crystal form of titanium oxide includes a rutile type and an anatase type, and a rutile type crystal form is preferred in terms of light resistance.

The average particle size of titanium oxide is generally 0.1 to 0.7 μm and preferably 0.1 to 0.4 μm. Titanium oxide having an average particle size of less than 0.1 μm produces a poor light-shielding effect of formed products. Titanium oxide having an average particle size of more than 0.7 μm results in a rough surface and reduced mechanical strength of formed products. Herein, the average particle size of titanium oxide is an average value of primary particle sizes measured using a transmission electron microscope (TEM).

In the present invention, two or more titanium oxides having different average particle sizes may be used in combination.

The titanium oxide used in the third aspect of the present invention may be subjected to surface treatment.

An example of a surface-treating agent used herein is an organosiloxane-based surface-treating agent. Before surface treatment is performed with the organosiloxane-based surface-treating agent, pretreatment is preferably performed with an alumina-based surface-treating agent or a combination of an alumina-based surface-treating agent and a silica-based surface-treating agent. Titanium oxide pretreated with an alumina-based surface-treating agent and optionally a silica-based surface-treating agent is subjected to surface treatment with an organosiloxane-based surface-treating agent to considerably improve the thermal stability and further favorably improve the uniform dispersibility and the stability of dispersion state in the thermoplastic resin composition.

An alumina hydrate is suitably used as the alumina-based surface-treating agent. A silica hydrate is suitably used as the silica-based surface-treating agent. Any pretreatment method can be employed. The pretreatment is preferably performed so that 1 to 15% by mass of alumina-based surface-treating agent, such as alumina hydrate, and optionally silica-based surface-treating agent, such as silica hydrate, are used with respect to titanium oxide. That is, in the case where the pretreatment is performed with only an alumina-based surface-treating agent, 1 to 15% by mass of alumina-based surface-treating agent is preferably used with respect to the titanium oxide additive agent. In the case where both an alumina-based surface-treating agent and a silica-based surface-treating agent are used, the total amount thereof is preferably 1 to 15% by mass with respect to the titanium oxide additive agent. Herein, in the case where both an alumina-based surface-treating agent and a silica-based surface-treating agent are used, the amount of silica-based surface-treating agent is preferably about 35 to 90% by mass relative to the total amount of alumina-based surface-treating agent and silica-based surface-treating agent.

A polyorganohydrogensiloxane compound is preferably used as the organosiloxane-based surface-treating agent.

The method for surface-treating titanium oxide with the organosiloxane-based surface-treating agent includes a wet method and a dry method.

The wet method is a method in which pretreated titanium oxide is added to a mixture solution of an organosiloxane-based surface-treating agent and a solvent, stirring and desolvation are performed, and then heat treatment is performed at 100 to 300° C. Examples of the dry method include a method in which pretreated titanium oxide and an organosiloxane-based surface-treating agent are mixed using a Henschel mixer or the like and a method in which an organic solvent containing an organosiloxane-based surface-treating agent is sprayed onto pretreated titanium oxide and heat treatment is performed at 100 to 300° C.

The degree of surface treatment of the pretreated titanium oxide additive agent performed with the organosiloxane-based surface-treating agent is not particularly limited. However, in consideration of the reflectivity of titanium oxide and the moldability of a resin composition to be obtained, the amount of organosiloxane-based surface-treating agent is generally 1 to 5% by mass with respect to titanium oxide.

In the case where titanium oxide serving as an optical function regulator is used in the thermoplastic resin composition according to the third aspect of the present invention, the blending amount is 3 to 30 parts by mass relative to 100 parts by mass of the thermoplastic resin. Titanium oxide having a blending amount of less than 3 parts by mass causes insufficient light-shielding effects and reflection characteristics of the resultant formed product. Titanium oxide having a blending amount of more than 30 parts by mass causes insufficient impact resistance. The blending amount of titanium oxide is preferably 3 to 25 parts by mass and more preferably 5 to 20 parts by mass relative to 100 parts by mass of the thermoplastic resin. The mass of titanium oxide means the total mass of titanium oxide and alumina-based, silica-based, and organosiloxane-based surface-treating agents used for surface-treating the titanium oxide.

[7. Method for Producing Thermoplastic Resin Composition]

A method for producing the thermoplastic resin composition according to the third aspect of the present invention is not particularly limited. Various known methods for producing thermoplastic resin compositions can be employed.

A specific example of the method is a method in which a thermoplastic resin, a fluoropolymer, a polycarbosilane compound serving as a fluoropolymer dispersant, and a flame retardant and other components to be optionally blended are mixed in advance, for example, in a mixer, such as a tumbler or a Henschel mixer, and are melt-kneaded in a mixer, such as a Banbury mixer, a roll, a Brabender, a single-screw extruder, a twin-screw extruder, or a kneader.

Alternatively, for example, the components are not mixed in advance, or part of the components is mixed in advance, and the components are supplied to an extruder with a feeder and then melt-kneaded to produce the thermoplastic resin composition according to the third aspect of the present invention.

Alternatively, for example, part of the components is mixed in advance and is supplied to and melt-kneaded in an extruder to produce a resin composition as a masterbatch. This masterbatch is again mixed with the other components and melt-kneaded to produce the thermoplastic resin composition according to the third aspect of the present invention.

When a component that is difficult to disperse is mixed, the component that is difficult to disperse can be dissolved or dispersed in advance in a solvent, such as water or an organic solvent. The solution or dispersion liquid is kneaded with other components and thus high dispersibility can be achieved.

[8. Thermoplastic Resin Formed Product]

The thermoplastic resin composition according to the third aspect of the present invention can generally be formed into thermoplastic resin formed products having any shape. The shape, design, color, and size of the formed products are not particularly limited and may be appropriately determined in accordance with each application of the formed products.

Examples of the formed products include components of electrical and electronic devices, OA equipment, information terminals, mechanical parts, household electrical appliances, vehicle parts, architectural members, various containers, recreational equipment and miscellaneous articles, and illuminators; and members for near-infrared laser welding, and members for sensing devices, exemplified by various automobile sensing devices, such as face direction detection systems and rain sensors, various security systems, such as face recognition systems, fingerprint recognition systems, and vein recognition systems, and various information communication devices, such as remote controllers and infrared communication devices, in automobile, electrical and electronic, and other precision apparatus fields.

A method for manufacturing formed products is not particularly limited. Any common molding method for thermoplastic resin compositions can be employed. Examples of the common molding method include an injection molding method, an ultra-high-speed injection molding method, an injection compression molding method, a coinjection molding method, gas-assisted blow molding methods and the like, molding methods using insulated metal dies, molding methods using rapid heating metal dies, a foam molding (including supercritical fluid) method, an insert molding method, an IMC (in-mold coating molding) molding method, an extrusion molding method, a sheet forming method, a thermoforming method, a rotational molding method, a laminate molding method, and a press forming method. A hot-runner molding method may also be used.

The thermoplastic resin formed product according to the third aspect of the present invention obtained by shaping the thermoplastic resin composition according to the third aspect of the present invention has melt properties of the thermoplastic resin and surface properties, such as sliding characteristics, scratch resistance, water repellency, oil repellency, stain resistance, and fingerprint resistance, improved by the blend of the fluoropolymer and furthermore has improved flame resistance, without adversely affecting the excellent intrinsic characteristics of thermoplastic resins. Thus, the thermoplastic resin formed product can be used as a practical formed product in a wide variety of applications.

IV. Fourth Aspect of the Present Invention

[1. Overview]

A polycarbonate resin composition according to the fourth aspect of the present invention contains at least a polycarbonate resin, a metal salt compound, and a polysilane. The polycarbonate resin composition according to the fourth aspect of the present invention may optionally contain other components.

[2. Polycarbonate Resin]

There is no limitation on the type of polycarbonate resin used in the polycarbonate resin composition according to the forth aspect of the present invention. Polycarbonate resins may be used alone, or two or more polycarbonate resins may be combined with each other at any ratio.

Among these, the polycarbonate resin preferably contains a predetermined percentage of a polycarbonate resin having a structural viscosity index N within a predetermined range.

The polycarbonate resin in the fourth aspect of the present invention is a polymer having a basic structure having a carbonate bond represented by the following formula (7).

(7)

In the formula (7), $X^1$ generally represents a hydrocarbon group, and $X^1$ containing a heteroatom or a hetero bond for imparting various characteristics may be used.

Polycarbonate resins can be classified into aromatic polycarbonate resins in which each carbon directly bonded to the carbonate bond is aromatic carbon and aliphatic polycarbonate resins in which each carbon directly bonded to the carbonate bond is aliphatic carbon. Both aromatic polycarbonate resins and aliphatic polycarbonate resins may be used. Aromatic polycarbonate resins are preferred in terms of heat resistance, mechanical properties, and electrical characteristics.

The type of polycarbonate resin is not particularly limited. One example is a polycarbonate polymer produced through the reaction between a dihydroxy compound and a carbonate precursor. In addition to the dihydroxy compound and the carbonate precursor, a polyhydroxy compound may be involved in the reaction. Alternatively, carbon dioxide may be used as the carbonate precursor to react with a cyclic ether. The polycarbonate polymer may have a straight chain or a branched chain. The polycarbonate polymer may be a homopolymer composed of one repeating unit or a copolymer composed of two or more repeating units. The copolymer may be selected from various copolymerization forms, such as a random copolymer and a block copolymer. In general, such polycarbonate polymers are thermoplastic resins.

In the fourth aspect of the present invention, the descriptions of [2-1. Dihydroxy Compound], [2-2. Carbonate Precursor], and [2-3. Method for Producing Polycarbonate Resin] in I. First Aspect of the Present Invention can be applied to [2-1. Dihydroxy Compound], [2-2. Carbonate Precursor], and [2-3. Method for Producing Polycarbonate Resin] of the polycarbonate resin, respectively.

The polycarbonate resin in the fourth aspect of the present invention preferably contains 20% by mass or more of aromatic polycarbonate resin having a structural viscosity index N of 1.2 or more (predetermined N polycarbonate resin). The descriptions of [2-4. Structural Viscosity Index of Polycarbonate Resin] and [2-5. Method for Producing Predetermined N Polycarbonate Resin] in II. Second Aspect of the Present Invention can be applied to [2-4. Structural Viscosity Index of Polycarbonate Resin] and [2-5. Method for Producing Predetermined N Polycarbonate Resin], respectively.

The description of [2-4. Other Matters regarding Polycarbonate Resin] in I. First Aspect of the Present Invention can be applied to [2-6. Other Matters regarding Polycarbonate Resin] of the polycarbonate resin used in the fourth aspect of the present invention.

[3. Metal Salt Compound]

The polycarbonate resin composition according to the fourth aspect of the present invention contains a metal salt compound. The metal salt compound can improve the flame resistance of the polycarbonate resin composition according to the fourth aspect of the present invention.

Alkali metals or alkaline-earth metals are preferred as metals of the metal salt compound. This is because they can promote the formation of a carbonized layer during the combustion of the polycarbonate resin composition according to the fourth aspect of the present invention, thereby further improving flame resistance, and can maintain excellent mechanical properties, such as impact resistance, heat resistance, and electrical characteristics of the polycarbonate resin. Thus, the metal salt compound is preferably at least one metal salt compound selected from the group consisting of alkali metal salts and alkaline-earth metal salts and more preferably an alkali metal salt.

Examples of the metal salt compound include organic metal salt compounds and inorganic metal salt compounds. In terms of dispersibility in polycarbonate resins, organic metal salt compounds are preferred.

The description of [3. Metal Salt Compound] in II. Second Aspect of the Present Invention can be applied to the metal salt compound used in the fourth aspect of the present invention.

The content of metal salt compound in the polycarbonate resin composition according to the fourth aspect of the present invention is 0.01 parts by mass or more, preferably 0.02 parts by mass or more, more preferably 0.03 parts by mass or more, and particularly preferably 0.05 parts by mass or more and 1 part by mass or less, preferably 0.75 parts by mass or less, more preferably 0.5 parts by mass or less, and particularly preferably 0.3 parts by mass or less relative to 100 parts by mass of the polycarbonate resin. An excessively low content of metal salt compound may result in insufficient flame resistance of the resultant polycarbonate resin composition. On the other hand, an excessively high content of metal salt compound may result in reduced thermal stability of the polycarbonate resin and poor appearance and low mechanical strength of a formed product.

[4. Polysilane]

The polycarbonate resin composition according to the fourth aspect of the present invention contains a polysilane. The polycarbonate resin composition containing the polysilane can have high flowability. Furthermore, the combination of the polysilane and the metal salt compound can significantly improve the flame resistance of the polycarbonate resin composition according to the fourth aspect of the present invention. The detailed reason for the significant synergistic effect of improving flame resistance achieved by combining the metal salt compound is unclear. However, this is probably because the Si—Si bond of the polysilane is partially cleaved due to the catalytic action of the metal salt compound at a temperature during combustion and thus a composite of the polycarbonate resin and the polysilane is efficiently formed.

Any polysilane may be used provided that the polysilane is a polymer having a Si—Si bond. The polysilane may have a linear, branched, cyclic, or network structure, but generally has at least one of the structural units represented by the following formulae (1) to (3).

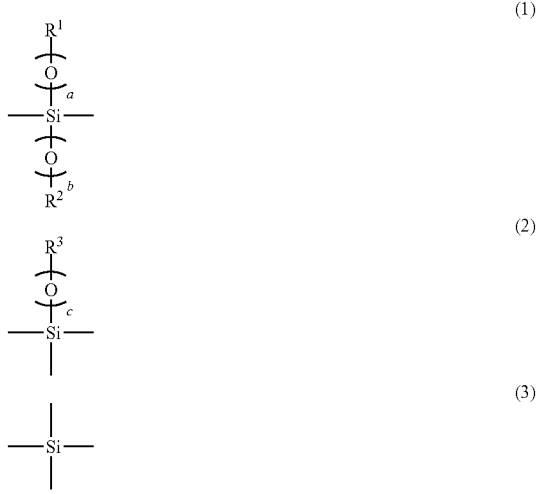

In the formulae (1) to (3), $R^1$, $R^2$, and $R^3$ each independently represent a monovalent hydrocarbon group, a hydrogen atom, or a silyl group; a, b, and c each independently represent 0 or 1; and a plurality of $R^1$s, $R^2$s, and $R^3$s in the main chain structure may each be the same or different.

Examples of such a polysilane include linear or cyclic polysilanes having a structural unit represented by the formula (1), branched or network polysilanes having a structural unit represented by the formula (2) or (3), and polysilanes having a combination of structural units represented by the formulae (1) to (3), for example, a combination of the formula (1) and the formula (2), the formula (1) and the formula (3), the formula (2) and the formula (3), or the formulae (1) to (3). Among these, linear polysilanes and cyclic polysilanes are preferred because they tend to have excellent dispersibility in polycarbonate resins. In particular, linear polysilanes are preferred because they tend to have high heat resistance. The linear polysilanes may partially have a branched or network structure.

Specifically, the linear polysilanes having the structural unit represented by the formula (1) can be represented by the following formula (4A), and the cyclic polysilanes having the structural unit represented by the formula (1) can be represented by the following formula (4B).

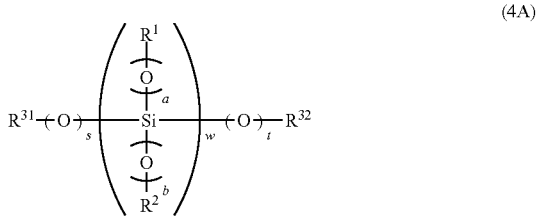

In the formula (4A), $R^1$, $R^2$, a, and b are as defined in the formula (1); $R^{31}$ and $R^{32}$ each independently represent a monovalent hydrocarbon group, a hydrogen atom, or a silyl group; s and t each independently represent 0 or 1; w represents an integer of 3 or more; and a plurality of $R^1$s and $R^2$s in the main chain structure may each be the same or different.

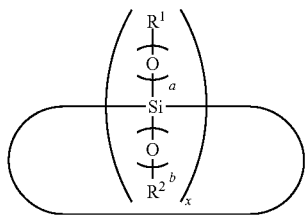

(4B)

In the formula (4B), $R^1$, $R^2$, a, and b are as defined in the formula (1); x represents an integer of 4 to 12; and a plurality of $R^1$s and $R^2$s in the main chain structure may each be the same or different.

In the formulae (1) to (3), (4A), and (4B), the groups $R^1$, $R^2$, and $R^3$ represent at least one selected from monovalent hydrocarbon groups, a hydrogen atom, and silyl groups. Examples of the monovalent hydrocarbon groups include alkyl groups, cycloalkyl groups, alkenyl groups, cycloalkenyl groups, alkynyl groups, aryl groups, and aralkyl groups. Among these, alkyl groups and aryl groups are preferred, alkyl groups are more preferred, and a methyl group is still more preferred. The substituents represented by $R^1$, $R^2$, and $R^3$ in all the repeating units may each be the same or different.

Examples of the alkyl groups include a methyl group, an ethyl group, a propyl group, an isopropyl group, a butyl group, a t-butyl group, a pentyl group, a hexyl group, an octyl group, a decyl group, and a dodecyl group. In general, alkyl groups having 1 to 12 carbon atoms are preferred. Among these, alkyl groups having 1 to 6 carbon atoms, such as a methyl group, an ethyl group, a propyl group, an isopropyl group, a butyl group, a t-butyl group, a pentyl group, and a hexyl group are preferred. A methyl group is particularly preferred.

Examples of the cycloalkyl groups include cycloalkyl groups having 5 to 14 carbon atoms, such as a cyclopentyl group and a cyclohexyl group. Among these, cycloalkyl groups having 5 to 8 carbon atoms are preferred.

Examples of the alkenyl groups include alkenyl groups having 2 to 8 carbon atoms, such as a vinyl group and an allyl group. Examples of the cycloalkenyl groups include cycloalkenyl groups having 5 to 12 carbon atoms, such as a cyclopentyl group and a cyclohexyl group.

Examples of the alkynyl groups include alkynyl groups having 2 to 8 carbon atoms, such as an ethynyl group and a propynyl group, and arylalkynyls, such as an ethynylbenzene group.

Examples of the aryl groups include aryl groups having 6 to 20 carbon atoms, such as a phenyl group, a methylphenyl (or tolyl) group, a dimethylphenyl (or xylyl) group, and a naphthyl group. Among these, aryl groups having 6 to 10 carbon atoms are preferred, and a phenyl group is particularly preferred.

Examples of the aralkyl groups include aralkyl groups having 6 to 20 carbon atoms, such as a benzyl group, a phenethyl group, and a phenylpropyl group. Among these, aralkyl groups having 6 to 10 carbon atoms are preferred, and a benzyl group is particularly preferred.

Examples of the silyl groups include silyl groups having 1 to 10 silicon atoms, such as a silyl group, a disilanyl group, and a trisilanyl group. Among these, silyl groups having 1 to 6 silicon atoms are preferred. At least one of hydrogen atoms of each of the silyl groups may be substituted with a functional group, such as an alkyl group, an aryl group, or an alkoxy group.

In the formulae (1), (4A), and (4B), substituents represented by $R^1$ and $R^2$ each independently preferably represent an alkyl group or an aryl group and particularly preferably represent a methyl group.

The degree of polymerization of the polysilane, that is, the number of the structural units represented by the formulae (1) to (3) in the polysilane is generally 2 or more, preferably 5 or more, and more preferably 10 or more and generally 500 or less, preferably 400 or less, and more preferably 300 or less. A degree of polymerization of 1 or less means a polysilane monomer, and therefore the heat resistance is significantly deteriorated. In the form of a polycarbonate resin composition, such a polysilane is not preferred because it is easily gasified (volatilized) and tends to cause mold fouling and reduce mechanical properties and flame resistance. It is extremely difficult to produce a polysilane having a degree of polymerization of more than 500 and the dispersibility of such a polysilane in polycarbonate resins is extremely low, and therefore such a polysilane is not preferred.

The degree of polymerization of the linear polysilane in the formula (4A), that is, w is generally 3 or more, preferably 5 or more, and more preferably 7 or more and generally 300 or less, preferably 100 or less, more preferably 50 or less, and more preferably 30 or less. This range is preferred for the same reason as described above.

The degree of polymerization of the cyclic polysilane in the formula (4B), that is, x is generally 4 or more and preferably 5 or more and generally 12 or less, preferably 10 or less, and more preferably 8 or less. In particular, x is preferably about 5. A cyclic polysilane having an x of 3 or less is difficult to produce due to its chemical structure. A cyclic polysilane having an x of 13 or more is also difficult to produce.

In the formulae (1) to (3), (4A), and (4B), a, b, c, s, and t represent 0 or 1. When each of a, b, c, s, and t is 0, the polysilane has an alkyl group, a cycloalkyl group, an alkenyl group, a cycloalkenyl group, an alkynyl group, an aryl group, an aralkyl group, a hydrogen atom, or a silyl group as an organic functional group. When each of a, b, c, s, and t is 1, the polysilane has an alkoxy group, a cycloalkyloxy group, an alkenyloxy group, a cycloalkenyloxy group, an alkynyloxy group, an aryloxy group, an aralkyloxy group, or a hydroxyl group as an organic functional group. Although each of a, b, c, s, and t is preferably 0 in terms of the heat resistance of the polysilane, each of a, b, c, s, and t may intentionally be 1 to improve an affinity for resins or unintentionally be 1 by oxidation or other actions.

In the case where the polysilane has an acyclic structure (linear, branched, or network), the terminal substituent is generally a hydrogen atom, a hydroxyl group, an alkyl group, an alkoxy group, or a silyl group.

Examples of the polysilane include polydialkylsilanes, such as polydimethylpolysilane, polymethylpropylsilane, polymethylbutylsilane, polymethylpentylsilane, polydibutylsilane, polydihexylsilane, and a dimethylsilane-methylhexylsilane copolymer; polyalkylarylsilanes, such as polymethylphenylsilane and a methylphenylsilane-phenylhexylsilane copolymer; polydiarylsilanes, such as polydiphenylsilane; and dialkylsilane-alkylarylsilane copolymers, such as a dimethylsilane-methylphenylsilane copolymer, a dimethylsilane-phenylhexylsilane copolymer, and a dimethylsilane-methylnaphthylsilane copolymer. The details of such polysilanes are described in, for example, R. D. Miller, J. Michl, Chemical Review, 89, 1359 (1989), and N. Matsumoto, Japanese Journal of Physics, 37, 5425 (1998).

The molecular weight of the polysilane is generally 300 or more, preferably 400 or more, and more preferably 500 or more and generally 200000 or less, preferably 100000 or less, more preferably 50000 or less, and still more preferably 10000 or less, on a basis of number-average molecular weight. A polysilane having a number-average molecular weight of less than 300 unfavorably has low heat resistance, which may result in reduced flame resistance of the polycarbonate resin composition. A polysilane having a number-average molecular weight of more than 200000 unfavorably has extremely low dispersibility in and compatibility with polycarbonate resins, which may result in reduced mechanical properties and flame resistance.

Any known method may be appropriately used as a method for producing the polysilane according to the fourth aspect of the present invention. Examples of the method include a method in which a silicon-containing monomer having a certain structural unit is prepared as a raw material, and dehalogenation condensation polymerization is performed on halosilanes using magnesium as a reducing agent (magnesium reduction method); a method in which dehalogenation condensation polymerization is performed on halosilanes in the presence of an alkali metal (capping method); a method in which dehalogenation condensation polymerization is performed on halosilanes by electrode reduction; a method in which dehalogenation condensation polymerization is performed on halosilanes by electrode reduction; a method in which dehydrogenation condensation polymerization is performed on hydrazines in the presence of a metal catalyst; a method in which anionic polymerization is performed on disilenes crosslinked with biphenyl or the like; and a method in which ring-opening polymerization is performed on cyclic silanes. Among these methods, the magnesium reduction method is particularly preferred in consideration of ease of control of the purity, molecular weight distribution, and content of impurities, such as sodium and chlorine, of the polysilane to be produced and also in consideration of industrial advantages in terms of production cost and safety. Water may be added to the resultant polysilane to generate a silanol group.

The content of the polysilane in the polycarbonate resin composition according to the fourth aspect of the present invention is 0.01 parts by mass or more, preferably 0.025 parts by mass or more, more preferably 0.05 parts by mass or more, and particularly preferably 0.1 parts by mass or more and 5 parts by mass or less, preferably 3 parts by mass or less, more preferably 2.5 parts by mass or less, and particularly preferably 1 part by mass or less relative to 100 parts by mass of the polycarbonate resin. An excessively low content of polysilane may result in insufficient flame resistance of the resultant polycarbonate resin composition. On the other hand, at an excessively high content of polysilane, its effect may be leveled off and thus its use may be uneconomical. In addition, such an excessively high content of polysilane may result in reduced thermal stability of the polycarbonate resin and poor appearance and low mechanical strength of a formed product. Polysilanes may be used alone or in combination.

[5. Other Components]

The polycarbonate resin composition according to the fourth aspect of the present invention may optionally contain components other than those described above provided that desired physical properties are not significantly deteriorated. Examples of the other components include resins other than polycarbonate resins and various resin additive agents. The other components may be contained alone, or two or more of the other components may be contained at any ratio.

The description of <Other Resins> that may be contained in the polycarbonate resin composition according to I. First Aspect of the Present Invention can be applied to <Other Resins> that may be contained in the polycarbonate resin composition according to the fourth aspect of the present invention.

<Resin Additive Agents>

Examples of the resin additive agents include a heat stabilizer, an antioxidant, a mold-release agent, an ultraviolet absorber, a dye or pigment, a flame retardant, an anti-dripping agent, an antistatic agent, an anti-fogging agent, a lubricant, an anti-blocking agent, a flow modifier, a sliding modifier, a plasticizer, a dispersant, and an antimicrobial agent. The resin additive agents may be contained alone, or two or more of the resin additive agents may be contained at any ratio.

The descriptions of (Heat Stabilizer), (Antioxidant), (Mold-Release Agent), (Ultraviolet Absorber), (Dye or Pigment), and (Anti-Dripping Agent) of <Resin Additive Agents> that may be contained in the polycarbonate resin composition according to I. First Aspect of the Present Invention can be applied to exemplary resin additive agents (Heat Stabilizer), (Antioxidant), (Mold-Release Agent), (Ultraviolet Absorber), (Dye or Pigment), and (Anti-Dripping Agent) suitable for the polycarbonate resin composition according to the fourth aspect of the present invention.

[6. Method for Producing Polycarbonate Resin Composition]

A method for producing the polycarbonate resin composition according to the fourth aspect of the present invention is not particularly limited. Various known methods for producing polycarbonate resin compositions can be employed.

A specific example is a method in which the polycarbonate resin according to the fourth aspect of the present invention, a metal salt compound, a polysilane, and other components to be optionally blended are mixed in advance, for example, in a mixer, such as a tumbler or a Henschel mixer, and are melt-kneaded in a mixer, such as a Banbury mixer, a roll, a Brabender, a single-screw extruder, a twin-screw extruder, or a kneader.

Alternatively, for example, the components are not mixed in advance, or part of the components is mixed in advance, and the components are supplied to an extruder with a feeder and are melt-kneaded to produce the polycarbonate resin composition according to the fourth aspect of the present invention.

Alternatively, for example, part of the components is mixed in advance and is supplied to and melt-kneaded in an extruder to produce a resin composition as a masterbatch. This masterbatch is again mixed with the other components and is melt-kneaded to produce the polycarbonate resin composition according to the fourth aspect of the present invention.

When a component that is difficult to disperse is mixed, the component that is difficult to disperse can be dissolved or dispersed in advance in a solvent, such as water or an organic solvent. The solution or dispersion liquid is kneaded with other components and thus high dispersibility can be achieved.

[7. Polycarbonate Resin Formed Product]

The polycarbonate resin composition according to the fourth aspect of the present invention is generally formed into polycarbonate resin formed products having any shape. The shape, design, color, and size of the formed products are not particularly limited and may be appropriately determined in accordance with each application of the formed products.

Examples of the formed products include components of electrical and electronic devices, OA equipment, information terminals, mechanical parts, household electrical appliances, vehicle parts, architectural members, various containers, recreational equipment and miscellaneous articles, and illuminators. Among these, the formed products are suitably used for components of electrical and electronic devices, OA equipment, information terminals, and household electrical appliances and are particularly suitably used for components of electrical and electronic devices.

Examples of the electrical and electronic devices include personal computers, game machines, display units, such as television sets, printers, copying machines, scanners, facsimiles, electronic notebooks and PDAs, electronic calculators, electronic dictionaries, cameras, video cameras, cellular phones, battery packs, recording medium drives and readers, mouses, numeric keypads, CD players, MD players, and portable radios and audio-players.

A method for manufacturing formed products is not particularly limited. Any common molding method for polycarbonate resin compositions can be employed. Examples of the common molding method include an injection molding method, an ultra-high-speed injection molding method, an injection compression molding method, a coinjection molding method, gas-assisted blow molding methods and the like, molding methods using insulated metal dies, molding methods using rapid heating metal dies, foam molding (including supercritical fluid), insert molding, an IMC (in-mold coating molding) molding method, an extrusion molding method, a sheet forming method, a thermoforming method, a rotational molding method, a laminate molding method, and a press forming method. A hot-runner molding method may also be used.

As described above, the polycarbonate resin formed product according to the fourth aspect of the present invention can be used as a practical formed product having high scratch resistance, without impairing excellent characteristics of polycarbonate resins.

V. Fifth Aspect of the Present Invention

[1. Overview]

The polycarbonate resin composition according to the fifth aspect of the present invention contains at least a polycarbonate resin, a metal salt compound, a fluoropolymer, and a polysilane. The polycarbonate resin composition according to the fifth aspect of the present invention may optionally contain other components.

[2. Polycarbonate Resin]

There is no limitation on the type of polycarbonate resin used in the polycarbonate resin composition according to the fifth aspect of the present invention. Polycarbonate resins may be used alone, or two or more polycarbonate resins may be combined with each other at any ratio.

The polycarbonate resin in the fifth aspect of the present invention is a polymer having a basic structure having a carbonate bond represented by the following formula (7).

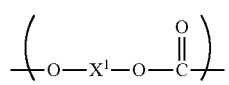
(7)

In the formula (7), $X^1$ generally represents a hydrocarbon group, and $X^1$ containing a heteroatom or a hetero bond for imparting various characteristics may be used.

Polycarbonate resins can be classified into aromatic polycarbonate resins in which each carbon directly bonded to the carbonate bond is aromatic carbon and aliphatic polycarbonate resins in which each carbon directly bonded to the carbonate bond is aliphatic carbon. Both aromatic polycarbonate resins and aliphatic polycarbonate resins may be used. Aromatic polycarbonate resins are preferred in terms of heat resistance, mechanical properties, and electrical characteristics.

The type of polycarbonate resin is not particularly limited. One example is a polycarbonate polymer produced through the reaction between a dihydroxy compound and a carbonate precursor. In addition to the dihydroxy compound and the carbonate precursor, a polyhydroxy compound may be involved in the reaction. Alternatively, carbon dioxide may be used as the carbonate precursor to react with a cyclic ether. The polycarbonate polymer may have a straight chain or a branched chain. The polycarbonate polymer may be a homopolymer composed of one repeating unit or a copolymer composed of two or more repeating units. The copolymer may be selected from various copolymerization forms, such as a random copolymer and a block copolymer. In general, such polycarbonate polymers are thermoplastic resins.

In the fifth aspect of the present invention, the descriptions of [2-1. Dihydroxy Compound], [2-2. Carbonate Precursor], and [2-3. Method for Producing Polycarbonate Resin] in I. First Aspect of the Present Invention can be applied to [2-1. Dihydroxy Compound], [2-2. Carbonate Precursor], and [2-3. Method for Producing Polycarbonate Resin] of the polycarbonate resin, respectively.

The polycarbonate resin in the fifth aspect of the present invention may be a polycarbonate resin having a branched structure. A polycarbonate resin having a branched structure (hereinafter sometimes referred to as a "branched polycarbonate resin") can be contained in order to suppress the dripping during the combustion of the polycarbonate resin composition according to the fifth aspect of the present invention and improve the flame resistance.

The description of the method for producing a branched polycarbonate resin in [2-5. Method for Producing Predetermined N Polycarbonate Resin] in II. Second Aspect of the Present Invention can be applied to a method for producing a branched polycarbonate resin.

The description of [2-4. Other Matters regarding Polycarbonate Resin] in I. First Aspect of the Present Invention can be applied to [2-4. Other Matters regarding Polycarbonate Resin] of the polycarbonate resin used in the fifth aspect of the present invention.

[3. Metal Salt Compound]

The polycarbonate resin composition according to the fifth aspect of the present invention contains a metal salt compound. The metal salt compound can improve the flame resistance of the polycarbonate resin composition according to the fifth aspect of the present invention.

Examples of the metal of the metal salt compound include alkali metals, such as lithium (Li), sodium (Na), potassium (K), rubidium (Rb), and cesium (Cs); alkaline-earth metals, such as magnesium (Mg), calcium (Ca), strontium (Sr), and barium (Ba); and aluminum (Al), titanium (Ti), iron (Fe), cobalt (Co), nickel (Ni), copper (Cu), zinc (Zn), zirconium (Zr), and molybdenum (Mo). Among these, alkali metals and alkaline-earth metals are preferred. This is because they can promote the formation of a carbonized layer during the combustion of the polycarbonate resin composition according to the fifth aspect of the present invention, thereby improving flame resistance, and can maintain excellent mechanical properties, such as impact resistance, heat resistance, and electrical characteristics of the polycarbonate resin. Thus, the metal salt compound is more preferably at least one metal salt compound selected from the group consisting of alkali metal salts and alkaline-earth metal salts, still more preferably an alkali metal salt, and particularly preferably sodium, potassium, or cesium.

Examples of the metal salt compound include organic metal salt compounds and inorganic metal salt compounds. In terms of dispersibility in polycarbonate resins, organic metal salt compounds are preferred.

The description of [3. Metal Salt Compound] in II. Second Aspect of the Present Invention can be applied to the metal salt compound used in the fifth aspect of the present invention.

The content of the metal salt compound in the polycarbonate resin composition according to the fifth aspect of the present invention is 0.001 parts by mass or more, preferably 0.005 parts by mass or more, more preferably 0.01 parts by mass or more, and particularly preferably 0.05 parts by mass or more and 1 part by mass or less, preferably 0.75 parts by mass or less, more preferably 0.5 parts by mass or less, and particularly preferably 0.3 parts by mass or less relative to 100 parts by mass of the polycarbonate resin. An excessively low content of metal salt compound may result in insufficient flame resistance of the resultant polycarbonate resin composition. On the other hand, an excessively high content of metal salt compound may result in reduced thermal stability of the polycarbonate resin and poor appearance and low mechanical strength of a formed product.

[4. Fluoropolymer]

There is no limitation on the type of fluoropolymer used in the polycarbonate resin composition according to the fifth aspect of the present invention. Fluoropolymers may be used alone, or two or more fluoropolymers may be combined with each other at any ratio.

The description of [3. Fluoropolymer] in III. Third Aspect of the Present Invention can be applied to the fluoropolymer used in the fifth aspect of the present invention.

In the fifth aspect of the present invention, the content of the fluoropolymer is generally 0.001 parts by mass or more, preferably 0.005 parts by mass or more, more preferably 0.01 parts by mass or more, and particularly preferably 0.05 parts by mass or more and generally 1 part by mass or less, preferably 0.7 parts by mass or less, and more preferably 0.5 parts by mass or less relative to 100 parts by mass of the polycarbonate resin. A fluoropolymer content less than or equal to the lower limit may result in insufficient flame resistant effects produced by the fluoropolymer. A fluoropolymer content more than the upper limit may result in poor appearance and low mechanical strength of formed products obtained by shaping the polycarbonate resin composition.

[5. Polysilane]

The polycarbonate resin composition according to the fifth aspect of the present invention contains a polysilane. The simultaneous inclusion of the polysilane and the metal salt compound can markedly improve the flame resistance of the polycarbonate resin composition according to the fifth aspect of the present invention. The detailed reason for the significant synergistic effect of improving flame resistance achieved by combining the metal salt compound is unclear. However, this is probably because the Si—Si bond of the polysilane is partially cleaved due to the catalytic action of the metal salt compound at a temperature during combustion and thus a composite of the polycarbonate resin and the polysilane is efficiently formed to form a crosslinked structure, which results in an improvement in anti-dripping properties during combustion.

The description of [4. Polysilane] in IV. Fourth Aspect of the Present Invention can be applied to the polysilane used in the fifth aspect of the present invention.

The content of the polysilane in the polycarbonate resin composition according to the fifth aspect of the present invention is 0.01 parts by mass or more, preferably 0.015 parts by mass or more, and more preferably 0.02 parts by mass or more and 2 parts by mass or less, preferably 1.5 parts by mass or less, and more preferably 1 part by mass or less relative to 100 parts by mass of the polycarbonate resin. An excessively low content of polysilane may result in insufficient flame resistance of the resultant polycarbonate resin composition. On the other hand, an excessively high content of polysilane may result in reduced flame resistance or mechanical strength of the polycarbonate resin. Polysilanes may be used alone or in combination.

[6. Other Components]

The polycarbonate resin composition according to the fifth aspect of the present invention may optionally contain components other than those described above provided that desired physical properties are not significantly deteriorated. Examples of the other components include resins other than polycarbonate resins and various resin additive agents. The other components may be contained alone, or two or more of the other components may be contained at any ratio.

The description of <Other Resins> that may be contained in the polycarbonate resin composition according to I. First Aspect of the Present Invention can be applied to <Other Resins> that may be contained in the polycarbonate resin composition according to the fifth aspect of the present invention.

<Resin Additive Agents>

Examples of the resin additive agents include a heat stabilizer, an antioxidant, a mold-release agent, an ultraviolet absorber, a dye or pigment, a fibrous reinforcement, an optical function regulator, a flame retardant, an anti-dripping agent, an antistatic agent, an anti-fogging agent, a lubricant, an anti-blocking agent, a flow modifier, a sliding modifier, a plasticizer, a dispersant, and an antimicrobial agent. The resin additive agents may be contained alone, or two or more of the resin additive agents may be contained at any ratio.

The descriptions of Heat Stabilizer, Antioxidant, Mold-Release Agent, Ultraviolet Absorber, and Dye or Pigment of <Resin Additive Agents> that may be contained in the polycarbonate resin composition according to I. First Aspect of the Present Invention can be applied to exemplary resin additive agents Heat Stabilizer, Antioxidant, Mold-Release Agent, Ultraviolet Absorber, and Dye or Pigment suitable for the polycarbonate resin composition according to the fifth aspect of the present invention, respectively.

Regarding Fibrous Reinforcement and Optical Function Regulator, the descriptions of Fibrous Reinforcement and Optical Function Regulator of <Resin Additive Agents> that may be contained in the thermoplastic resin composition according to III. Third Aspect of the Present Invention can be applied respectively. Their amounts to be blended may be determined by replacing the thermoplastic resin in the thermoplastic resin composition with the polycarbonate resin in the polycarbonate resin composition.

[7. Method for Producing Polycarbonate Resin Composition]

A method for producing the polycarbonate resin composition according to the fifth aspect of the present invention is not particularly limited. Various known methods for producing polycarbonate resin compositions can be employed.

A specific example is a method in which the polycarbonate resin according to the fifth aspect of the present invention, a metal salt compound, a fluoropolymer, a polysilane, and other components to be optionally blended are mixed in advance, for example, in a mixer, such as a tumbler or a Henschel mixer, and are melt-kneaded in a mixer, such as a Banbury mixer, a roll, a Brabender, a single-screw extruder, a twin-screw extruder, or a kneader.

Alternatively, for example, the components are not mixed in advance, or part of the components is mixed in advance, and the components are supplied to an extruder with a feeder and are melt-kneaded to produce the polycarbonate resin composition according to the fifth aspect of the present invention.

Alternatively, for example, part of the components is mixed in advance and is supplied to and melt-kneaded in an extruder to produce a resin composition as a masterbatch. This masterbatch is again mixed with the other components and is melt-kneaded to produce the polycarbonate resin composition according to the fifth aspect of the present invention.

When a component that is difficult to disperse is mixed, the component that is difficult to disperse can be dissolved or dispersed in advance in a solvent, such as water or an organic solvent. The solution or dispersion liquid is kneaded with other components and thus high dispersibility can be achieved.

[8. Polycarbonate Resin Formed Product]

The polycarbonate resin composition according to the fifth aspect of the present invention is generally formed into polycarbonate resin formed products having any shape. The shape, design, color, and size of the formed products are not particularly limited and may be appropriately determined in accordance with each application of the formed products.

Examples of the formed products include components of electrical and electronic devices, OA equipment, information terminals, mechanical parts, household electrical appliances, vehicle parts, architectural members, various containers, recreational equipment and miscellaneous articles, and illuminators. Among these, the formed products are suitably used for components of electrical and electronic devices, OA equipment, information terminals, household electrical appliances, and illuminators and are particularly suitably used for components of electrical and electronic devices.

Examples of the electrical and electronic devices include personal computers, game machines, display units, such as television sets, printers, copying machines, scanners, facsimiles, electronic notebooks and PDAs, electronic calculators, electronic dictionaries, cameras, video cameras, cellular phones, battery packs, recording medium drives and readers, mouses, numeric keypads, CD players, MD players, and portable radios and audio-players.

A method for manufacturing formed products is not particularly limited. Any common molding method for polycarbonate resin compositions can be employed. Examples of the common molding method include an injection molding method, an ultra-high-speed injection molding method, an injection compression molding method, a coinjection molding method, gas-assisted blow molding methods and the like, molding methods using insulated metal dies, molding methods using rapid heating metal dies, foam molding (including supercritical fluid), insert molding, an IMC (in-mold coating molding) molding method, an extrusion molding method, a sheet forming method, a thermoforming method, a rotational molding method, a laminate molding method, and a press forming method. A hot-runner molding method may also be used.

As described above, the polycarbonate resin formed product according to the fifth aspect of the present invention can be used as a practical formed product having high flame resistance and excellent mechanical properties, without impairing excellent characteristics of polycarbonate resins.

VI. Sixth Aspect of the Present Invention

[1. Overview]

A polycarbonate resin composition according to a sixth aspect of the present invention contains at least a polycarbonate resin, a metal salt compound, and a polysilane having an aryl group. The polycarbonate resin composition according to the sixth aspect of the present invention may optionally contain other components.

[2. Polycarbonate Resin]

There is no limitation on the type of polycarbonate resin used in the polycarbonate resin composition according to the sixth aspect of the present invention. Polycarbonate resins may be used alone, or two or more polycarbonate resins may be combined with each other at any ratio.

The polycarbonate resin in the sixth aspect of the present invention is a polymer having a basic structure having a carbonate bond represented by the following formula (7).

(7)

In the formula (7), $X^1$ generally represents a hydrocarbon group, and $X^1$ containing a heteroatom or a hetero bond for imparting various characteristics may be used.

Polycarbonate resins can be classified into aromatic polycarbonate resins in which each carbon directly bonded to the carbonate bond is aromatic carbon and aliphatic polycarbonate resins in which each carbon directly bonded to the carbonate bond is aliphatic carbon. Both aromatic polycarbonate resins and aliphatic polycarbonate resins may be used. Aromatic polycarbonate resins are preferred in terms of heat resistance, mechanical properties, and electrical characteristics.

The type of polycarbonate resin is not particularly limited. One example is a polycarbonate polymer produced through the reaction between a dihydroxy compound and a carbonate precursor. In addition to the dihydroxy compound and the carbonate precursor, a polyhydroxy compound may be involved in the reaction. Alternatively, carbon dioxide may be used as the carbonate precursor to react with a cyclic ether. The polycarbonate polymer may have a straight chain or a branched chain. The polycarbonate polymer may be a homopolymer composed of one repeating unit or a copolymer composed of two or more repeating units. The copolymer may be selected from various copolymerization forms, such as a random copolymer and a block copolymer. In general, such polycarbonate polymers are thermoplastic resins.

In the sixth aspect of the present invention, the descriptions of [2-1. Dihydroxy Compound], [2-2. Carbonate Precursor], and [2-3. Method for Producing Polycarbonate Resin] in I. First Aspect of the Present Invention can be applied to [2-1. Dihydroxy Compound], [2-2. Carbonate Precursor], and [2-3. Method for Producing Polycarbonate Resin] of the polycarbonate resin, respectively.

The polycarbonate resin in the sixth aspect of the present invention preferably contains 20% by mass or more of aromatic polycarbonate resin having a structural viscosity index N of 1.2 or more (predetermined N polycarbonate resin). The descriptions of [2-4. Structural Viscosity Index of Polycarbonate Resin] and [2-5. Method for Producing Predetermined N Polycarbonate Resin] in II. Second Aspect of the Present Invention can be applied to [2-4. Structural Viscosity Index of Polycarbonate Resin] and [2-5. Method for Producing Predetermined N Polycarbonate Resin], respectively.

The description of [2-4. Other Matters regarding Polycarbonate Resin] in I. First Aspect of the Present Invention can be applied to [2-6. Other Matters regarding Polycarbonate Resin] of the polycarbonate resin used in the sixth aspect of the present invention.

[3. Metal Salt Compound]

The polycarbonate resin composition according to the sixth aspect of the present invention contains a metal salt compound. The metal salt compound can improve the flame resistance of the polycarbonate resin composition according to the sixth aspect of the present invention.

The type of metal of the metal salt compound is preferably an alkali metal or an alkaline-earth metal. This is because they can promote the formation of a carbonized layer during the combustion of the polycarbonate resin composition according to the sixth aspect of the present invention, thereby improving flame resistance, and can maintain excellent mechanical properties, such as impact resistance, heat resistance, and electrical characteristics of the polycarbonate resin. Thus, the metal salt compound is preferably at least one metal salt compound selected from the group consisting of alkali metal salts and alkaline-earth metal salts and more preferably an alkali metal salt.

Examples of the metal salt compound include organic metal salt compounds and inorganic metal salt compounds. In terms of dispersibility in polycarbonate resins, organic metal salt compounds are preferred.

The description of [3. Metal Salt Compound] in II. Second Aspect of the Present Invention can be applied to the metal salt compound used in the sixth aspect of the present invention.

The content of the metal salt compound in the polycarbonate resin composition according to the sixth aspect of the present invention is 0.01 parts by mass or more, preferably 0.02 parts by mass or more, more preferably 0.03 parts by mass or more, and particularly preferably 0.05 parts by mass or more and 1 part by mass or less, preferably 0.75 parts by mass or less, more preferably 0.5 parts by mass or less, and particularly preferably 0.3 parts by mass or less relative to 100 parts by mass of the polycarbonate resin. An excessively low content of metal salt compound may result in insufficient flame resistance of the resultant polycarbonate resin composition. On the other hand, an excessively high content of metal salt compound may result in reduced thermal stability of the polycarbonate resin and poor appearance and low mechanical strength of a formed product.

[4. Polysilane Having Aryl Group]

The polycarbonate resin composition according to the sixth aspect of the present invention contains a polysilane having an aryl group. The simultaneous inclusion of the polysilane having an aryl group and the metal salt compound can markedly improve the flame resistance of the polycarbonate resin composition according to the sixth aspect of the present invention. The detailed reason for the significant synergistic effect of improving flame resistance achieved by combining the metal salt compound is unclear. However, this is probably because the Si—Si bond of the polysilane is partially cleaved due to the catalytic action of the metal salt compound at a temperature during combustion and thus a composite of the polycarbonate resin and the polysilane is efficiently formed.

When a polysilane has an aryl group, the heat resistance of the polysilane itself is increased and the compatibility with and dispersibility in polycarbonate resins are improved. Thus, a polycarbonate resin composition having high transparency and impact resistance is believed to be obtained.

Any polysilane having an aryl group may be used provided that the polysilane is a polymer having an aryl group in the molecule as an essential substituent and a Si—Si bond. Such a polysilane may have a linear, branched, cyclic, or network structure and generally has at least one of the structural units represented by the following formulae (1) to (3).

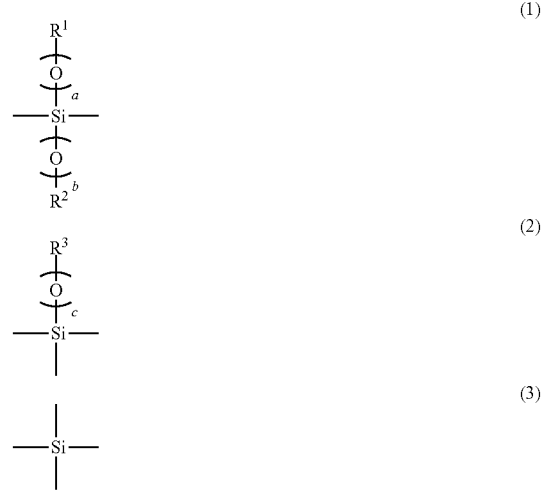

In the formulae (1) to (3), $R^1$, $R^2$, and $R^3$ each independently represent a monovalent hydrocarbon group, a hydrogen atom, or a silyl group; a, b, and c each independently represent 0 or 1; and a plurality of $R^1$s, $R^2$s, and $R^3$s in the main chain structure may each be the same or different, provided that at least one of the $R^1$s, $R^2$s, and $R^3$s in the main chain structure has an aryl group.

Examples of such a polysilane having an aryl group include linear or cyclic polysilanes having an aryl group and a structural unit represented by the formula (1), branched or network polysilanes having an aryl group and a structural unit represented by the formula (2) or (3), and polysilanes having an aryl group and a combination of structural units represented by the formulae (1) to (3), for example, a combination of the formula (1) and the formula (2), the formula (1) and the formula (3), the formula (2) and the formula (3), or the formulae (1) to (3). Among these, linear polysilanes having an aryl group and cyclic polysilanes having an aryl group are preferred because they tend to have high dispersibility in polycarbonate resins. In particular, cyclic polysilanes having an aryl group are preferred because they tend to have high dispersibility in polycarbonate resins.

Specifically, such a cyclic polysilane having an aryl group and a structural unit represented by the formula (1) can also be represented by the following formula (4B).

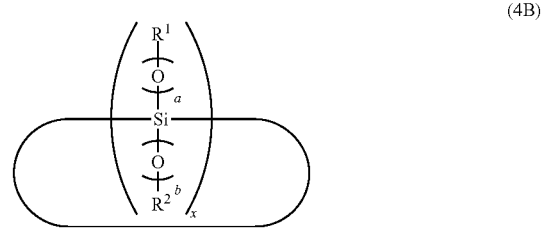

In the formula (4B), $R^1$, $R^2$, a, and b are as defined in the formula (1); x represents an integer of 4 to 12; and a plurality of $R^1$s and $R^2$s in the main chain structure may each be the same or different, provided that at least one of the plurality of $R^1$s and $R^2$s in the main chain structure has an aryl group.

In the formulae (1) to (3) and (4B), the groups $R^1$, $R^2$, and $R^3$ represent at least one selected from monovalent hydrocarbon groups, a hydrogen atom, and silyl groups. Examples of the monovalent hydrocarbon groups include alkyl groups, cycloalkyl groups, alkenyl groups, cycloalkenyl groups, alkynyl groups, aryl groups, and aralkyl groups. Among these, alkyl groups and aryl groups are preferred, aryl groups are more preferred, and a phenyl group is still more preferred. The substituents represented by $R^1$, $R^2$, and $R^3$ in all the repeating units may each be the same or different.

Examples of the alkyl groups include a methyl group, an ethyl group, a propyl group, an isopropyl group, a butyl group, a t-butyl group, a pentyl group, a hexyl group, an octyl group, a decyl group, and a dodecyl group. In general, alkyl groups having 1 to 12 carbon atoms are preferred. Among these, alkyl groups having 1 to 6 carbon atoms, such as a methyl group, an ethyl group, a propyl group, an isopropyl group, a butyl group, a t-butyl group, a pentyl group, and a hexyl group are preferred. A methyl group is particularly preferred.

Examples of the cycloalkyl groups include cycloalkyl groups having 5 to 14 carbon atoms, such as a cyclopentyl group and a cyclohexyl group. Among these, cycloalkyl groups having 5 to 8 carbon atoms are preferred.

Examples of the alkenyl groups include alkenyl groups having 2 to 8 carbon atoms, such as a vinyl group and an allyl group. Examples of the cycloalkenyl groups include cycloalkenyl groups having 5 to 12 carbon atoms, such as a cyclopentyl group and a cyclohexyl group.

Examples of the alkynyl groups include alkynyl groups having 2 to 8 carbon atoms, such as an ethynyl group and a propynyl group, and arylalkynyls, such as an ethynylbenzene group.

Examples of the aryl groups include aryl groups having 6 to 20 carbon atoms, such as a phenyl group, a methylphenyl (or tolyl) group, a dimethylphenyl (or xylyl) group, and a naphthyl group. Among these, aryl groups having 6 to 10 carbon atoms are preferred, and a phenyl group is particularly preferred.

Examples of the aralkyl groups include aralkyl groups having 6 to 20 carbon atoms, such as a benzyl group, a phenethyl group, and a phenylpropyl group. Among these, aralkyl groups having 6 to 10 carbon atoms are preferred, and a benzyl group is particularly preferred.

Examples of the silyl groups include silyl groups having 1 to 10 silicon atoms, such as a silyl group, a disilanyl group, and a trisilanyl group. Among these, silyl groups having 1 to 6 silicon atoms are preferred. At least one of hydrogen atoms of each of the silyl groups may be substituted with a functional group, such as an alkyl group, an aryl group, or an alkoxy group.

Each of the substituents $R^1$ and $R^2$ in the formulae (1) and (4B) is particularly preferably a phenyl group.

The degree of polymerization of the polysilane having an aryl group, that is, the number of the structural units represented by the formulae (1) to (3) in the polysilane having an aryl group is generally 2 or more, preferably 3 or more, and more preferably 4 or more and generally 500 or less, preferably 400 or less, and more preferably 300 or less. A degree of polymerization of 1 or less means a polysilane monomer, and therefore the heat resistance is significantly deteriorated. In the form of a polycarbonate resin composition, such a polysilane is not preferred because it is easily gasified (volatilized) and tends to cause mold fouling and reduce mechanical properties and flame resistance. It is extremely difficult to produce a polysilane having a degree of polymerization of more than 500 and the dispersibility of such a polysilane in polycarbonate resins is extremely low, and therefore such a polysilane is not preferred.

The degree of polymerization of the cyclic polysilane having an aryl group in the formula (4B), that is, x is generally 4 or more and preferably 5 or more and generally 12 or less, preferably 10 or less, and more preferably 8 or less. In particular, x is preferably 5. A cyclic polysilane having an aryl group and an x of 3 or less is difficult to produce due to its chemical structure. A cyclic polysilane having an aryl group and an x of more than 12 is also difficult to produce.

In the formulae (1) to (3) and (4B), a, b, and c represent 0 or 1. When each of a, b, and c is 0, the polysilane having an aryl group has an alkyl group, a cycloalkyl group, an alkenyl group, a cycloalkenyl group, an alkynyl group, an aryl group, an aralkyl group, a hydrogen atom, or a silyl group as an organic functional group. When each of a, b, and c is 1, the polysilane has an alkoxy group, a cycloalkyloxy group, an alkenyloxy group, a cycloalkenyloxy group, an alkynyloxy group, an aryloxy group, an aralkyloxy group, or a hydroxyl group as an organic functional group. Although each of a, b, and c is preferably 0 in terms of the heat resistance of the polysilane having an aryl group, each of a, b, and c may intentionally be 1 to improve an affinity for resins or unintentionally be 1 by oxidation or other actions.

In the case where the polysilane having an aryl group has an acyclic structure (linear, branched, or network), the terminal substituent is generally a hydrogen atom, a hydroxyl group, an alkyl group, an alkoxy group, or a silyl group.

Examples of the polysilane having an aryl group include linear, branched, or network polysilanes having an aryl group, for example, polyalkylarylsilanes, such as polymethylphenylsilane and a methylphenylsilane-phenylhexylsilane copolymer; polydiarylsilanes, such as polydiphenylsilane; and dialkylsilane-alkylarylsilane copolymers, such as a dimethylsilane-methylphenylsilane copolymer, a dimethylsilane-phenylhexylsilane copolymer, and a dimethylsilane-methylnaphthylsilane copolymer; and cyclic polysilanes having an aryl group, for example, cyclic alkylarylsilanes, such as methylphenylcyclosilane, and cyclic arylsilanes, such as diphenylcyclosilane.

The details of such polysilanes having an aryl group are described in, for example, R. D. Miller, J. Michl, Chemical Review, 89, 1359 (1989), and N. Matsumoto, Japanese Journal of Physics, 37, 5425 (1998).

The polysilane having an aryl group according to the sixth aspect of the present invention is particularly preferably a cyclic polysilane having an aryl group and more preferably a cyclic arylsilane. Specific examples of the cyclic arylsilane include octaphenylcyclotetrasilane, decaphenylcyclopentasilane, and dodecaphenylcyclohexasilane. Among these, decaphenylcyclopentasilane is particularly preferred.

Such a cyclic polysilane having an aryl group markedly improve the compatibility with and dispersibility in polycarbonate resins and thus a polycarbonate resin composition having excellent flame resistance, transparency, hue, and impact resistance tends to be obtained.

The molecular weight of the polysilane having an aryl group according to the sixth aspect of the present invention is generally 300 or more, preferably 350 or more, and more preferably 400 or more and generally 200000 or less, preferably 50000 or less, more preferably 10000 or less, still more preferably 5000 or less, and most preferably 2000 or less, on a basis of number-average molecular weight [Mn]. A polysilane having a number-average molecular weight of less than 300 unfavorably has low heat resistance, which may result in reduced flame resistance of the polycarbonate resin composition and mold fouling during shape processing. A polysilane having a number-average molecular weight of more than 200000 unfavorably has extremely low dispersibility in and compatibility with polycarbonate resins, which may result in reduced mechanical properties and flame resistance.

The number-average molecular weight [Mn] of the polysilane having an aryl group is a polystyrene equivalent value measured by gel permeation chromatography (GPC) at a temperature of 40° C. using tetrahydrofuran as a solvent.

Any known method may be appropriately used as a method for producing the polysilane having an aryl group according to the sixth aspect of the present invention. Examples of the method include a method in which a silicon-containing monomer having a certain structural unit is prepared as a raw material, and dehalogenation condensation polymerization is performed on halosilanes using magnesium as a reducing agent (magnesium reduction method); a method in which dehalogenation condensation polymerization is performed on halosilanes in the presence of an alkali metal (capping method); a method in which dehalogenation condensation polymerization is performed on halosilanes by electrode reduction; a method in which dehalogenation condensation polymerization is performed on halosilanes by electrode reduction; a method in which dehydrogenation condensation polymerization is performed on hydrazines in the presence of a metal catalyst; a method in which anionic polymerization is performed on disilenes crosslinked with biphenyl or the like; and a method in which ring-opening polymerization is performed on cyclic silanes. Among these methods, the magnesium reduction method is particularly preferred in consideration of ease of control of the purity, molecular weight distribution, and content of impurities, such as sodium and chlorine, of the polysilane having an aryl group to be produced and also in consideration of industrial advantages in terms of production cost and safety. Water may be added to the resultant polysilane having an aryl group to generate a silanol group.

The content of the polysilane having an aryl group in the polycarbonate resin composition according to the sixth aspect of the present invention is 0.3 parts by mass or more, preferably 0.4 parts by mass or more, more preferably 0.5 parts by mass or more, and particularly preferably 0.75 parts by mass or more and 5 parts by mass or less, preferably 4 parts by mass or less, more preferably 3 parts by mass or less, and particularly preferably 2 parts by mass or less relative to 100 parts by mass of the polycarbonate resin. An excessively low content of polysilane may result in insufficient flame resistance of the resultant polycarbonate resin composition. On the other hand, at an excessively high content of polysilane, its effect may be leveled off and thus its use may be uneconomical. In addition, such an excessively high content of polysilane may result in reduced transparency and impact resistance of the polycarbonate resin and poor appearance and low mechanical strength of a formed product. Polysilanes having an aryl group may be used alone or in combination.

[5. Other Components]

The polycarbonate resin composition according to the sixth aspect of the present invention may optionally contain components other than those described above provided that desired physical properties are not significantly deteriorated. Examples of the other components include resins other than polycarbonate resins and various resin additive agents. The other components may be contained alone, or two or more of the other components may be contained at any ratio.

The description of <Other Resins> that may be contained in the polycarbonate resin composition according to I. First Aspect of the Present Invention can be applied to <Other Resins> that may be contained in the polycarbonate resin composition according to the sixth aspect of the present invention.

<Resin Additive Agents>

Examples of the resin additive agents include a heat stabilizer, an antioxidant, a mold-release agent, an ultraviolet absorber, a dye or pigment, a flame retardant, an anti-dripping agent, a light-diffusing agent, an antistatic agent, an anti-fogging agent, a lubricant, an anti-blocking agent, a flow modifier, a sliding modifier, a plasticizer, a dispersant, and an antimicrobial agent. The resin additive agents may be contained alone, or two or more of the resin additive agents may be contained at any ratio.

The descriptions of (Heat Stabilizer), (Antioxidant), (Mold-Release Agent), (Ultraviolet Absorber), (Dye or Pigment), and (Anti-Dripping Agent) of <Resin Additive Agents> that may be contained in the polycarbonate resin composition according to I. First Aspect of the Present Invention can be applied to exemplary resin additive agents (Heat Stabilizer), (Antioxidant), (Mold-Release Agent), (Ultraviolet Absorber), (Dye or Pigment), and (Anti-Dripping Agent) suitable for the polycarbonate resin composition according to the sixth aspect of the present invention, respectively.

The description of (Light-Diffusing Agent) of <Resin Additive Agents> that may be contained in the polycarbonate resin composition according to II. Second Aspect of the Present Invention can be applied to (Light-Diffusing Agent).

[6. Method for Producing Polycarbonate Resin Composition]

A method for producing the polycarbonate resin composition according to the sixth aspect of the present invention is not particularly limited. Various known methods for producing polycarbonate resin compositions can be employed.

A specific example is a method in which the polycarbonate resin according to the sixth aspect of the present invention, a metal salt compound, a polysilane having an aryl group, and other components to be optionally blended are mixed in advance, for example, in a mixer, such as a tumbler or a Henschel mixer, and are melt-kneaded in a mixer, such as a Banbury mixer, a roll, a Brabender, a single-screw extruder, a twin-screw extruder, or a kneader.

Alternatively, for example, the components are not mixed in advance, or part of the components is mixed in advance, and the components are supplied to an extruder with a feeder and are melt-kneaded to produce a polycarbonate resin composition according to the present invention.

Alternatively, for example, part of the components is mixed in advance and is supplied to and melt-kneaded in an extruder to produce a resin composition as a masterbatch. This masterbatch is again mixed with the other components and is melt-kneaded to produce a polycarbonate resin composition according to the present invention.

When a component that is difficult to disperse is mixed, the component that is difficult to disperse can be dissolved or dispersed in advance in a solvent, such as water or an organic solvent. The solution or dispersion liquid is kneaded with other components and thus high dispersibility can be achieved.

[7. Polycarbonate Resin Formed Product]

The polycarbonate resin composition according to the sixth aspect of the present invention is generally formed into polycarbonate resin formed products having any shape. The shape, design, color, and size of the formed products are not particularly limited and may be appropriately determined in accordance with each application of the formed products.

Examples of the formed products include components of electrical and electronic devices, OA equipment, information terminals, mechanical parts, household electrical appliances, vehicle parts, architectural members, various containers, recreational equipment and miscellaneous articles, and illuminators. Among these, the formed products are suitably used for components of electrical and electronic devices, OA equipment, information terminals, household electrical appliances, and illuminators and are particularly suitably used for components of electrical and electronic devices.

Examples of the electrical and electronic devices include personal computers, game machines, display units, such as television sets, printers, copying machines, scanners, facsimiles, electronic notebooks and PDAs, electronic calculators, electronic dictionaries, cameras, video cameras, cellular phones, battery packs, recording medium drives and readers, mouses, numeric keypads, CD players, MD players, and portable radios and audio-players.

A method for manufacturing formed products is not particularly limited. Any common molding method for polycarbonate resin compositions can be employed. Examples of the common molding method include an injection molding method, an ultra-high-speed injection molding method, an injection compression molding method, a coinjection molding method, gas-assisted blow molding methods and the like, molding methods using insulated metal dies, molding methods using rapid heating metal dies, foam molding (including supercritical fluid), insert molding, an IMC (in-mold coating molding) molding method, an extrusion molding method, a sheet forming method, a thermoforming method, a rotational molding method, a laminate molding method, and a press forming method. A hot-runner molding method may also be used.

As described above, the polycarbonate resin formed product according to the sixth aspect of the present invention can be used as a practical formed product having high flame resistance, transparency, and impact resistance and excellent hue without impairing excellent characteristics of polycarbonate resins.

EXAMPLES

The invention according to the first aspect will now be specifically described on the basis of Examples. The invention according to the first aspect is not limited to Examples below, and any modification can be made without departing from the gist of the present invention.

I. Examples and Comparative Examples according to First Aspect of the Present Invention Production of Resin Pellet The components shown in Table 1 below were blended with each other at the ratios (mass ratios) shown in Table 2 and mixed in a tumbler for 20 minutes. The mixture was supplied to (TEX30HSST) having a single vent and manufactured by The Japan Steel Works, Ltd. and kneaded at a number of screw revolutions of 200 rpm, a discharge rate of 15 kg/hour, and a barrel temperature of 290° C. After that, a molten resin extruded in a strand shape was rapidly cooled in a water bath and pelletized using a pelletizer to obtain a pellet of a polycarbonate resin composition.

[Preparation of Test Piece]

The pellet obtained by the above-described production method was dried at 120° C. for 5 hours and then injection-molded at a cylinder temperature of 280° C., a mold temperature of 80° C., and a molding cycle of 55 seconds using an M150AII-SJ injection molding machine manufactured by Meiki Co., Ltd. to obtain a flat test piece (90 mm×50 mm×2 mm in thickness) and an ASTM test piece (notched test piece with a thickness of 3.2 mm).

[Evaluation of Water Repellency and Oil Repellency]

The water repellency of each polycarbonate resin composition was evaluated as follows using, as a test piece, the flat test piece obtained by the above-described method. A droplet of pure water was dropped onto the test piece and the contact angle (unit: deg) was measured by a θ/2 method using a DropMaster 300 contact angle analyzer manufactured by Kyowa Interface Science Co., Ltd. in an environment of JIS standard temperature and humidity (23° C. and 50% RH). Ten measurement results were averaged to evaluate water repellency. The oil repellency was evaluated by measuring a contact angle by the same method as described above, except that a mixed solution of pure water:isopropyl alcohol=1:1 was used as a droplet to be dropped. A higher value of contact angle means higher water repellency or oil repellency, which is preferable.

Table 2 shows the results.

[Evaluation of Impact Resistance]

The Izod impact strength (unit: J/m) was measured using the ASTM test piece (notched test piece with a thickness of 3.2 mm) prepared above at 23° C. in accordance with ASTM D256.

Table 2 shows the results. In Table 2, the impact resistance is given as "Izod".

[Evaluation of Transparency]

The haze value (unit "%") and the total light transmittance (unit "%") were measured with an NDH-2000 haze meter manufactured by NIPPON DENSHOKU INDUSTRIES Co., Ltd. in accordance with JIS K-7105 using the flat test piece (2 mm in thickness) as a test piece.

The haze value is used as the scale of turbidity of resins. A smaller haze value means higher transparency, which is preferable. The total light transmittance is used as the scale of transmittancy of resins. The total light transmittance is preferably high.

Table 2 shows the results. In Table 2, the haze value is given as "Hz" and the total light transmittance is given as "T".

TABLE 1

| | Abbreviation | Sample |
|---|---|---|
| Polycarbonate resin | (A) | Aromatic polycarbonate resin produced by interfacial polymerization using bisphenol A as a starting material<br>Product name: "Iupilon (registered trademark) S-3000N" manufactured by Mitsubishi Engineering-Plastics Corporation<br>Viscosity-average molecular weight: 21000 |
| Polycarbosilane compound | (B1) | Polycarbosilane compound having a structure represented by formula (6)<br>Product name: "Nipusi Type-L" manufactured by Nippon Carbon Co., Ltd.<br>Number-average molecular weight: 950, Melting point: 66° C. |
| | (B2) | Polycarbosilane compound having a structure represented by formula (6)<br>Product name: "Nipusi Type-A" manufactured by Nippon Carbon Co., Ltd.<br>Number-average molecular weight: 1500, Melting point: 248° C. |
| | (B3) | Polycarbosilane compound having a structure represented by formula (6)<br>Product name: "Nipusi Type-S" manufactured by Nippon Carbon Co., Ltd.<br>Number-average molecular weight: 1600, Melting point: 234° C. |

TABLE 1-continued

| | Abbreviation | Sample |
|---|---|---|
| Other silicon compounds | (C1) | Organosiloxane compound<br>Polydimethylsiloxane<br>Product name: "SH200CV-100CS" manufactured by Dow Corning Toray Co., Ltd. |
| | (D2) | Polysilane compound<br>Polydimethylsilane<br>Number-average molecular weight: 2000 |

TABLE 2

| | | | Example | | | | | | | Comparative Example | | |
|---|---|---|---|---|---|---|---|---|---|---|---|---|
| | Abbreviation | Unit | I-1 | I-2 | I-3 | I-4 | I-5 | I-6 | I-7 | I-1 | I-2 | I-3 |
| Blending ratio of polycarbonate resin | (A) | parts by mass | 99.75 | 99.5 | 99 | 99 | 97 | 95 | 93 | 100 | 99 | 99 |
| | (B1) | | 0.25 | 0.5 | 1 | | | | | | | |
| | (B2) | | | | | 1 | 3 | 5 | | | | |
| | (B3) | | | | | | | | 7 | | | |
| | (C1) | | | | | | | | | | 1 | |
| | (C2) | | | | | | | | | | | 1 |
| Water repellency | | deg | 80 | 81 | 85 | 80 | 84 | 87 | 90 | 77 | 82 | 82 |
| Oil repellency | | deg | 20 | 25 | 27 | 21 | 17 | 13 | 12 | 11 | 26 | 12 |
| Izod | | KJ/m² | 69 | 69 | 65 | 68 | 58 | 51 | 42 | 70 | 28 | 29 |
| Hz | | % | 1.1 | 1.3 | 6.9 | 2.3 | 5.8 | 8.8 | 11.8 | 1 | 99.3 | 99.3 |
| T | | % | 89 | 88 | 85 | 89 | 88 | 87 | 85 | 89 | 40 | 42 |

It is clear from the results above that, by blending a polycarbosilane compound, surface properties, such as water and oil repellency, can be modified without significantly impairing the intrinsic characteristics of the polycarbonate resin, such as transparency and impact resistance.

II. Examples and Comparative Examples according to Second Aspect of the Present Invention Examples II-1 to 11 and Comparative Examples II-1 to 11

Production of Resin Pellet

The components shown in Tables 4a and 4b below were blended with each other at the ratios (mass ratios) shown in Tables 5a to 5d and mixed in a tumbler for 20 minutes. The mixture was supplied to (TEX30HSST) having a single vent and manufactured by The Japan Steel Works, Ltd. and kneaded at a number of screw revolutions of 200 rpm, a discharge rate of 15 kg/hour, and a barrel temperature of 290° C. After that, a molten resin extruded in a strand shape was rapidly cooled in a water bath and pelletized using a pelletizer to obtain a pellet of a polycarbonate resin composition.
[Preparation of Test Piece]

The pellet obtained by the above-described production method was dried at 120° C. for 5 hours and then injection-molded at a cylinder temperature of 260° C., a mold temperature of 80° C., and a molding cycle of 30 seconds using a J50-EP injection molding machine manufactured by The Japan Steel Works, Ltd. to obtain test pieces for UL Test having a length of 125 mm, a width of 13 mm, and thicknesses of 3.2 mm (⅛ inches) and 1.6 mm (1/16 inches).

Similarly, the pellet obtained by the above-described production method was dried at 120° C. for 5 hours and then injection-molded at a cylinder temperature of 280° C., a mold temperature of 80° C., and a molding cycle of 55 seconds using an M150AII-SJ injection molding machine manufactured by Meiki Co., Ltd. to obtain an ASTM test piece (notched test piece with a thickness of 3.2 mm) and a flat test piece (90 mm in width, 50 mm in length, and 3 mm in thickness).

<Evaluation of Flame Resistance>

The flame resistance of each polycarbonate resin composition was evaluated as follows. The test pieces for UL Test prepared by the method above were left in a thermostatic chamber having a temperature of 23° C. and a humidity of 50% for 48 hours, and the flame resistance was evaluated in accordance with the UL 94 Test (Test for flammability of plastic materials for parts in devices and appliances) specified by the U.S.A. Underwriters Laboratories (UL). UL 94V is a method for evaluating flame resistance from the lingering flame time and dripping properties after a burner flame has been applied, for ten seconds, to a test piece having a predetermined size and held in the vertical position. To achieve flame resistance of V-0, V-1, and V-2, the criteria shown in Table 3 below need to be satisfied.

TABLE 3

| | V-0 | V-1 | V-2 |
|---|---|---|---|
| Lingering flame time for each specimen | 10 sec or shorter | 30 sec or shorter | 30 sec or shorter |
| Total lingering flame time for five specimens | 50 sec or shorter | 250 sec or shorter | 250 sec or shorter |
| Cotton ignition by drips | No | No | Yes |

The lingering flame time is the duration of flaming combustion of a test piece after an ignition source has been moved away. The cotton ignition by drips is determined by whether or not marking cotton placed about 300 mm below the bottom of the test piece is ignited by drips from the test piece. Furthermore, the case where even one of five specimens does not satisfy the criteria above was evaluated as NR (not rated) because the case does not satisfy V-2.

Tables 5a to 5d show the results.
<Evaluation of Impact Resistance>

The Izod impact strength (unit: J/m) was measured using the ASTM test piece (notched test piece with a thickness of 3.2 mm) prepared above at 23° C. in accordance with ASTM D256.

Tables 5a to 5d show the results. In Tables 5a to 5d, the impact resistance is given as "Izod".

<Evaluation of Outgassing>

When the flat test piece was injection-molded, the generation of gas from the nozzle tip of the injection molding machine was observed through visual inspection. The case where almost no gas was generated was evaluated as "Good" and the case where gas was significantly generated was evaluated as "Poor".

Tables 5a to 5d show the results. In Tables 5a to 5d, outgassing is given as "low gassing property".

<Evaluation of Mold Fouling>

With a MINIMAT M8/7A molding machine manufactured by Sumitomo Heavy Industries, Ltd., 500 shots of continuous molding were performed on the pellet obtained by the above-described production method, using a drop mold at a molding temperature of 290° C. and a mold temperature of 60° C. After that, the presence or absence of fouling in the mold was observed through visual inspection, and the mold fouling was evaluated in accordance with the criteria below.

Tables 5a to 5d show the results.
Excellent: fouling in the mold is hardly observed.
Good: fouling in the mold is slightly observed.
Poor: a large amount of fouling in the mold is observed.

<Evaluation of Transparency>

The haze value (unit "%") and the total light transmittance (unit "%") were measured with an NDH-2000 haze meter manufactured by NIPPON DENSHOKU INDUSTRIES Co., Ltd. in accordance with JIS K-7105 using the flat test piece (3 mm in thickness) as a test piece.

The haze value is used as the scale of turbidity of resins. A smaller haze value means higher transparency, which is preferable. The total light transmittance is used as the scale of transmittancy of resins. The total light transmittance is preferably high.

Tables 5a to 5d show the results.

In Tables 5a to 5d, the haze value is given as "3 mm Haze" and the total light transmittance is given as "3 mm Transmittance".

TABLE 4a

| | Abbreviation | Sample |
|---|---|---|
| Polycarbonate resin | (A1) | Aromatic polycarbonate resin produced by interfacial polymerization using bisphenol A as a starting material Viscosity-average molecular weight: 21000, Structural viscosity index: 1.0 |
| | (A2) | Aromatic polycarbonate resin produced by interfacial polymerization using bisphenol A as a starting material Viscosity-average molecular weight: 17000, Structural viscosity index: 1.0 |
| | (A3) | Aromatic polycarbonate resin produced by melt transesterification using bisphenol A as a starting material Viscosity-average molecular weight: 27000, Structural viscosity index: 1.3 |
| | (A4) | Aromatic polycarbonate resin produced by interfacial polymerization using bisphenol A as a starting material Viscosity-average molecular weight: 26000, Structural viscosity index: 1.0 |
| Metal salt compound | (B1) | Potassium perfluorobutanesulfonate Product name: "Bayowet C4" manufactured by LANXESS |
| | (B2) | Cesium paratoluenesulfonate Product name: "MEC-142" manufactured by TAKEMOTO OIL & FAT Co., Ltd. |
| Polycarbosilane compound | (C1) | Polycarbosilane compound having a structure represented by formula (6) Product name: "Nipusi Type-L" manufactured by Nippon Carbon Co., Ltd. Number-average molecular weight: 950, Melting point: 66° C. |
| | (C2) | Polycarbosilane compound having a structure represented by formula (6) Product name: "Nipusi Type-A" manufactured by Nippon Carbon Co., Ltd. Number-average molecular weight: 1500, Melting point: 248° C. |
| | (C3) | Polycarbosilane compound having a structure represented by formula (6) Product name: "Nipusi Type-S" manufactured by Nippon Carbon Co., Ltd. Number-average molecular weight: 1600, Melting point: 234° C. |

TABLE 4b

| | Abbreviation | Sample |
|---|---|---|
| Other silicon compounds | (D1) | Organosiloxane compound Polymethylphenylsiloxane Product name: "PH 1555" manufactured by Dow Corning Toray Co., Ltd. |
| | (D2) | Organosiloxane compound Polyphenylsiloxane (including a branched structure) Product name: "SR-21" manufactured by Konishi Chemical Inc. Co., Ltd. |

TABLE 4b-continued

|  | Abbreviation | Sample |
|---|---|---|
|  | (D3) | Organosiloxane compound<br>Phenyltrimethoxysilane<br>Product name: "AY 43-040" manufactured by Dow Corning Toray Co., Ltd. |
|  | (D4) | Organosiloxane compound<br>Octaphenyltetracyclosiloxane manufactured by Shin-Etsu Chemical Co., Ltd. |
|  | (D5) | Polysilane compound<br>Polydimethylsilane<br>Number-average molecular weight: 2000 |
| Stabilizer | (E1) | Heat stabilizer<br>Tris(2,4-di-tert-butylphenyl)phosphite<br>Product name: "ADK STAB 2112" manufactured by Adeka Corp. |
|  | (E2) | Phenol antioxidant<br>Pentaerythritol tetrakis[3-(3,5-di-tert-butyl-4-hydroxyphenyl)propionate]<br>Product name: "Irganox 1010" manufactured by Ciba Specialty Chemicals Co., Ltd. |
| Anti-dripping agent | (F) | Aqueous dispersion liquid of fluoroolefin resin (the content of PTFE: 60% by weight)<br>Product name: "31-JR" manufactured by DU PONT-MITSUI FLUOROCHEMICALS COMPANY, Ltd. |
| Light-diffusing agent | (G) | Polymethylsilsesquioxane particles having an average particle size of 2 μm (spherical)<br>Product name: "Tospearl 120" manufactured by Momentive Performance Materials Inc. |
| Mold-release agent | (H1) | Pentaerythritol tetrastearate<br>Product name: "VPG 861" manufactured by Cognis Japan Ltd. |
|  | (H2) | Stearyl stearate<br>Product name: "Unistar M9676" manufactured by NOF Corporation |

TABLE 5a

|  | Abbreviation | Unit | Example II-1 | Example II-2 | Example II-3 | Example II-4 | Example II-5 | Example II-6 | Example II-7 |
|---|---|---|---|---|---|---|---|---|---|
| Resin composition | (A1) | parts by mass | 99.72 | 99.395 | 99.645 | 99.395 | 99.645 | 99.395 | 99.87 |
|  | (B1) |  | 0.1 | 0.075 | 0.075 | 0.075 | 0.075 | 0.075 |  |
|  | (B2) |  |  |  |  |  |  |  | 0.1 |
|  | (C1) |  | 0.15 | 0.5 |  |  |  |  |  |
|  | (C2) |  |  |  | 0.25 | 0.5 |  |  |  |
|  | (C3) |  |  |  |  |  | 0.25 | 0.5 | 1 |
|  | (E1) |  | 0.03 | 0.03 | 0.03 | 0.03 | 0.03 | 0.03 | 0.03 |
| Flame resistance (3 mm) |  |  | V-0 | V-0 | V-0 | V-0 | V-0 | V-0 | V-0 |
| Izod |  | J/m | 700 | 690 | 680 | 670 | 710 | 700 | 690 |
| Low gassing property |  |  | Good | Good | Good | Good | Good | Good | Good |
| Mold fouling |  |  | Excellent | Good | Excellent | Excellent | Excellent | Excellent | Excellent |
| 3 mm Haze |  | % | 1.9 | 3.8 | 2.1 | 3 | 1.6 | 2 | 3.1 |
| 3 mm Transmittance |  | % | 89 | 87 | 90 | 90 | 90 | 90 | 90 |

TABLE 5b

|  | Abbreviation | Unit | Comparative Example II-1 | Comparative Example II-2 | Comparative Example II-3 | Comparative Example II-4 | Comparative Example II-5 |
|---|---|---|---|---|---|---|---|
| Resin composition | (A1) | parts by mass | 99.97 | 99.895 | 98.47 | 98.97 | 99.894 |
|  | (B1) |  |  | 0.075 |  |  | 0.075 |
|  | (C3) |  |  |  | 0.5 | 1 | 0.001 |
|  | (E1) |  | 0.03 | 0.03 | 0.03 | 0.03 | 0.03 |
| Flame resistance (3 mm) |  |  | V-2 | V-2 | V-2 | V-2 | V-2 |
| Izod |  | J/m | 760 | 710 | 690 | 690 | 690 |
| Low gassing property |  |  | Good | Good | Good | Good | Good |

TABLE 5b-continued

|  | Abbreviation | Unit | Comparative Example II-1 | Comparative Example II-2 | Comparative Example II-3 | Comparative Example II-4 | Comparative Example II-5 |
|---|---|---|---|---|---|---|---|
| Mold fouling |  |  | Excellent | Good | Excellent | Excellent | Excellent |
| 3 mm Haze |  | % | 1.1 | 1 | 1.8 | 3 | 1.1 |
| 3 mm Transmittance |  | % | 90 | 90 | 90 | 90 | 90 |

TABLE 5c

|  | Abbreviation | Unit | Example II-8 | Example II-9 | Example II-10 | Example II-11 |
|---|---|---|---|---|---|---|
| Resin composition | (A2) | parts by mass | 29.65 | 29.4 | 29.15 | 29.65 |
|  | (A3) |  | 70 | 70 | 70 | 70 |
|  | (B1) |  | 0.1 | 0.1 | 0.1 | 0.1 |
|  | (C2) |  | 0.25 | 0.5 | 0.75 |  |
|  | (C3) |  |  |  |  | 0.25 |
| Flame resistance (3 mm) |  |  | V-0 | V-0 | V-0 | V-0 |
| Izod |  | J/m | 660 | 580 | 680 | 660 |
| Low gassing property |  |  | Good | Good | Good | Good |
| Mold fouling |  |  | Excellent | Excellent | Excellent | Excellent |
| 3 mm Haze |  | % | 4.3 | 6.3 | 7.1 | 3.2 |
| 3 mm Transmittance |  | % | 88 | 88 | 88 | 88 |

TABLE 5d

|  | Abbreviation | Unit | Comparative Example II-6 | Comparative Example II-7 | Comparative Example II-8 | Comparative Example II-9 | Comparative Example II-10 | Comparative Example II-11 |
|---|---|---|---|---|---|---|---|---|
| Resin composition | (A1) | parts by mass |  | 19.37 | 28.9 | 18.87 | 18.87 |  |
|  | (A2) |  | 29.9 |  |  |  |  | 29.42 |
|  | (A3) |  | 70 | 80 | 70 | 80 | 80 | 70 |
|  | (B1) |  | 0.1 | 0.1 | 0.1 | 0.1 | 0.1 | 0.08 |
|  | (D1) |  |  | 0.5 |  |  |  |  |
|  | (D2) |  |  |  | 1 |  |  |  |
|  | (D3) |  |  |  |  | 1 |  |  |
|  | (D4) |  |  |  |  |  | 1 |  |
|  | (D5) |  |  |  |  |  |  | 0.5 |
|  | (E1) |  |  | 0.03 |  | 0.03 | 0.03 |  |
| Flame resistance (3 mm) |  |  | V-2 | V-0 | V-1 | V-2 | V-2 | V-0 |
| Izod |  | J/m | 660 | 610 | 450 | 580 | 640 | 340 |
| Low gassing property |  |  | Good | Poor | Good | Poor | Poor | Good |
| Mold fouling |  |  | Excellent | Poor | Good | Poor | Poor | Excellent |
| 3 mm Haze |  | % | 0.7 | 0.4 | 26 | 0.5 | 0.4 | 99 |
| 3 mm Transmittance |  | % | 88 | 88 | 86 | 88 | 88 | 44 |

It is clear from the results above that the polycarbonate resin composition of the present invention obtained by blending a metal salt compound and a polycarbosilane compound with a polycarbonate resin has high flame resistance, impact resistance, and transparency and causes less outgassing and mold fouling.

Example II-12 and Comparative Example II-12

Production of Resin Pellet

The components shown in Tables 4a and 4b above were blended with each other at the ratios (mass ratios) shown in Table 6 and mixed in a tumbler for 20 minutes. The mixture was supplied to (TEX30HSST) having a single vent and manufactured by The Japan Steel Works, Ltd. and kneaded at a number of screw revolutions of 200 rpm, a discharge rate of 15 kg/hour, and a barrel temperature of 290° C. After that, a molten resin extruded in a strand shape was rapidly cooled in a water bath and pelletized using a pelletizer to obtain a pellet of a polycarbonate resin composition.

<Evaluation of Flowability (Q Value)>

The pellet obtained by the above-described production method was dried at 120° C. for 4 hours or more, and then the flow rate per unit time, Q value (unit: $10^{-2}$ cm$^3$/sec), of a composition was measured by a method described in Appendix C of JIS K7210 using a Koka-shiki Flow Tester at 280° C. at a load of 160 kgf to evaluate the flowability. Note that an orifice having 1 mm in diameter and 10 mm in length was used. A higher Q value means higher flowability. Table 6 shows the results.

<Preparation of Test Piece>

The pellet obtained by the above-described production method was dried at 120° C. for 5 hours and then injection-molded at a cylinder temperature of 280° C., a mold temperature of 80° C., and a molding cycle of 30 seconds using a J50-EP injection molding machine manufactured by The Japan Steel Works, Ltd. to obtain test pieces for UL Test having a length of 125 mm, a width of 13 mm, and thicknesses of 1.2 mm and 1.0 mm.

The pellet obtained by the above-described production method was dried at 120° C. for 5 hours and then injection-molded at a cylinder temperature of 280° C., a mold temperature of 80° C., and a molding cycle of 55 seconds using an M150AII-SJ injection molding machine manufactured by Meiki Co., Ltd. to obtain a flat test piece (90 mm in length, 50 mm in width, three steps of 1, 2, and 3 mm in thickness).

Similarly, the pellet obtained by the above-described production method was dried at 120° C. for 5 hours and then injection-molded at a cylinder temperature of 290° C., a mold temperature of 80° C., and a molding cycle of 45 seconds using a Cycap M-2 with a clamping force of 75 T manufactured by Sumitomo Heavy Industries, Ltd. to obtain an ISO multipurpose test piece (4 mm) and an ISO multipurpose test piece (3 mm).

<Evaluation of Flame Resistance>

The flame resistance was evaluated by performing UL Test in the same manner as in Example II-1 using the test pieces for UL Test.

Table 6 shows the results.

<Evaluation of Turbidity>

In a three-millimeter-thickness portion of the flat test piece (with three steps of 1, 2, and 3 mm in thickness), the turbidity was measured in accordance with JIS K-7136 using an NDH-2000 turbidimeter manufactured by NIPPON DENSHOKU INDUSTRIES Co., Ltd. The turbidity is used as the scale of cloudiness of resins. A lower turbidity value means higher transparency. Table 6 shows the results.

<Evaluation of Diffusivity/Degree of Dispersion>

In a one-millimeter-thickness portion and a two-millimeter-thickness portion of the flat test piece (with three steps of 1, 2, and 3 mm in thickness), the brightness was measured with GP-5 GONIOPHOTOMETER manufactured by MURAKAMI COLOR RESEARCH LABORATORY under the conditions that incident light was at 0°, the elevation angle was 0°, the light-receiving range was 0° to 90°, the luminous aperture was 2.0, and the light-receiving aperture was 3.0. The diffusivity (%) was determined from the following formula. The degree of dispersion indicates a light-receiving angle that provides 50% of brightness at a light-receiving angle of 0°, that is, 50% of brightness of a light beam which travels in a straight line after passing through the test piece from a light source. Table 6 shows the results.

Diffusivity(%)=100·[(brightness at a light-receiving angle of 20°+brightness at a light-receiving angle of 70°)/{2·(brightness at a light-receiving angle of 5°)}]

<Evaluation of Heat Resistance>

The deflection temperature under load was measured in accordance with ISO 75-1 and ISO 75-2 using the ISO multipurpose test piece (4 mm) at a load of 1.80 MPa. Table 6 shows the results. In Table 6, the deflection temperature under load is given as "DTUL".

<Evaluation of Bendability>

The bending stress and bending modulus were measured in accordance with ISO 178 using the ISO multipurpose test piece (4 mm) at 23° C. Table 6 shows the results.

<Evaluation of Impact Resistance>

The notched Charpy impact strength (unit: kJ/m$^2$) was measured in accordance with ISO 179 using the ISO multipurpose test piece (3 mm) at 23° C. Table 6 shows the results.

TABLE 6

| | Abbreviation | Unit | Example II-12 | Comparative Example II-12 |
|---|---|---|---|---|
| Resin composition | (A4) | parts by mass | 17.98 | 18.98 |
| | (A3) | | 80 | 80 |
| | (B1) | | 0.09 | 0.09 |
| | (F) | | 0.17 | 0.17 |
| | (C2) | | 1 | |
| | (G) | | 0.5 | 0.5 |
| | (H1) | | 0.1 | 0.1 |
| | (H2) | | 0.1 | 0.1 |
| | (E1) | | 0.03 | 0.03 |
| | (E2) | | 0.03 | 0.03 |

TABLE 6-continued

| | Abbreviation | Unit | Example II-12 | Comparative Example II-12 |
|---|---|---|---|---|
| Flowability (Q value) | | 10$^{-2}$ cm$^3$/sec | 8.4 | 4.5 |
| Flame resistance | 1.2 mm in thickness | | V-0 | V-0 |
| | 1.0 mm in thickness | | V-2 | V-1 |
| Turbidity | Hz (1 mm) | % | 99.0 | 99.1 |
| | Hz (2 mm) | % | 99.3 | 99.3 |
| Diffusivity/ Degree of dispersion | Diffusivity (1 mm) | | 45.5 | 45.6 |
| | Degree of dispersion (1 mm) | | 34.8 | 34.7 |
| | Diffusivity (2 mm) | | 56.6 | 57.2 |
| | Degree of dispersion (2 mm) | | 49.4 | 50.3 |
| DTUL | | ° C. | 125 | 126 |
| Bendability | Elastic modulus (load) | MPa | 2310 | 2380 |
| | Bending stress | MPa | 97 | 99 |
| Impact resistance | | kJ/m$^2$ | 60 | 65 |

It is clear from Table 6 that a satisfactory light-diffusing effect is achieved by blending a light-diffusing agent.

III. Examples and Comparative Examples of Third Aspect of the Present Invention

Examples III-1 to 18 and Comparative Examples III-1 to 3

Production of Resin Pellet

The components shown in Tables 8a and 8b below were blended with each other at the ratios (mass ratios) shown in Tables 9 and 10 and mixed in a tumbler for 20 minutes. The mixture was supplied to (TEX30HSST) having a single vent and manufactured by The Japan Steel Works, Ltd. and kneaded at a number of screw revolutions of 200 rpm, a discharge rate of 15 kg/hour, and a barrel temperature of 290° C. After that, a molten resin extruded in a strand shape was rapidly cooled in a water bath and pelletized using a pelletizer to obtain a pellet of a polycarbonate resin composition.

[Preparation of Test Piece]

The pellet obtained by the above-described production method was dried at 120° C. for 5 hours and then injection-molded at a cylinder temperature of 280° C., a mold temperature of 80° C., and a molding cycle of 55 seconds using an M150AII-SJ injection molding machine manufactured by Meiki Co., Ltd. to obtain a flat test piece (90 mm in length, 50 mm in width, and 1 mm in thickness).

Similarly, the pellet obtained by the above-described production method was dried at 120° C. for 5 hours and then injection-molded at a cylinder temperature of 290° C., a mold temperature of 80° C., and a molding cycle of 30 seconds using a J50-EP injection molding machine manufactured by The Japan Steel Works, Ltd. to obtain a test piece for UL Test having a length of 125 mm, a width of 13 mm, and a thickness of 1.2 mm.

<Evaluation of Near-Infrared Light Transmittance>

The light transmittance in a near-infrared region ranging from 800 nm to 1500 nm (near-infrared light transmittance) was measured with a spectral light transmittance analyzer "UV-3100" manufactured by SHIMADZU Corporation using the flat test piece (1 mm in thickness) as a test piece. Tables 9 and 10 show the results.

<Evaluation of Flame Resistance>

The test piece for UL Test prepared above was left in a thermostatic chamber having a temperature of 23° C. and a humidity of 50% for 48 hours, and the flame resistance was evaluated in accordance with the UL 94 Test (Test for flammability of plastic materials for parts in devices and appliances) specified by the U.S.A. Underwriters Laboratories (UL).

UL 94V is a method for evaluating flame resistance from the lingering flame time and dripping properties after a burner flame has been applied, for ten seconds, to a test piece having a predetermined size and held in the vertical position. To achieve flame resistance of V-0, V-1, and V-2, the criteria shown in Table 7 below need to be satisfied.

TABLE 7

|  | V-0 | V-1 | V-2 |
|---|---|---|---|
| Lingering flame time for each specimen | 10 sec or shorter | 30 sec or shorter | 30 sec or shorter |
| Total lingering flame time for five specimens | 50 sec or shorter | 250 sec or shorter | 250 sec or shorter |
| Cotton ignition by drips | No | No | Yes |

The lingering flame time is the duration of flaming combustion of a test piece after an ignition source has been moved away. The cotton ignition by drips is determined by whether or not marking cotton placed about 300 mm below the bottom of the test piece is ignited by drips from the test piece. Furthermore, the case where even one of five specimens does not satisfy the criteria above was evaluated as NR (not rated) because the case does not satisfy V-2.

Tables 9 and 10 show the results.

TABLE 8a

| | Abbreviation | Sample |
|---|---|---|
| Thermoplastic resin | (A1) | Aromatic polycarbonate resin produced by interfacial polymerization using bisphenol A as a starting material Product name: "Iupilon (registered trademark) S-3000N" manufactured by Mitsubishi Engineering-Plastics Corporation Viscosity-average molecular weight: 21000 |
| Thermoplastic resin | (A2) | Aromatic polycarbonate resin produced by interfacial polymerization using bisphenol A as a starting material Product name: "Iupilon (registered trademark) H-4000N" manufactured by Mitsubishi Engineering-Plastics Corporation Viscosity-average molecular weight: 15000 |
| Fluoropolymer | (B) | Polytetrafluoroethylene capable of forming fibrils Product name: "Teflon (registered trademark) 6J" manufactured by DuPont-Mitsui Fluorochemicals Co., Ltd. |
| Fluoropolymer dispersant | (C1) | Polycarbosilane compound having a structure represented by formula (6) Product name: "Nipusi Type-A" manufactured by Nippon Carbon Co., Ltd. Number-average molecular weight: 1500, Melting point: 248° C. |
| | (C2) | Polycarbosilane compound having a structure represented by formula (6) Product name: "Nipusi Type-S" manufactured by Nippon Carbon Co., Ltd. Number-average molecular weight: 1600, Melting point: 234° C. |
| | (C3) | Polycarbosilane compound having a structure represented by formula (6) Product name: "Nipusi Type-L" manufactured by Nippon Carbon Co., Ltd. Number-average molecular weight: 950, Melting point: 66° C. |

TABLE 8b

| | Abbreviation | Sample |
|---|---|---|
| Flame retardant | (D1) | Metal salt compound, potassium perfluorobutanesulfonate Product name: "Bayowet C4" manufactured by LANXESS |
| | (D2) | Metal salt compound, sodium paratoluenesulfonate Product name: "Chemguard-NATS" manufactured by Chembridge International Corp. |
| Other resins | (E) | Poly-4,4'-isopropylidene-diphenyl carbonate oligomer Product name: "AL071" manufactured by Mitsubishi Engineering-Plastics Corporation |
| Fibrous reinforcement | (F1) | Glass fiber-chopped strand Product name: "ECS03T571" manufactured by Nippon Electric Glass Co., Ltd. Average fiber diameter: 13 μm, Average length: 3 mm |
| | (F2) | Milled glass fiber Product name: "EPG70M99S" manufactured by Nippon Electric Glass Co., Ltd. Average fiber diameter: 9 μm, Average length: 70 μm |

TABLE 8b-continued

| | Abbreviation | Sample |
|---|---|---|
| Mold-release agent | (G1) | Polyethylene wax<br>Product name: "Licowax PE-520PW" manufactured by Clariant (Japan) K.K., Dropping point: 117 to 122° C. |
| | (G2) | Stearic acid<br>Product name: "NAA180" manufactured by NOF Corporation |
| | (G3) | Pentaerythritol distearate<br>Product name: "Unistar H476D" manufactured by NOF Corporation |
| Optical function regulator | (H) | Titanium oxide<br>Product name: "CRNOSS2233" manufactured by KRONOS<br>Average particle size: 0.20 μm |

TABLE 9

| | Abbreviation | Unit | Example III-1 | Example III-2 | Example III-3 | Example III-4 | Example III-5 | Example III-6 | Example III-7 | Example III-8 | Example III-9 | Example III-10 | Example III-11 | Example III-12 |
|---|---|---|---|---|---|---|---|---|---|---|---|---|---|---|
| Resin composition | (A1) | parts by mass | 98.5 | 99.45 | 99.4 | 99.3 | 99.25 | 99.25 | 99.25 | 99.2 | 99 | 99 | 98.5 | 98.5 |
| | (B) | | 0.4 | 0.4 | 0.4 | 0.4 | 0.4 | 0.4 | 0.4 | 0.4 | 0.4 | 0.4 | 0.4 | 0.4 |
| | (C1) | | 1 | | | | 0.25 | | | | | 0.5 | 1 | |
| | (C2) | | | 0.05 | 0.1 | 0.2 | | 0.25 | | 0.3 | | 0.5 | | 1 |
| | (C3) | | | | | | | | 0.25 | | | | | |
| | (D1) | | 0.1 | 0.1 | 0.1 | 0.1 | 0.1 | 0.1 | 0.1 | 0.1 | 0.1 | 0.1 | 0.1 | 0.1 |
| | (D2) | | | | | | | | | | | | | |
| Near-infrared light transmittance | 1000 nm | % | 58.49 | 49.03 | 47.45 | 49.08 | 56.35 | 54.74 | 49.66 | 49.08 | 56.44 | 55.65 | 59.79 | 54.74 |
| | 1050 nm | | 60.95 | 52.70 | 51.78 | 52.89 | 59.66 | 57.95 | 53.02 | 52.89 | 59.43 | 58.83 | 62.39 | 57.49 |
| | 1100 nm | | 62.70 | 55.54 | 54.43 | 55.40 | 61.72 | 59.88 | 55.95 | 55.40 | 61.55 | 60.74 | 64.47 | 59.52 |
| | 1150 nm | | 63.63 | 57.24 | 56.15 | 57.32 | 62.99 | 61.04 | 57.75 | 57.32 | 62.78 | 61.74 | 65.35 | 60.59 |
| | 1200 nm | | 66.42 | 60.89 | 60.07 | 60.94 | 66.34 | 64.38 | 62.04 | 60.94 | 66.00 | 64.88 | 68.23 | 63.52 |
| | 1250 nm | | 68.57 | 63.92 | 63.07 | 63.82 | 68.75 | 66.82 | 65.32 | 63.82 | 68.43 | 67.30 | 70.68 | 65.93 |
| | 1300 nm | | 69.42 | 65.48 | 64.76 | 65.42 | 69.92 | 67.93 | 66.42 | 65.42 | 69.54 | 68.27 | 71.63 | 66.88 |
| | 1350 nm | | 68.76 | 66.06 | 64.84 | 65.52 | 69.61 | 67.76 | 66.52 | 65.52 | 69.42 | 68.26 | 71.38 | 67.12 |
| | 1400 nm | | 67.02 | 64.94 | 64.01 | 64.81 | 68.23 | 66.04 | 65.46 | 64.81 | 67.59 | 66.40 | 69.55 | 65.04 |
| | 1450 nm | | 69.32 | 67.58 | 66.78 | 67.41 | 70.82 | 68.51 | 67.89 | 67.41 | 70.13 | 68.75 | 71.84 | 67.29 |
| | 1500 nm | | 71.63 | 70.16 | 69.56 | 70.13 | 73.24 | 71.05 | 71.01 | 70.13 | 72.47 | 71.05 | 74.17 | 69.48 |
| Flame resistance | | | V-1 | V-1 | V-0 | V-0 | V-0 | V-0 | V-1 | V-1 | V-1 | V-0 | V-0 | V-0 |
| Total combustion time | | sec | 60 | 53 | 43 | 39 | 28 | 20 | 70 | 37 | 65 | 24 | 34 | 30 |

TABLE 10

| | Abbreviation | Unit | Example III-13 | Example III-14 | Example III-15 | Example III-16 | Example III-17 | Example III-18 | Comparative Example III-1 | Comparative Example III-2 | Comparative Example III-3 |
|---|---|---|---|---|---|---|---|---|---|---|---|
| Resin composition | (A1) | parts by mass | 98 | 97.5 | 96.5 | 94.5 | 99.25 | 99 | 99.6 | 99.5 | 99.5 |
| | (B) | | 0.4 | 0.4 | 0.4 | 0.4 | 0.4 | 0.4 | 0.4 | 0.4 | 0.4 |
| | (C1) | | | | | | | | | | |
| | (C2) | | 1.5 | 2 | 3 | 5 | 0.25 | 0.5 | | | |
| | (C3) | | | | | | | | | | |
| | (D1) | | 0.1 | 0.1 | 0.1 | 0.1 | | | | 0.1 | |
| | (D2) | | | | | | 0.1 | 0.1 | | | 0.1 |
| Near-infrared light transmittance | 1000 nm | % | 52.00 | 54.82 | 58.46 | 62.03 | 54.54 | 55.48 | 44.72 | 39.01 | 38.86 |
| | 1050 nm | | 55.92 | 58.36 | 61.44 | 65.42 | 57.77 | 58.66 | 47.79 | 42.99 | 42.78 |
| | 1100 nm | | 58.27 | 60.54 | 63.62 | 67.48 | 59.62 | 60.54 | 50.15 | 46.20 | 46.01 |
| | 1150 nm | | 59.57 | 61.63 | 64.64 | 67.80 | 60.86 | 61.51 | 51.96 | 48.66 | 48.48 |
| | 1200 nm | | 62.96 | 65.05 | 67.71 | 70.67 | 64.14 | 64.63 | 55.26 | 52.59 | 52.42 |
| | 1250 nm | | 65.59 | 67.88 | 70.27 | 73.31 | 66.59 | 67.14 | 57.81 | 55.73 | 55.51 |
| | 1300 nm | | 66.93 | 69.06 | 71.38 | 74.21 | 67.78 | 68.02 | 59.41 | 57.62 | 57.45 |
| | 1350 nm | | 66.80 | 69.25 | 71.04 | 74.04 | 67.56 | 67.98 | 59.21 | 58.26 | 58.02 |
| | 1400 nm | | 65.68 | 67.62 | 69.62 | 72.02 | 65.81 | 66.17 | 58.09 | 57.88 | 57.68 |
| | 1450 nm | | 68.14 | 70.18 | 72.05 | 74.37 | 68.34 | 68.52 | 60.54 | 60.63 | 60.41 |
| | 1500 nm | | 70.78 | 72.51 | 74.54 | 76.46 | 70.84 | 70.81 | 63.17 | 63.64 | 63.46 |
| Flame resistance | | | V-0 | V-1 | V-1 | V-1 | V-0 | V-0 | V-2 | V-2 | V-2 |
| Total combustion time | | sec | 46 | 51 | 66 | 66 | 28 | 42 | 67 | 57 | 101 |

It is clear from the results above that the near-infrared light transmittance and flame resistance can be improved by blending a polycarbosilane compound as a fluoropolymer dispersant.

Examples III-19 and 20 and Comparative Examples III-4 and 5

Production of Resin Pellet

The components shown in Tables 8a and 8b above were blended with each other at the ratios (mass ratios) shown in Tables 11 and 12 and mixed in a tumbler for 20 minutes. The mixture was supplied to (TEX30HSST) having a single vent and manufactured by The Japan Steel Works, Ltd. and kneaded at a number of screw revolutions of 200 rpm, a discharge rate of 15 kg/hour, and a barrel temperature of 290° C. After that, a molten resin extruded in a strand shape was rapidly cooled in a water bath and pelletized using a pelletizer to obtain a pellet of a polycarbonate resin composition.
<Evaluation of Flowability>
MVR (Melt Volume Rate)
The pellet obtained by the above-described production method was dried at 120° C. for 4 hours or more, and then measurement was performed in accordance with ISO 1133 at a measurement temperature of 300° C. and a measurement load of 1.2 kgf (11.8 N). Table 11 shows the results.
Q Value
The pellet obtained by the above-described production method was dried at 120° C. for 4 hours or more, and then the flow rate per unit time, Q value (unit: $10^{-2}$ $cm^3$/sec), of a composition was measured by a method described in Appendix C of JIS K7210 using a Koka-shiki Flow Tester at 280° C. at a load of 160 kgf to evaluate the flowability. Note that an orifice having 1 mm in diameter and 10 mm in length was used. A higher Q value means higher flowability. Table 12 shows the results.
<Preparation of Test Piece>
The pellet obtained by the above-described production method was dried at 120° C. for 5 hours. In the case where the fibrous reinforcement was not contained, the pellet was injection-molded at a cylinder temperature of 280° C., a mold temperature of 80° C., and a molding cycle of 30 seconds using a J50-EP injection molding machine manufactured by The Japan Steel Works, Ltd. In the case where the fibrous reinforcement was contained, the pellet was injection-molded at a cylinder temperature of 300° C., a mold temperature of 110° C., and a molding cycle of 30 seconds. As a result, test pieces for UL Test having a length of 125 mm, a width of 13 mm, and thicknesses of 1.58 mm and 1.2 mm were molded.

The pellet obtained by the above-described production method was dried at 120° C. for 5 hours and then injection-molded at a cylinder temperature of 280° C., a mold temperature of 80° C., and a molding cycle of 55 seconds using an M150AII-SJ injection molding machine manufactured by Meiki Co., Ltd. to obtain a flat test piece (90 mm in length, 50 mm in width, and three steps of 1, 2, and 3 mm in thickness).

Similarly, the pellet obtained by the above-described production method was dried at 120° C. for 5 hours. In the case where the fibrous reinforcement was not contained, the pellet was injection-molded at a cylinder temperature of 280° C., a mold temperature of 80° C., and a molding cycle of 45 seconds using a Cycap M-2 with a clamping force of 75 T manufactured by Sumitomo Heavy Industries, Ltd. In the case where the fibrous reinforcement was contained, the pellet was injection-molded at a cylinder temperature of 300° C., a mold temperature of 110° C., and a molding cycle of 45 seconds. As a result, an ISO multipurpose test piece (4 mm) and an ISO multipurpose test piece (3 mm) were molded.
<Evaluation of Flame Resistance>
The flame resistance was evaluated by performing UL Test in the same manner as in Example III-1 using the test pieces for UL Test.
Tables 11 and 12 show the results.
<Evaluation of Reflectivity>
The reflectivity was measured using a three-millimeter-thickness portion of the flat test piece (having three steps of 1, 2, and 3 mm in thickness). The measurement was performed using Spectrophotometer CM 3600d manufactured by KONICA MINOLTA HOLDINGS, INC. at a D65/10-degree observer with an SCI normal measurement mode. The reflectivity was evaluated at a wavelength of 440 nm. Table 12 shows the results.
<Evaluation of Heat Resistance>
The deflection temperature under load was measured in accordance with ISO 75-1 and ISO 75-2 using the ISO multipurpose test piece (4 mm) at a load of 1.80 MPa. Tables 11 and 12 show the results. In Tables 11 and 12, the deflection temperature under load is given as "DTUL".
<Evaluation of Bendability>
The bending stress and bending modulus were measured in accordance with ISO 178 using the ISO multipurpose test piece (4 mm) at 23° C. Tables 11 and 12 show the results.
<Evaluation of Impact Resistance>
The notched Charpy impact strength (unit: $kJ/m^2$) was measured in accordance with ISO 179 using the ISO multipurpose test piece (3 mm) at 23° C. Tables 11 and 12 show the results.

TABLE 11

| | Abbreviation | Unit | Example III-19 | Comparative Example III-4 |
|---|---|---|---|---|
| Resin composition | (A1) | parts by mass | 68.32 | 69.32 |
| | (E) | | 10 | 10 |
| | (D1) | | 0.08 | 0.08 |
| | (B) | | 0.1 | 0.1 |
| | (C2) | | 1 | |
| | (F1) | | 15 | 15 |
| | (F2) | | 5 | 5 |
| | (G1) | | 0.5 | 0.5 |
| Flowability MVR | | $cm^3$/10 min | 11 | 10 |
| Flame resistance (1.58 mm in thickness) | | UL94 | V-0 | V-1 |
| DTUL | | ° C. | 139 | 139 |
| Bendability | Elastic modulus (load) | MPa | 5430 | 5520 |
| | Bending stress | MPa | 151 | 141 |
| Impact resistance | | $kJ/m^2$ | 7 | 8 |

TABLE 12

| | Abbreviation | Unit | Example III-20 | Comparative Example III-5 |
|---|---|---|---|---|
| Resin composition | (A1) | parts by mass | 43.24 | 44.24 |
| | (A2) | | 43 | 43 |
| | (D2) | | 0.2 | 0.2 |
| | (B) | | 0.4 | 0.4 |
| | (C2) | | 1 | |
| | (H) | | 12 | 12 |
| | (G2) | | 0.08 | 0.08 |
| | (G3) | | 0.08 | 0.08 |

TABLE 12-continued

|  | Abbreviation | Unit | Example III-20 | Comparative Example III-5 |
|---|---|---|---|---|
| Flowability Q value |  | $10^{-2}$ cm$^3$/sec | 15.8 | 14.7 |
| Flame resistance (1.2 mm in thickness) |  | UL94 | V-0 | V-0 |
| Reflectivity |  | % | 94.6 | 94.8 |
| DTUL |  | ° C. | 126 | 125 |
| Bendability | Elastic modulus (load) | MPa | 2440 | 2420 |
|  | Bending stress | MPa | 93 | 90 |
| Impact resistance |  | kJ/m$^2$ | 33 | 41 |

It is clear from Table 11 that the bendability is improved through the blend of a fibrous reinforcement.

It is clear from Table 12 that the reflectivity is improved through the blend of titanium oxide.

IV. Examples and Comparative Examples According to Fourth Aspect of the Present Invention The following components were used in these Examples and Comparative Examples.

PC 1: Polycarbonate resin (bisphenol A-type aromatic polycarbonate resin produced by interfacial polymerization, Iupilon (registered trademark) S-3000 manufactured by Mitsubishi Engineering-Plastics Corporation, viscosity-average molecular weight: 21000, structural viscosity index: 1.0)

PC 2: Polycarbonate resin (bisphenol A-type aromatic polycarbonate resin produced by interfacial polymerization, viscosity-average molecular weight: 17000, structural viscosity index: 1.0)

PC 3: Polycarbonate resin (bisphenol A-type aromatic polycarbonate resin produced by melt transesterification, viscosity-average molecular weight: 27000, structural viscosity index: 1.3)

M1: Metal salt compound (potassium perfluorobutanesulfonate, Bayowet C4 manufactured by LANXESS)

M2: Metal salt compound (sodium toluenesulfonate manufactured by TOKYO CHEMICAL INDUSTRY Co., Ltd.)

PS: Polysilane (polydimethylsilane, number-average molecular weight: 2000)

Stab: Heat stabilizer (tris(2,4-di-tert-butylphenyl)phosphite, ADK STAB 2112 manufactured by Adeka Corp.)

[Production of Resin Pellet]

The components described above were blended with each other at the ratios (mass ratios) shown in Tables 14 to 16 and mixed in a tumbler for 20 minutes. The mixture was supplied to (TEX30HSST) having a single vent and manufactured by The Japan Steel Works, Ltd. and kneaded at a number of screw revolutions of 200 rpm, a discharge rate of 15 kg/hour, and a barrel temperature of 270° C. After that, a molten resin extruded in a strand shape was rapidly cooled in a water bath and pelletized using a pelletizer to obtain a pellet of a polycarbonate resin composition.

[Preparation of Test Piece for UL Test]

The pellet obtained by the above-described production method was dried at 120° C. for 5 hours and then injection-molded at a cylinder temperature of 260° C., a mold temperature of 80° C., and a molding cycle of 30 seconds using a J50-EP injection molding machine manufactured by The Japan Steel Works, Ltd. to obtain test pieces having a length of 125 mm, a width of 13 mm, and thicknesses of 3.2 mm (⅛ inches) and 1.6 mm (1/16 inches). The resultant formed products were used as samples for UL Test, and the flame resistance was evaluated by the method described below.

[Evaluation of Flame Resistance]

The flame resistance of each polycarbonate resin composition was evaluated as follows. The test pieces for UL Test prepared by the method above were left in a thermostatic chamber having a temperature of 23° C. and a humidity of 50% for 48 hours, and the flame resistance was evaluated in accordance with the UL 94 Test (Test for flammability of plastic materials for parts in devices and appliances) specified by the U.S.A. Underwriters Laboratories (UL). UL 94V is a method for evaluating flame resistance from the lingering flame time and dripping properties after a burner flame has been applied, for ten seconds, to a test piece having a predetermined size and held in the vertical position. To achieve flame resistance of V-0, V-1, and V-2, the criteria shown in Table 13 below need to be satisfied.

TABLE 13

|  | V-0 | V-1 | V-2 |
|---|---|---|---|
| Lingering flame time for each specimen | 10 sec or shorter | 30 sec or shorter | 30 sec or shorter |
| Total lingering flame time for five specimens | 50 sec or shorter | 250 sec or shorter | 250 sec or shorter |
| Cotton ignition by drips | No | Yes | Yes |

The lingering flame time is the duration of flaming combustion of a test piece after an ignition source has been moved away. The cotton ignition by drips is determined by whether or not marking cotton placed about 300 mm below the bottom of the test piece is ignited by drips from the test piece. Furthermore, the case where even one of five specimens does not satisfy the criteria above was evaluated as NR (not rated) because the case does not satisfy V-2.

[Evaluation of Flowability]

Regarding the resin composition dried at 120° C. for 5 hours, the melt volume rate per unit time (unit: cm$^3$/10 min) was measured and evaluated in accordance with JIS K7210 using Melt Indexer manufactured by Toyo Seiki Seisaku-sho, Ltd. at 300° C. at a load of 11.8 N.

TABLE 14

|  |  |  | Example IV-1 | Example IV-2 | Example IV-3 | Example IV-4 | Example IV-5 |
|---|---|---|---|---|---|---|---|
| Blending ratio of polycarbonate resin composition | PC1 | parts by mass | 99.62 | 99.395 | 98.895 | 97.87 | 98.87 |
|  | M1 |  | 0.1 | 0.075 | 0.075 | 0.1 |  |
|  | M2 |  |  |  |  |  | 0.1 |
|  | PS |  | 0.25 | 0.5 | 1 | 2 | 1 |
|  | Stab |  | 0.03 | 0.03 | 0.03 | 0.03 | 0.03 |
| Flame resistance (⅛ inches) |  |  | V-0 | V-0 | V-0 | V-0 | V-1 |
| MVR (cm$^3$/10 min) |  |  | 17 | 17 | 17 | 18 | 17 |

TABLE 15

|  |  |  | Comparative Example IV-1 | Comparative Example IV-2 | Comparative Example IV-3 | Comparative Example IV-4 |
|---|---|---|---|---|---|---|
| Blending ratio of polycarbonate resin composition | PC1 | parts by mass | 99.895 | 99.87 | 99.47 | 98.97 |
|  | M1 |  | 0.075 |  |  |  |
|  | M2 |  |  | 0.1 |  |  |
|  | PS |  |  |  | 0.5 | 1 |
|  | Stab |  | 0.03 | 0.03 | 0.03 | 0.03 |
| Flame resistance (1/8 inches) |  |  | V-2 | V-2 | V-2 | V-2 |
| MVR (cm³/10 min) |  |  | 15 | 15 | 17 | 17 |

TABLE 16

|  |  |  | Example IV-6 | Example IV-7 | Comparative Example IV-5 | Comparative Example IV-6 |
|---|---|---|---|---|---|---|
| Blending ratio of polycarbonate resin composition | PC2 | parts by mass | 29.875 | 29.825 | 29.925 | 29.9 |
|  | PC3 |  | 70 | 70 | 70 | 70 |
|  | M1 |  | 0.075 | 0.075 | 0.075 |  |
|  | PS |  | 0.05 | 0.1 |  | 0.1 |
| Flame resistance (1/16 inches) |  |  | V-0 | V-0 | V-2 | V-2 |
| MVR (cm³/10 min) |  |  | 8 | 7 | 6 | 6 |

As is clear from Tables 14 to 16, the polycarbonate resin compositions of Examples IV-1 to 5 have high flame resistance and flowability whereas the polycarbonate resin compositions of Comparative Examples IV-1 and 2 that contain only a metal salt compound and those of Comparative Examples IV-3 and 4 that contain only a polysilane have insufficient flame resistance. As is also clear from Table 16, even in the case where an aromatic polycarbonate resin having a predetermined structural viscosity index is contained, the polycarbonate resin composition of Comparative Example IV-5 that contains only a metal salt compound and that of Comparative Example IV-6 that contains only a polysilane have insufficient flame resistance. In contrast, the polycarbonate resin compositions of Examples IV-6 and 7 that contain both a metal salt compound and a polysilane have high flame resistance.

Accordingly, it was confirmed from Examples and Comparative Examples described above that the effects of improving flame resistance and flowability could be uniquely achieved through the configuration according to the fourth aspect of the present invention.

V. Examples and Comparative Examples According to Fifth Aspect of the Present Invention The following components were used in Examples and Comparative Examples.

Polycarbonate resin-1 (bisphenol A-type aromatic polycarbonate resin produced by interfacial polymerization, Iupilon (registered trademark) S-3000 manufactured by Mitsubishi Engineering-Plastics Corporation, viscosity-average molecular weight: 21000). In Tables 18 and 19, this is abbreviated as "PC-1".

Polycarbonate resin-2 (bisphenol A-type aromatic polycarbonate resin produced by interfacial polymerization, Iupilon (registered trademark) H-4000 manufactured by Mitsubishi Engineering-Plastics Corporation, viscosity-average molecular weight: 15000). In Tables 18 to 21, this is abbreviated as "PC-2".

Metal salt compound 1 (potassium perfluorobutanesulfonate, Bayowet C4 manufactured by LANXESS). In Tables 18 to 21, this is abbreviated as "Metal salt-1".

Metal salt compound 2 (sodium toluenesulfonate, NATS manufactured by Chembridge International Corp.). In Tables 18 to 21, this is abbreviated as "Metal salt-2".

Fluoropolymer (fluoroethylene resin capable of forming fibrils, Teflon (registered trademark) 6J manufactured by DuPont-Mitsui Fluorochemicals Co., Ltd.). In Tables 18 to 21, this is abbreviated as "PTFE".

Polysilane (polydimethylsilane manufactured by Nippon Soda Co., Ltd., number-average molecular weight: 2000). In Tables 18 to 21, this is abbreviated as "PS".

Polycarbonate oligomer (poly-4,4'-isopropylidene-diphenyl carbonate oligomer, AL-071 manufactured by Mitsubishi Engineering-Plastics Corporation). In Tables 18 to 21, this is abbreviated as "PC oligomer".

Fibrous reinforcement-1 (glass fiber-chopped strand, ECS03T571 manufactured by Nippon Electric Glass Co., Ltd.) (average fiber diameter: 13 μm, average length: 3 mm). In Tables 18 to 21, this is abbreviated as "GF-1".

Fibrous reinforcement-2 (milled glass fiber, EPG70M99S manufactured by Nippon Electric Glass Co., Ltd.) (average fiber diameter: 9 μm, average length: 70 μm). In Tables 18 to 21, this is abbreviated as "GF-2".

Optical function regulator (titanium oxide, CRONOSS2233 manufactured by KRONOS) (average particle size: 0.20 μm). In Tables 18 to 21, this is given as "titanium oxide".

Mold-release agent-1 (polyethylene wax, Licowax PE-520PW manufactured by Clariant (Japan) K.K., Dropping point: 117 to 122° C.). In Tables 18 to 21, this is given as "Mold-release agent-1".

Mold-release agent-2 (stearic acid, NAA180 manufactured by NOF Corporation). In Tables 18 to 21, this is given as "Mold-release agent-2".

Mold-release agent-3 (pentaerythritol distearate, Unistar H476D manufactured by NOF Corporation). In Tables 18 to 21, this is given as "Mold-release agent-3".

Examples V-1 to 4 and Comparative Examples V-1 to 4

Production of Resin Pellet

The components described above were blended with each other at the ratios (mass ratios) shown in Tables 18 and 19 and mixed in a tumbler for 20 minutes. The mixture was supplied to (TEX30HSST) having a single vent and manufactured by The Japan Steel Works, Ltd. and kneaded at a number of screw revolutions of 200 rpm, a discharge rate of 15 kg/hour, and a barrel temperature of 270° C. After that, a molten resin extruded in a strand shape was rapidly cooled in a water bath and pelletized using a pelletizer to obtain a pellet of a polycarbonate resin composition.

<Preparation of Test Piece for UL Test>

The pellet obtained by the above-described production method was dried at 120° C. for 5 hours and then injection-molded at a cylinder temperature of 260° C., a mold temperature of 80° C., and a molding cycle of 30 seconds using a J50-EP injection molding machine manufactured by The Japan Steel Works, Ltd. to obtain a test piece having a length of 125 mm, a width of 13 mm, and a thickness of 1.0 mm. The resultant formed product was used as a sample for UL Test, and the flame resistance was evaluated by the method described below.

<Evaluation of Flame Resistance>

The flame resistance of each polycarbonate resin composition was evaluated as follows. The test piece for UL Test prepared by the method above was left in a thermostatic chamber having a temperature of 23° C. and a humidity of 50% for 48 hours, and the flame resistance was evaluated in accordance with the UL 94 Test (Test for flammability of plastic materials for parts in devices and appliances) specified by the U.S.A. Underwriters Laboratories (UL). UL 94V is a method for evaluating flame resistance from the lingering flame time and dripping properties after a burner flame has been applied, for ten seconds, to a test piece having a predetermined size and held in the vertical position. To achieve flame resistance of V-0, V-1, and V-2, the criteria shown in Table 17 below need to be satisfied.

TABLE 17

|  | V-0 | V-1 | V-2 |
|---|---|---|---|
| Lingering flame time for each specimen | 10 sec or shorter | 30 sec or shorter | 30 sec or shorter |
| Total lingering flame time for five specimens | 50 sec or shorter | 250 sec or shorter | 250 sec or shorter |
| Cotton ignition by drips | No | No | Yes |

The lingering flame time is the duration of flaming combustion of a test piece after an ignition source has been moved away. The cotton ignition by drips is determined by whether or not marking cotton placed about 300 mm below the bottom of the test piece is ignited by drips from the test piece. Furthermore, the case where even one of five specimens does not satisfy the criteria above was evaluated as NR (not rated) because the case does not satisfy V-2. Tables 18 and 19 show the results.

TABLE 18

| | | | Example V-1 | Example V-2 | Example V-3 | Example V-4 |
|---|---|---|---|---|---|---|
| Resin composition | PC-1 | parts by mass | 99.45 | 99.425 | 99.4 | 99 |
| | Metal salt-1 | | 0.1 | 0.1 | 0.1 | 0.1 |
| | PTFE | | 0.4 | 0.4 | 0.4 | 0.4 |
| | PS | | 0.05 | 0.075 | 0.1 | 0.5 |
| Flame resistance (1.0 mm in thickness) | | | V-1 | V-1 | V-1 | V-1 |
| Total combustion time (sec) | | | 88 | 85 | 66 | 57 |
| Number of times of drips (out of 10) | | | 0 | 0 | 0 | 0 |

TABLE 19

| | | | Comparative Example V-1 | Comparative Example V-2 | Comparative Example V-3 | Comparative Example V-4 |
|---|---|---|---|---|---|---|
| Resin composition | PC-1 | parts by mass | 99.5 | 99.495 | 96.5 | 99.8 |
| | Metal salt-1 | | 0.1 | 0.1 | 0.1 | 0.1 |
| | PTFE | | 0.4 | 0.4 | 0.4 | |
| | PS | | | 0.005 | 3 | 0.1 |
| Flame resistance (1.0 mm in thickness) | | | V-2 | V-2 | NR | V-2 |
| Number of times of drips (out of 10) | | | 3 | 2 | — | 5 |

Examples V-5 and 6 and Comparative Examples V-5 and 6

Production of Resin Pellet

The components described above were blended with each other at the ratios (mass ratios) shown in Tables 20 and 21 and mixed in a tumbler for 20 minutes. The mixture was supplied to (TEX30HSST) having a single vent and manufactured by The Japan Steel Works, Ltd. and kneaded at a number of screw revolutions of 200 rpm, a discharge rate of 15 kg/hour, and a barrel temperature of 270° C. After that, a molten resin extruded in a strand shape was rapidly cooled in a water bath and pelletized using a pelletizer to obtain a pellet of a polycarbonate resin composition.

<Evaluation of Flowability>
MVR (Melt Volume Rate)

The pellet obtained by the above-described production method was dried at 120° C. for 4 hours or more, and then measurement was performed in accordance with ISO 1133 at a measurement temperature of 300° C. and a measurement load of 1.2 kgf (11.8 N). Table 20 shows the results.

Q Value

The pellet obtained by the above-described production method was dried at 120° C. for 4 hours or more, and then the flow rate per unit time, Q value (unit: $10^{-2}$ cm$^3$/sec), of a composition was measured by a method described in Appendix C of JIS K7210 using a Koka-shiki Flow Tester at 280° C. at a load of 160 kgf to evaluate the flowability. Note that an orifice having 1 mm in diameter and 10 mm in length was used. A higher Q value means higher flowability. Table 21 shows the results.

<Preparation of Test Piece>

The pellet obtained by the above-described production method was dried at 120° C. for 5 hours. In the case where the fibrous reinforcement was not contained, the pellet was injection-molded at a cylinder temperature of 280° C., a mold temperature of 80° C., and a molding cycle of 30 seconds using a J50-EP injection molding machine manufactured by The Japan Steel Works, Ltd. In the case where the fibrous reinforcement was contained, the pellet was injection-molded at a cylinder temperature of 300° C., a mold temperature of 110° C., and a molding cycle of 30 seconds. As a result, test pieces for UL Test having a length of 125 mm, a width of 13 mm, and thicknesses of 1.58 mm, 1.2 mm, and 1.0 mm were molded.

The pellet obtained by the above-described production method was dried at 120° C. for 5 hours and then injection-molded at a cylinder temperature of 280° C., a mold temperature of 80° C., and a molding cycle of 55 seconds using an M150AII-SJ injection molding machine manufactured by Meiki Co., Ltd. to obtain a flat test piece (90 mm in length, 50 mm in width, and three steps of 1, 2, and 3 mm in thickness).

Similarly, the pellet obtained by the above-described production method was dried at 120° C. for 5 hours. In the case where the fibrous reinforcement was not contained, the pellet was injection-molded at a cylinder temperature of 280° C., a mold temperature of 80° C., and a molding cycle of 45 seconds using a Cycap M-2 with a clamping force of 75 T manufactured by Sumitomo Heavy Industries, Ltd. In the case where the fibrous reinforcement was contained, the pellet was injection-molded at a cylinder temperature of 300° C., a mold temperature of 110° C., and a molding cycle of 45 seconds. As a result, an ISO multipurpose test piece (4 mm) and an ISO multipurpose test piece (3 mm) were molded.

<Evaluation of Flame Resistance>

The flame resistance was evaluated by performing UL Test in the same manner as in Example V-1 using the test pieces for UL Test.

Tables 20 and 21 show the results.

<Evaluation of Reflectivity>

The reflectivity was measured using a three-millimeter-thickness portion of the flat test piece (having three steps of 1, 2, and 3 mm in thickness). The measurement was performed using Spectrophotometer CM 3600d manufactured by KONICA MINOLTA HOLDINGS, INC. at a D65/10-degree observer with an SCI normal measurement mode. The reflectivity was evaluated at a wavelength of 440 nm. Table 21 shows the results.

<Evaluation of Heat Resistance>

The deflection temperature under load was measured in accordance with ISO 75-1 and ISO 75-2 using the ISO multipurpose test piece (4 mm) at a load of 1.80 MPa. Tables 20 and 21 show the results. In Tables 20 and 21, the deflection temperature under load is given as "DTUL".

<Evaluation of Bendability>

The bending stress and bending modulus were measured in accordance with ISO 178 using the ISO multipurpose test piece (4 mm) at 23° C. Tables 20 and 21 show the results.

<Evaluation of Impact Resistance>

The notched Charpy impact strength (unit: $kJ/m^2$) was measured in accordance with ISO 179 using the ISO multipurpose test piece (3 mm) at 23° C. Tables 20 and 21 show the results.

TABLE 20

| | | Unit | Example V-5 | Comparative Example V-5 |
|---|---|---|---|---|
| Resin composition | PC-1 | parts by mass | 68.82 | 69.32 |
| | PC oligomer | | 10 | 10 |
| | Metal salt-1 | | 0.08 | 0.08 |
| | PTFE | | 0.1 | 0.1 |
| | PS | | | 0.5 |
| | GF-1 | | 15 | 15 |
| | GF-2 | | 5 | 5 |
| | Mold-release agent-2 | | 0.5 | 0.5 |
| Flowability (MVR) | | $cm^3$/10 min | 11 | 10 |
| Flame resistance (1.58 mm in thickness) | | | V-0 | V-1 |
| DTUL | | ° C. | 139 | 139 |
| Bendability | Elastic modulus (load) | MPa | 5460 | 5520 |
| | Bending stress | MPa | 141 | 141 |
| Impact resistance | | $kJ/m^2$ | 9 | 8 |

TABLE 21

| | | Unit | Example V-6 | Comparative Example V-6 |
|---|---|---|---|---|
| Resin composition | PC-1 | parts by mass | 43.74 | 44.24 |
| | PC-2 | | 43 | 43 |
| | Metal salt-2 | | 0.2 | 0.2 |
| | PTFE | | 0.4 | 0.4 |
| | PS | | | 0.5 |
| | Titanium oxide | | 12 | 12 |
| | Mold-release agent-2 | | 0.08 | 0.08 |
| | Mold-release agent-3 | | 0.08 | 0.08 |
| Flowability (Q value) | | $10^2$ $cm^3$/sec | 15.3 | 14.7 |
| Flame resistance | 1.2 mm in thickness | | V-0 | V-0 |
| | 1.0 mm in thickness | | V-0 | V-0 |
| Reflectivity | | % | 94.5 | 94.8 |
| DTUL | | ° C. | 125 | 125 |
| Bendability | Elastic modulus (load) | MPa | 2400 | 2420 |
| | Bending stress | MPa | 90 | 90 |

VI. Examples and Comparative Examples According to Sixth Aspect of the Present Invention The following components were used in Examples and Comparative Examples.

Polycarbonate resin [A1]: bisphenol A-type aromatic polycarbonate resin produced by interfacial polymerization, viscosity-average molecular weight: 17000, structural viscosity index: 1.0

Polycarbonate resin [A2]: bisphenol A-type aromatic polycarbonate resin produced by melt transesterification, viscosity-average molecular weight: 27000, structural viscosity index: 1.3

Polycarbonate resin [A3]: bisphenol A-type aromatic polycarbonate resin produced by interfacial polymerization, viscosity-average molecular weight: 26000, structural viscosity index: 1.0

Metal salt compound [B]: potassium perfluorobutanesulfonate, product name: Bayowet C4 manufactured by LANXESS Polysilane having an aryl group [C1]: cyclic polydiphenylsilane, product name: OGSOL SI-30-10 manufactured by Osaka Gas Chemicals Co., Ltd., decaphenylcyclopentasilane, number-average molecular weight: 550

Other polysilane [C2]: straight-chain polydimethylsilane, number-average molecular weight: 2000

Fluoropolymer [0]: aqueous dispersion liquid of fluoroolefin resin, the content of PTFE: 60% by weight, Teflon (registered trademark) 31-JR manufactured by DU PONT-MITSUI FLUOROCHEMICALS COMPANY, Ltd.

Light-diffusing agent [E1]: acrylic diffusing agent having an average particle size of 4 μm (spherical), Ganz Pearl GM-0205S manufactured by GANZ CHEMICAL Co., Ltd.

Light-diffusing agent [E2]: polymethylsilsesquioxane particles having an average particle size of 2 μm (spherical), Tospearl 120 manufactured by Momentive Performance Materials Inc.

Mold-release agent [F1]: pentaerythritol tetrastearate, VPG 861 manufactured by Cognis Japan Ltd.

Mold-release agent [F2]: stearyl stearate, Unistar M9676 manufactured by NOF Corporation Stabilizer [G1]: tris(2,4-di-tert-butylphenyl)phosphite, ADK STAB 2112 manufactured by Adeka Corp.

Stabilizer [G2]: pentaerythritol tetrakis[3-(3,5-di-tert-butyl-4-hydroxyphenyl)propionate], Irganox 1010 manufactured by Ciba Specialty Chemicals Co., Ltd.

Examples VI-1 and 2 and Comparative Examples VI-1 to 5

Production of Resin Pellet

The components described above were blended with each other at the ratios (mass ratios) shown in Table 23 and mixed in a tumbler for 20 minutes. The mixture was supplied to (TEX30HSST) having a single vent and manufactured by The Japan Steel Works, Ltd. and kneaded at a number of screw revolutions of 200 rpm, a discharge rate of 15 kg/hour, and a barrel temperature of 270° C. After that, a molten resin extruded in a strand shape was rapidly cooled in a water bath and pelletized using a pelletizer to obtain a pellet of a polycarbonate resin composition.

<Preparation of Test Piece>

The pellet obtained by the above-described production method was dried at 120° C. for 5 hours and then injection-molded at a cylinder temperature of 260° C., a mold temperature of 80° C., and a molding cycle of 30 seconds using a J50-EP injection molding machine manufactured by The Japan Steel Works, Ltd. to obtain a test piece for UL Test having a length of 125 mm, a width of 13 mm, and a thickness of 1.6 mm (1/16 inches).

Similarly, the pellet obtained by the above-described production method was dried at 120° C. for 5 hours and then injection-molded at a cylinder temperature of 280° C., a mold temperature of 80° C., and a molding cycle of 55 seconds using an M150AII-SJ injection molding machine manufactured by Meiki Co., Ltd. to obtain a flat test piece (90 mm in length, 50 mm in width, and 3 mm in thickness) and an ASTM test piece (notched test piece with a thickness of 3.2 mm).

<Evaluation of Flame Resistance>

The flame resistance of each polycarbonate resin composition was evaluated as follows. The test piece for UL Test prepared by the method above was left in a thermostatic chamber having a temperature of 23° C. and a humidity of 50% for 48 hours, and the flame resistance was evaluated in accordance with the UL 94 Test (Test for flammability of plastic materials for parts in devices and appliances) specified by the U.S.A. Underwriters Laboratories (UL). UL 94V is a method for evaluating flame resistance from the lingering flame time and dripping properties after a burner flame has been applied, for ten seconds, to a test piece having a predetermined size and held in the vertical position. To achieve flame resistance of V-0, V-1, and V-2, the criteria shown in Table 22 below need to be satisfied.

TABLE 22

|  | V-0 | V-1 | V-2 |
|---|---|---|---|
| Lingering flame time for each specimen | 10 sec or shorter | 30 sec or shorter | 30 sec or shorter |
| Total lingering flame time for five specimens | 50 sec or shorter | 250 sec or shorter | 250 sec or shorter |
| Cotton ignition by drips | No | No | Yes |

The lingering flame time is the duration of flaming combustion of a test piece after an ignition source has been moved away. The cotton ignition by drips is determined by whether or not marking cotton placed about 300 mm below the bottom of the test piece is ignited by drips from the test piece. Furthermore, the case where even one of five specimens does not satisfy the criteria above was evaluated as NR (not rated) because the case does not satisfy V-2. Table 23 shows the results. In Table 23, this is given as "Flame resistance".

<Evaluation of Transparency>

The haze value (unit "%") was measured with an NDH-2000 haze meter (D65 light source) manufactured by NIPPON DENSHOKU INDUSTRIES Co., Ltd. in accordance with JIS K-7105 using the flat test piece (3 mm in thickness) as a test piece. The haze value is used as the scale of turbidity of resins. A smaller haze value means higher transparency, which is preferable. Table 23 shows the results. In Table 23, this is given as "Transparency".

<Evaluation of Hue>

With an SE-2000 spectrophotometer (C2 light source) manufactured by NIPPON DENSHOKU INDUSTRIES Co., Ltd., the YI value (unit "%") was measured by a transmission method in accordance with JIS K-7105 using the flat test piece (3 mm in thickness) as a test piece. The YI value (yellow index) is used as the scale of yellowing of resins. A smaller YI value means better hue, which is preferable. Table 23 shows the results. In Table 23, this is given as "Hue".

<Impact Resistance>

The Izod impact strength (unit: J/m) was measured using the ASTM test piece (notched test piece with a thickness of 3.2 mm) prepared above at 23° C. in accordance with ASTM D256. Table 23 shows the results. In Table 23, this is given as "Impact resistance".

TABLE 23

|  |  |  | Example VI-1 | Example VI-2 | Comparative Example VI-1 | Comparative Example VI-2 | Comparative Example VI-3 | Comparative Example VI-4 | Comparative Example VI-5 |
|---|---|---|---|---|---|---|---|---|---|
| Resin composition | A1 | parts by mass | 28.925 | 28.425 | 29.925 | 29.675 | 24.925 | 29 | 28.925 |
|  | A2 |  | 70 | 70 | 70 | 70 | 70 | 70 | 70 |
|  | B |  | 0.075 | 0.075 | 0.075 | 0.075 | 0.075 |  | 0.075 |
|  | C1 |  | 1 | 1.5 |  | 0.25 | 5 | 1 |  |
|  | C2 |  |  |  |  |  |  |  | 1 |
| Flame resistance |  |  | V-0 | V-0 | V-2 | V-2 | V-2 | V-2 | V-0 |
| Transparency |  |  | 0.6 | 0.6 | 0.5 | 0.5 | 0.7 | 0.5 | 99 |
| Hue |  |  | 1.2 | 1.2 | 2.0 | 1.4 | 2.0 | 1.2 | 31 |
| Impact resistance |  |  | 690 | 670 | 660 | 700 | 650 | 690 | 150 |

As is clear from Table 23, referring to Examples VI-1 and 2 and Comparative Examples VI-2 and 3, the polycarbonate resin compositions containing predetermined amounts of metal salt compound and polysilane having an aryl group have high flame resistance, transparency, and impact resistance and excellent hue. On the other hand, the polycarbonate resin composition of Comparative Example VI-1 that contains only a metal salt compound and the polycarbonate resin composition of Comparative Example VI-4 that contains only a polysilane having an aryl group have insufficient flame resistance. Furthermore, the polycarbonate resin composition of Comparative Example VI-5 that contains a polysilane not having an aryl group has insufficient transparency and impact resistance. Accordingly, it was confirmed from Examples and Comparative Examples described above that the effects of improving flame resistance, transparency, hue, and impact resistance could be uniquely achieved through the configuration of the present invention.

Examples VI-3 and 4 and Comparative Examples VI-6 and 7

Production of Resin Pellet

The components described above were blended with each other at the ratios (mass ratios) shown in Table 24 and mixed in a tumbler for 20 minutes. The mixture was supplied to (TEX30HSST) having a single vent and manufactured by The Japan Steel Works, Ltd. and kneaded at a number of screw revolutions of 200 rpm, a discharge rate of 15 kg/hour, and a barrel temperature of 270° C. After that, a molten resin extruded in a strand shape was rapidly cooled in a water bath and pelletized using a pelletizer to obtain a pellet of a polycarbonate resin composition.

<Evaluation of Flowability (Q Value)>

The pellet obtained by the above-described production method was dried at 120° C. for 4 hours or more, and then the flow rate per unit time, Q value (unit: $10^{-2}$ cm$^3$/sec), of a composition was measured by a method described in Appendix C of JIS K7210 using a Koka-shiki Flow Tester at 280° C. at a load of 160 kgf to evaluate the flowability. Note that an orifice having 1 mm in diameter and 10 mm in length was used. A higher Q value means higher flowability. Table 24 shows the results.

<Preparation of Test Piece>

The pellet obtained by the above-described production method was dried at 120° C. for 5 hours and then injection-molded at a cylinder temperature of 260° C., a mold temperature of 80° C., and a molding cycle of 30 seconds using a J50-EP injection molding machine manufactured by The Japan Steel Works, Ltd. to obtain test pieces for UL Test having a length of 125 mm, a width of 13 mm, and thicknesses of 1.2 mm and 1.0 mm.

The pellet obtained by the above-described production method was dried at 120° C. for 5 hours and then injection-molded at a cylinder temperature of 280° C., a mold temperature of 80° C., and a molding cycle of 55 seconds using an M150AII-SJ injection molding machine manufactured by Meiki Co., Ltd. to obtain a flat test piece (90 mm in length, 50 mm in width, three steps of 1, 2, and 3 mm in thickness).

Similarly, the pellet obtained by the above-described production method was dried at 120° C. for 5 hours and then injection-molded at a cylinder temperature of 280° C., a mold temperature of 80° C., and a molding cycle of 45 seconds using a Cycap M-2 with a clamping force of 75 T manufactured by Sumitomo Heavy Industries, Ltd. to obtain an ISO multipurpose test piece (4 mm) and an ISO multipurpose test piece (3 mm).

<Evaluation of Flame Resistance>

The flame resistance was evaluated by performing UL Test in the same manner as in Example VI-1 using the test pieces for UL Test. Table 24 shows the results.

<Evaluation of Turbidity>

In a one-millimeter-thickness portion and a two-millimeter-thickness portion of the flat test piece (with three steps of 1, 2, and 3 mm in thickness), the turbidity was measured in accordance with JIS K-7136 using an NDH-2000 turbidimeter manufactured by NIPPON DENSHOKU INDUSTRIES Co., Ltd. The turbidity is used as the scale of cloudiness of resins. A lower turbidity value means higher transparency. Table 24 shows the results.

<Evaluation of Diffusivity/Degree of Dispersion>

In a one-millimeter-thickness portion and a two-millimeter-thickness portion of the flat test piece (with three steps of 1, 2, and 3 mm in thickness), the brightness was measured with GP-5 GONIOPHOTOMETER manufactured by MURAKAMI COLOR RESEARCH LABORATORY under the conditions that incident light was at 0°, the elevation angle was 0°, the light-receiving range was 0° to 90°, the luminous aperture was 2.0, and the light-receiving aperture was 3.0. The diffusivity (%) was determined from the following formula. The degree of dispersion indicates a light-receiving angle that provides 50% of brightness at a light-receiving angle of 0°, that is, 50% of brightness of a light beam which travels in a straight line after passing through the test piece from a light source. Table 24 shows the results.

Diffusivity(%)=100·[(brightness at a light-receiving angle of 20°+brightness at a light-receiving angle of 70°)/{2·(brightness at a light-receiving angle of) 5°)}]

<Evaluation of Heat Resistance>

The deflection temperature under load was measured in accordance with ISO 75-1 and ISO 75-2 using the ISO multipurpose test piece (4 mm) at a load of 1.80 MPa. Table 24 shows the results. In Table 24, the deflection temperature under load is given as "DTUL".

<Evaluation of Bendability>

The bending stress and bending modulus were measured in accordance with ISO 178 using the ISO multipurpose test piece (4 mm) at 23° C. Table 24 shows the results.

TABLE 24

|  |  | Abbreviation | Unit | Example VI-3 | Example VI-4 | Comparative Example VI-5 | Comparative Example VI-6 |
|---|---|---|---|---|---|---|---|
| Resin | [A3] | parts by mass |  | 17.48 | 17.98 | 18.48 | 18.98 |
| composition | [A2] |  |  | 80.0 | 80.0 | 80.0 | 80.0 |
|  | [B] |  |  | 0.09 | 0.09 | 0.09 | 0.09 |
|  | [D] |  |  | 0.17 | 0.17 | 0.17 | 0.17 |
|  | [C1] |  |  | 1 | 1 |  |  |
|  | [E1] |  |  | 1 |  | 1 |  |
|  | [E2] |  |  |  | 0.5 |  | 0.5 |
|  | [F1] |  |  | 0.1 | 0.1 | 0.1 | 0.1 |
|  | [F2] |  |  | 0.1 | 0.1 | 0.1 | 0.1 |
|  | [G1] |  |  | 0.03 | 0.03 | 0.03 | 0.03 |
|  | [G2] |  |  | 0.03 | 0.03 | 0.03 | 0.03 |
| Flowability | (Q value) | $10^{-2}$ cm$^3$/sec |  | 4.6 | 4.6 | 4.5 | 4.5 |
| Flame | 1.2 mm in thickness |  |  | V-0 | V-0 | V-0 | V-0 |
| resistance | 1.0 mm in thickness |  |  | V-2 | V-0 | V-2 | V-1 |
| Turbidity | Hz (1 mm) | % |  | 98.2 | 99.1 | 98.0 | 99.1 |
|  | Hz (2 mm) | % |  | 99.1 | 99.3 | 99.0 | 99.3 |

TABLE 24-continued

| | Abbreviation | Unit | Example VI-3 | Example VI-4 | Comparative Example VI-5 | Comparative Example VI-6 |
|---|---|---|---|---|---|---|
| Diffusivity/ | Diffusivity (1 mm) | | 29.3 | 46.9 | 26.9 | 45.6 |
| Degree of | Degree of dispersion (1 mm) | | 21.2 | 36.5 | 19.5 | 34.7 |
| dispersion | Diffusivity (2 mm) | | 46.6 | 57.8 | 45.0 | 57.2 |
| | Degree of dispersion (2 mm) | | 36.8 | 51.2 | 34.8 | 50.3 |
| | DTUL | ° C. | 124 | 125 | 125 | 126 |
| Bendability | Elastic modulus (load) | MPa | 2300 | 2280 | 2300 | 2380 |
| | Bending stress | MPa | 97 | 97 | 96 | 99 |

It is clear from Table 24 that a satisfactory light-diffusing effect is achieved by blending a light-diffusing agent.

INDUSTRIAL APPLICABILITY

The first aspect of the present invention and the second aspect of the present invention can be utilized in a wide variety of industrial fields and are suitably used in the fields of, for example, electrical and electronic devices and their components, OA equipment, information terminals, mechanical parts, household electrical appliances, vehicle parts, architectural members, various containers, recreational equipment and miscellaneous articles, and illuminators.

The third aspect of the present invention can be utilized in a wide variety of industrial fields and are suitably used in the fields of, for example, electrical and electronic devices and their components, OA equipment, information terminals, mechanical parts, household electrical appliances, vehicle parts, architectural members, various containers, recreational equipment and miscellaneous articles, and illuminators, and furthermore members for near-infrared laser welding, and members for sensing devices, exemplified by various automobile sensing devices, such as face direction detection systems, rain sensors, various security systems, such as face recognition systems, fingerprint recognition systems, and vein recognition systems, and various information communication devices, such as remote controllers and infrared communication devices, in automobile, electrical and electronic, and other precision apparatus fields.

The fourth aspect of the present invention, the fifth aspect of the present invention, and the sixth aspect of the present invention can be utilized in a wide variety of industrial fields and are suitably used in the fields of, for example, electrical and electronic devices and their components, OA equipment, information terminals, mechanical parts, household electrical appliances, vehicle parts, architectural members, various containers, recreational equipment and miscellaneous articles, and illuminators.

The present application is based on Japanese Patent Application filed on Feb. 9, 2009 (Japanese Patent Application No. 2009-026837), Japanese Patent Application filed on Mar. 10, 2009 (Japanese Patent Application No. 2009-055802), Japanese Patent Application filed on Mar. 26, 2009 (Japanese Patent Application No. 2009-075456), Japanese Patent Application filed on Apr. 20, 2009 (Japanese Patent Application No. 2009-102103), Japanese Patent Application filed on Apr. 20, 2009 (Japanese Patent Application No. 2009-102104), and Japanese Patent Application filed on Apr. 21, 2009 (Japanese Patent Application No. 2009-103168), which are incorporated by reference herein in their entirety.

The invention claimed is:

1. A polycarbonate resin composition, comprising:
a polycarbonate resin; and
a polycarbosilane compound,
wherein the polycarbosilane compound has a number-average molecular weight of 100 to 20000 and has a main chain structure comprising a hydrocarbon residue and a repeating unit represented by formula (6):

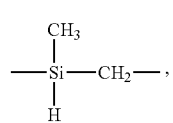

(6)

and wherein
a blending amount of the polycarbosilane compound is 0.001 to 20 parts by mass relative to 100 parts by mass of the polycarbonate resin.

2. A polycarbonate resin formed product, manufactured by shaping the composition of claim 1.

* * * * *